United States Patent
Lacaze et al.

(10) Patent No.: US 11,999,206 B2
(45) Date of Patent: Jun. 4, 2024

(54) AUTONOMOUS GLADHANDS COUPLING SYSTEMS, DEVICES, AND METHODS

(71) Applicant: Robotic Research OpCo, LLC, Clarksburg, MD (US)

(72) Inventors: Alberto Lacaze, Potomac, MD (US); Karl Murphy, Cocoa Beach, FL (US); Steven Rotundo, Baltimore, MD (US); Gedaliah Knizhnik, Silver Spring, MD (US)

(73) Assignee: Robotic Research OpCo, LLC, Clarksburg, MD (US)

( * ) Notice: Subject to any disclaimer, the term of this patent is extended or adjusted under 35 U.S.C. 154(b) by 0 days.

(21) Appl. No.: 18/282,022

(22) PCT Filed: Apr. 26, 2023

(86) PCT No.: PCT/US2023/019970
§ 371 (c)(1),
(2) Date: Sep. 14, 2023

(87) PCT Pub. No.: WO2023/212044
PCT Pub. Date: Nov. 2, 2023

(65) Prior Publication Data
US 2024/0075778 A1 Mar. 7, 2024

Related U.S. Application Data

(60) Provisional application No. 63/334,667, filed on Apr. 26, 2022.

(51) Int. Cl.
*B60D 1/64* (2006.01)
*B60T 17/04* (2006.01)
*B62D 53/12* (2006.01)

(52) U.S. Cl.
CPC .............. *B60D 1/64* (2013.01); *B60T 17/043* (2013.01); *B62D 53/125* (2013.01)

(58) Field of Classification Search
CPC ........................................................ B60D 1/64
See application file for complete search history.

(56) References Cited

U.S. PATENT DOCUMENTS

| 6,179,319 B1 | 1/2001 | Malisch et al. |
| 10,556,473 B2 | 2/2020 | Strand |

(Continued)

FOREIGN PATENT DOCUMENTS

| WO | 2019/165147 A1 | 8/2019 |
| WO | 2019/165150 A1 | 8/2019 |

(Continued)

OTHER PUBLICATIONS

International Search Report and Written Opinion, dated Jul. 28, 2023, in International Application No. PCT/US23/19970. (12 pages).

*Primary Examiner* — Kevin Hurley
(74) *Attorney, Agent, or Firm* — Rowan Tree Law Group, PLLC; Frederick F. Rosenberger

(57) ABSTRACT

The invention relates to a system (400) comprising a vehicle (402), an arm assembly (408), first and second cable portions (410a, 410b), at least one cable actuator (406), and an air supply line. The vehicle has a pneumatic source of pressurized air. The arm assembly has an end effector releasably coupled to an end of an axially-extendable arm coupled to the vehicle. The end effector has a gladhand coupling portion. The air supply line can be coupled to the end effector and can deliver pressurized air from the pneumatic source to a braking system of the trailer when the gladhand coupling portion is coupled to the gladhand receptacle of a trailer. After coupling to the gladhand receptacle, (Continued)

the end effector can be disconnected from the arm assembly to allow the remainder of the arm assembly to be stowed.

20 Claims, 20 Drawing Sheets

(56) References Cited

U.S. PATENT DOCUMENTS

| | | | |
|---|---|---|---|
| 11,020,859 B2 | 6/2021 | Patrick et al. | |
| 11,099,560 B2 | 8/2021 | Smith et al. | |
| 11,429,099 B2* | 8/2022 | Smith | E05C 17/02 |
| 11,560,188 B2* | 1/2023 | Moore | B60D 1/64 |
| 2019/0322319 A1 | 10/2019 | Smith et al. | |
| 2020/0139950 A1 | 5/2020 | James et al. | |
| 2020/0264607 A1 | 8/2020 | Smith et al. | |
| 2021/0053407 A1 | 2/2021 | Smith et al. | |
| 2021/0061034 A1 | 3/2021 | Moore et al. | |
| 2021/0316653 A1 | 10/2021 | Woodrough, Jr. | |
| 2021/0316761 A1 | 10/2021 | Torrie et al. | |
| 2021/0379945 A1 | 12/2021 | DeLizo et al. | |
| 2021/0380182 A1 | 12/2021 | DeLizo et al. | |
| 2022/0155782 A1 | 5/2022 | Smith et al. | |
| 2022/0227435 A1 | 7/2022 | Moore et al. | |
| 2022/0371199 A1* | 11/2022 | Schultz | B62D 53/00 |
| 2023/0159117 A1* | 5/2023 | Müller | B60D 1/64 |
| | | | 280/42 |

FOREIGN PATENT DOCUMENTS

| | | |
|---|---|---|
| WO | 2021/247559 A1 | 12/2021 |
| WO | 2022/051329 A1 | 3/2022 |

\* cited by examiner

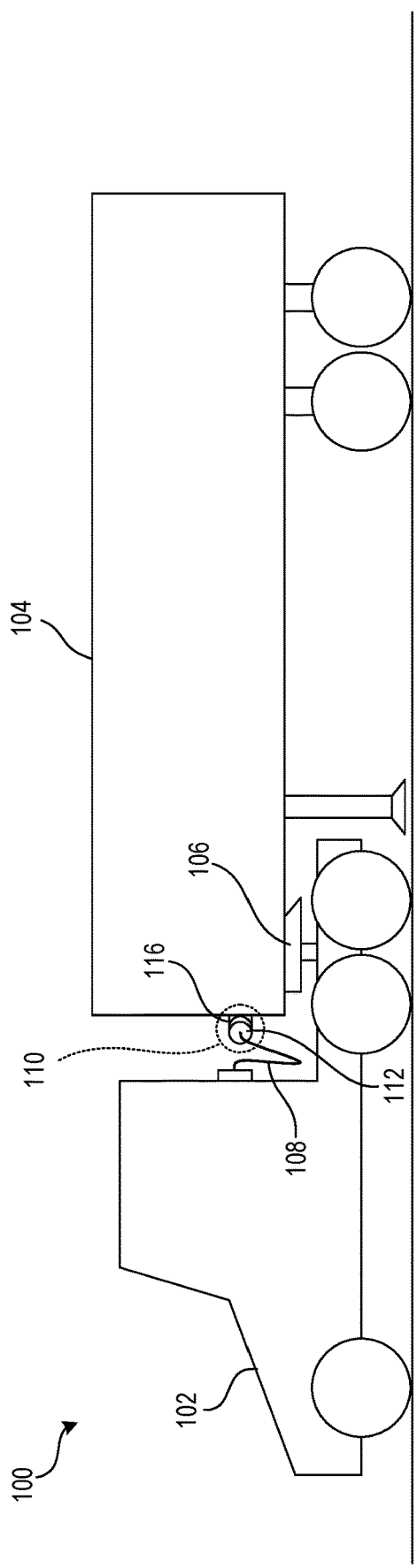
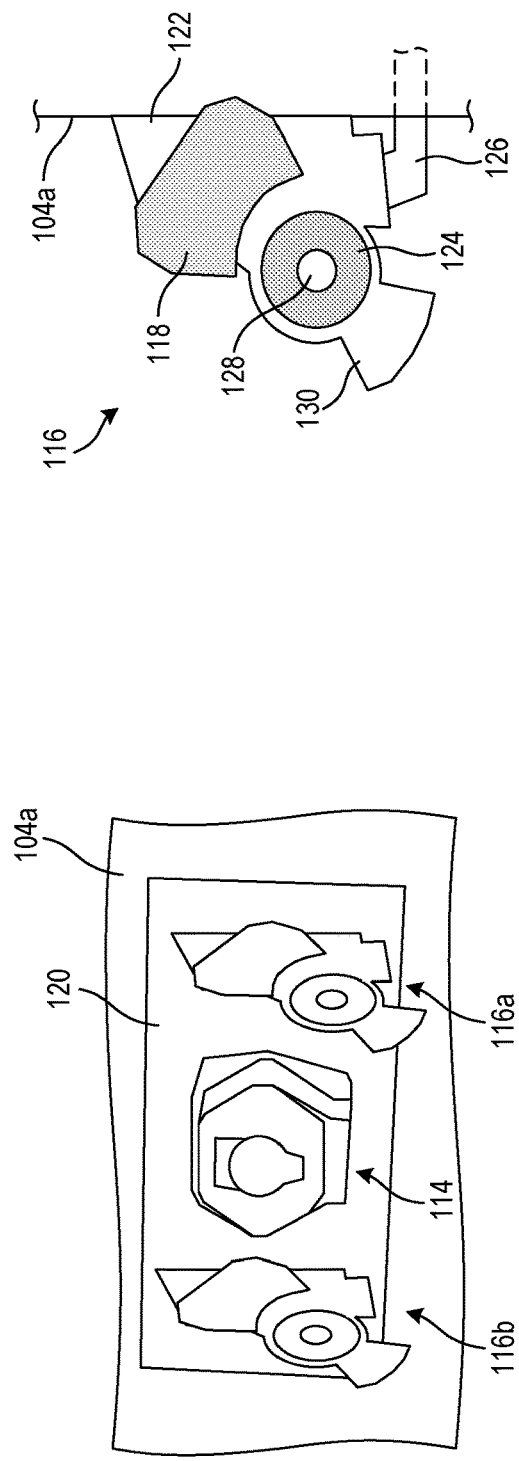
FIG. 1A
FIG. 1B
FIG. 1C

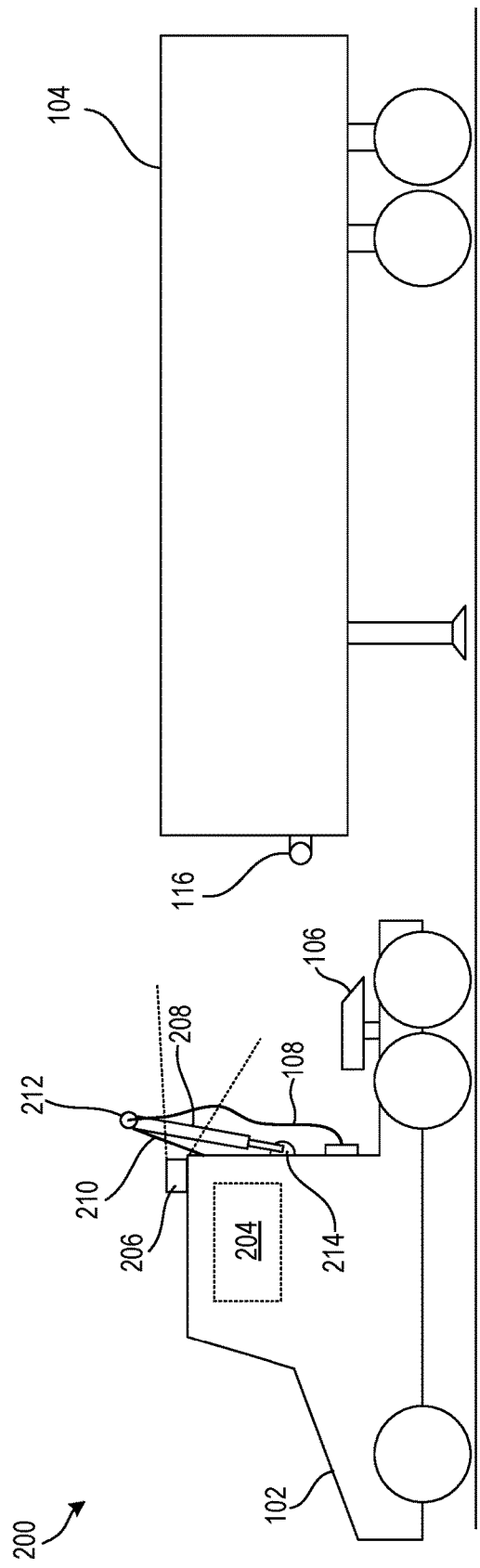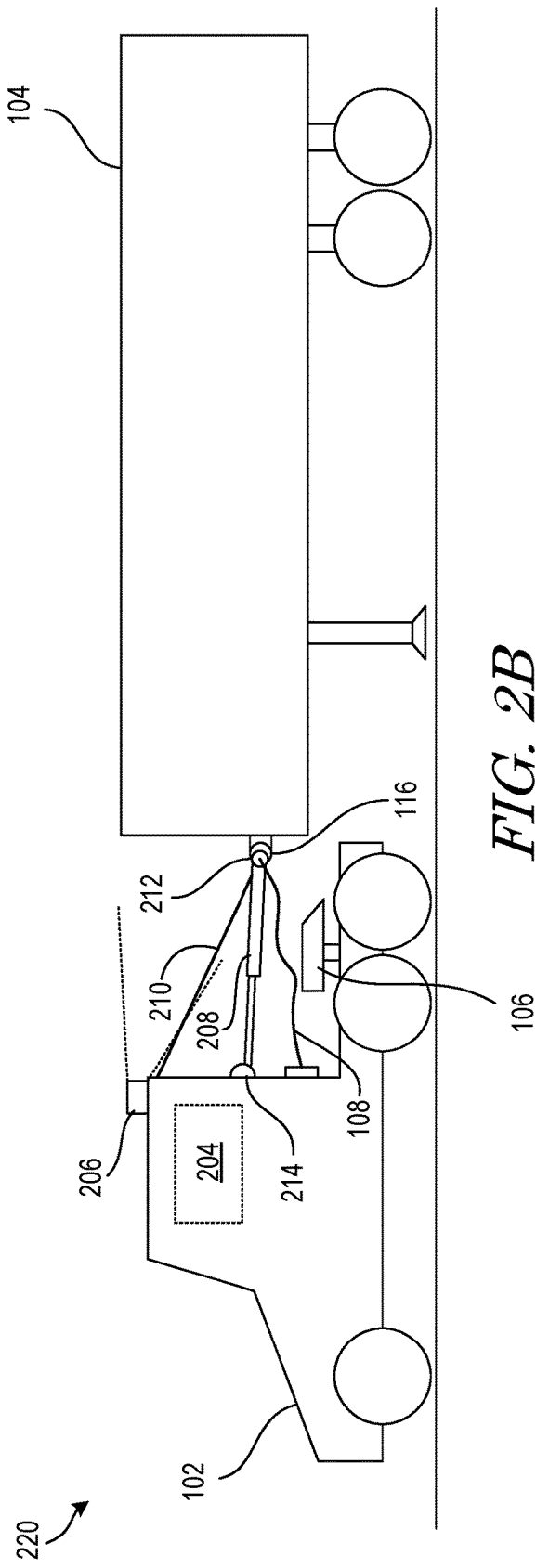

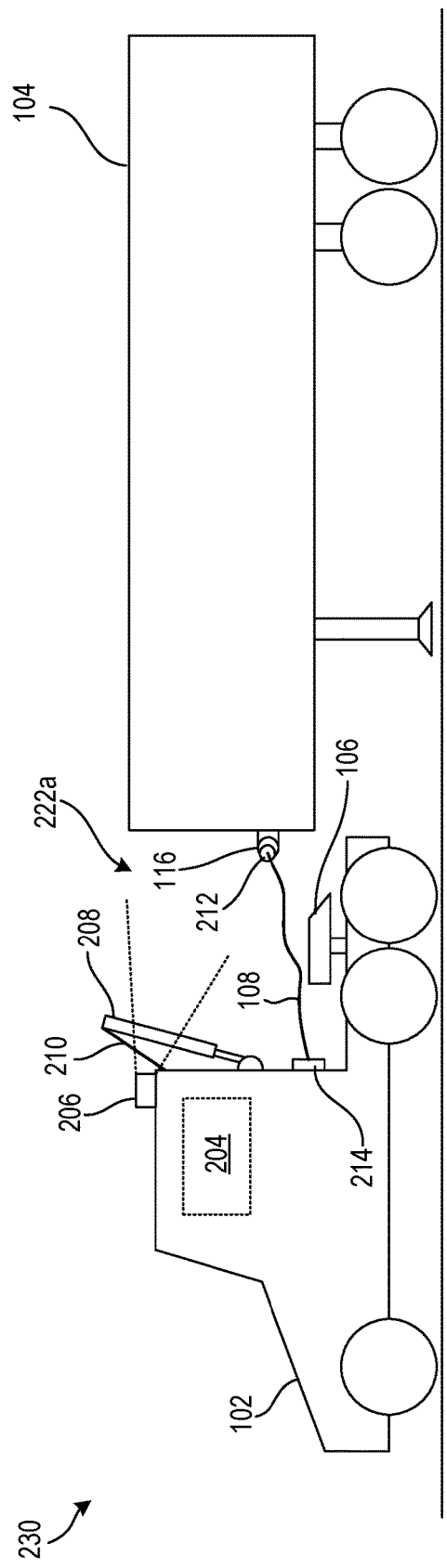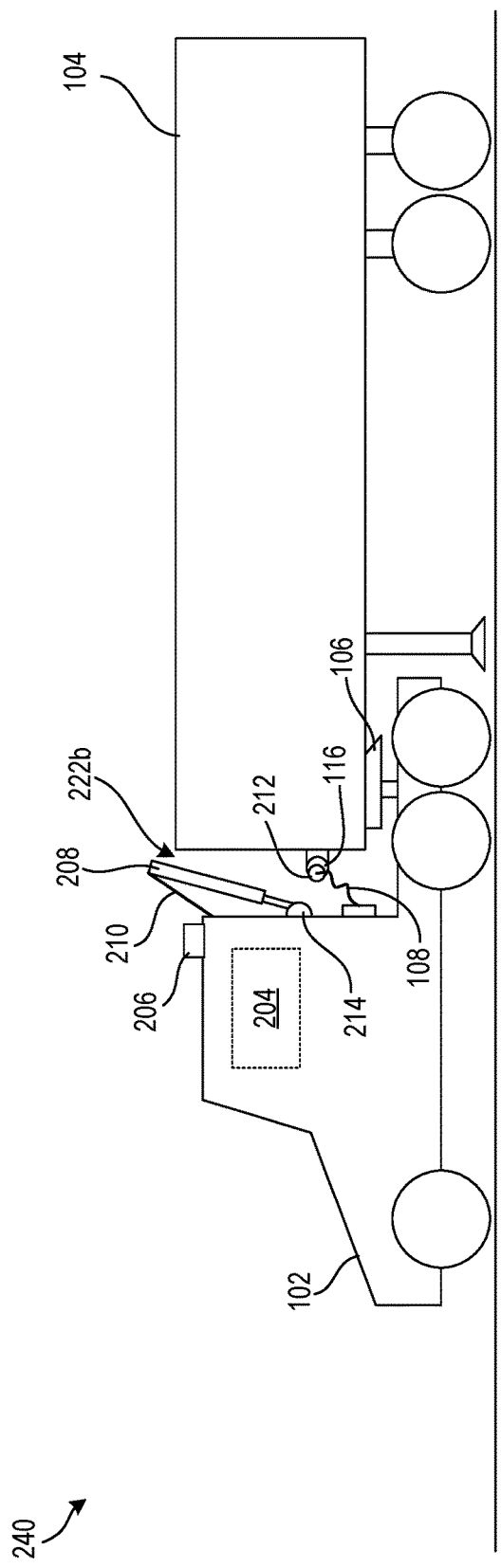
FIG. 2C
FIG. 2D

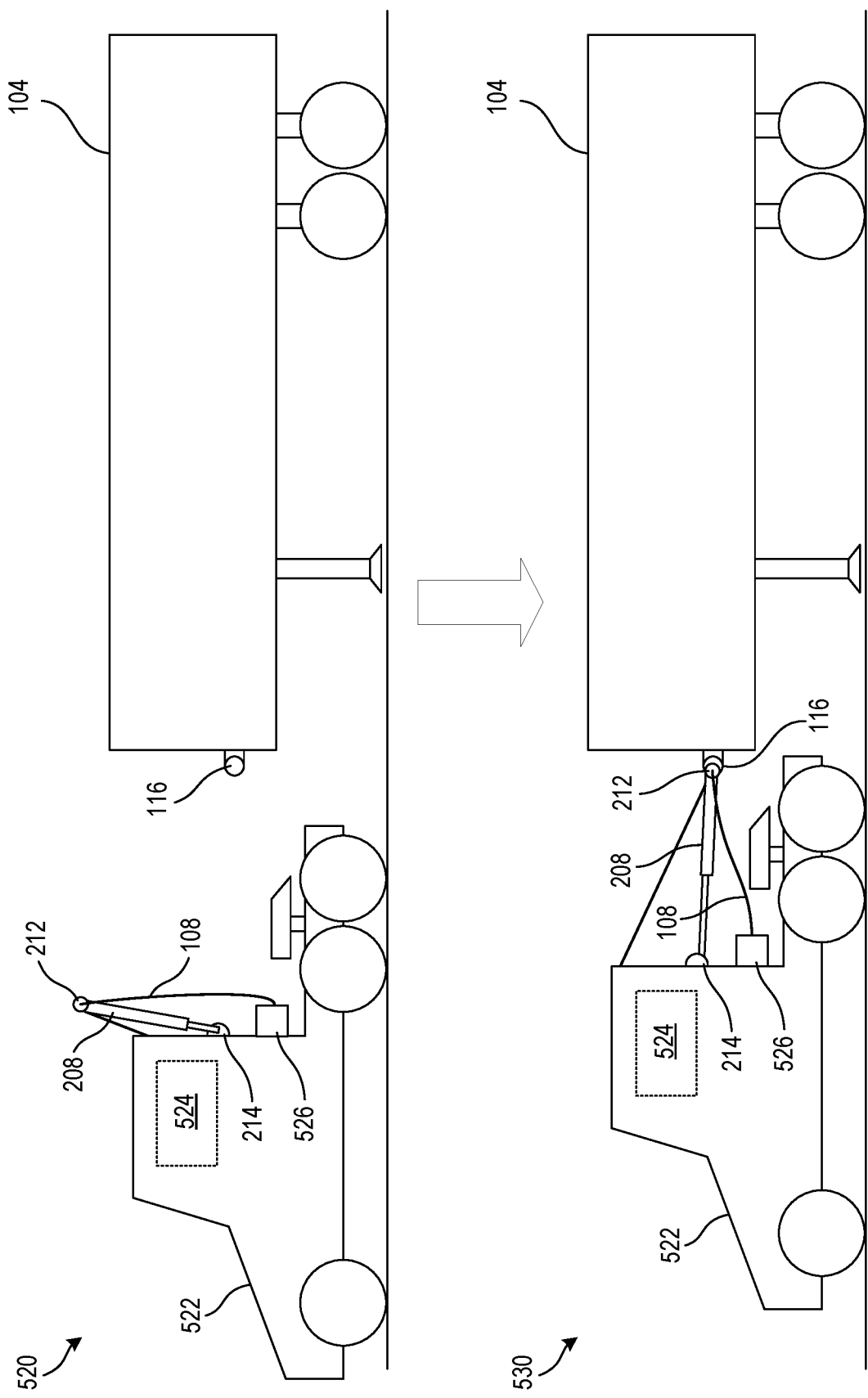

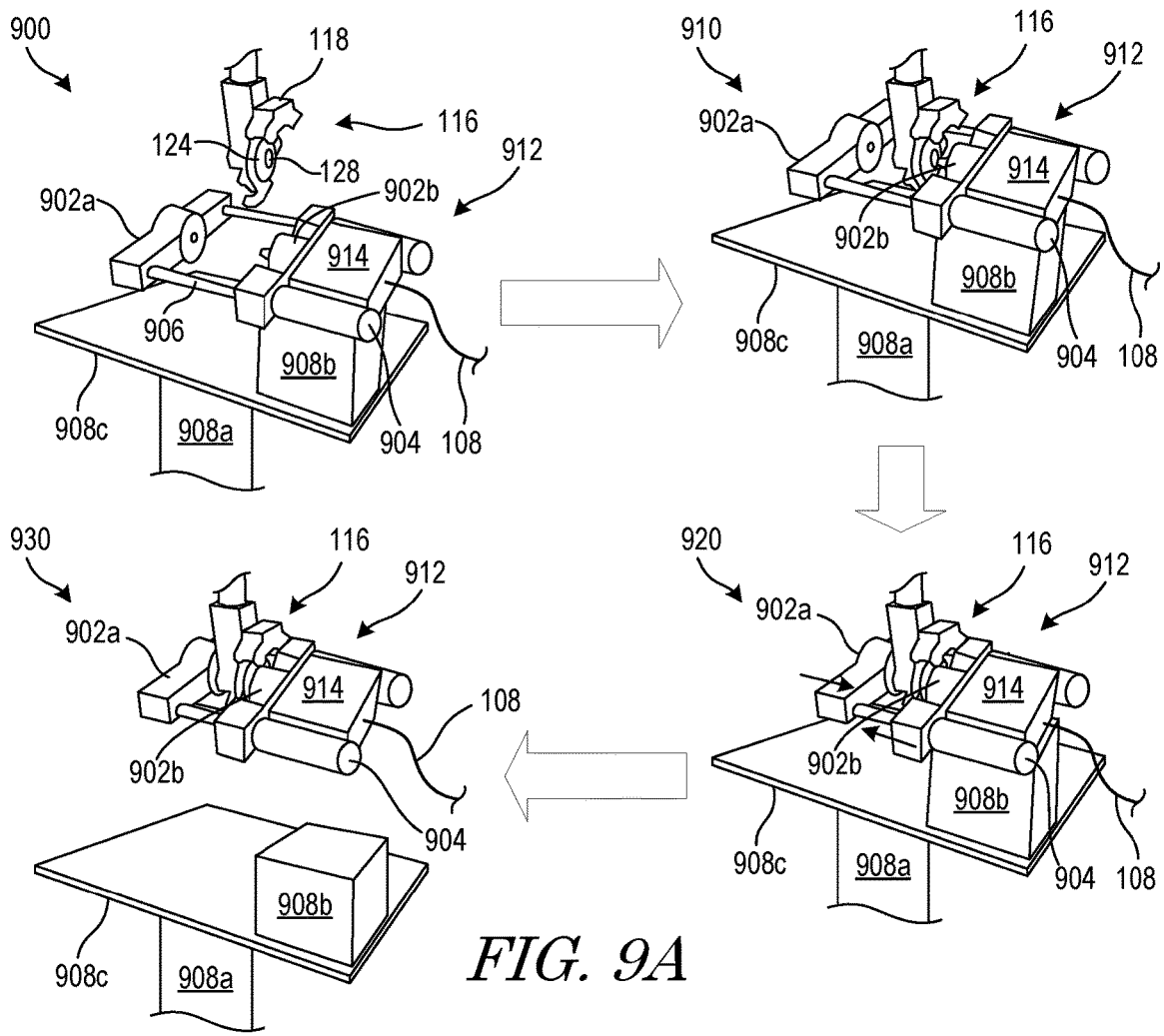
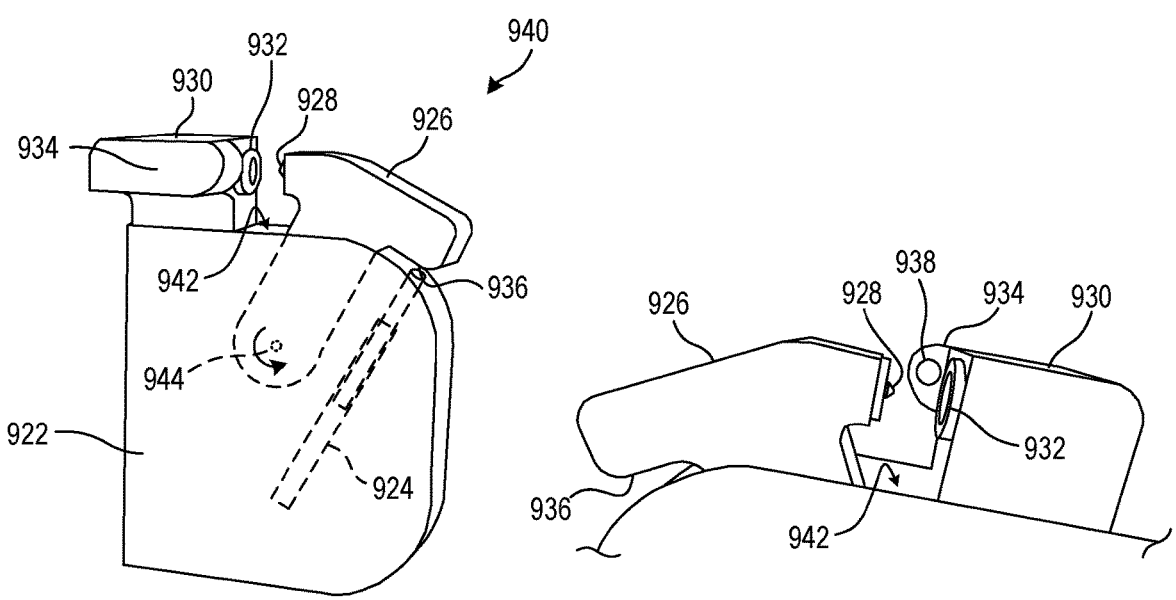
FIG. 9A
FIG. 9B  FIG. 9C

US 11,999,206 B2

AUTONOMOUS GLADHANDS COUPLING SYSTEMS, DEVICES, AND METHODS

CROSS-REFERENCE TO RELATED APPLICATION(S)

This application claims benefit of and priority under 35 U.S.C. § 119(e) to and is a non-provisional of U.S. Provisional Patent Application No. 63/334,667, filed on Apr. 26, 2022 and entitled "Autonomous Gladhands Coupler with Parallel Arm," which is hereby incorporated by reference herein in its entirety.

FIELD

The present disclosure relates generally to tractor-trailer systems, and more particularly, to autonomous coupling between a truck and a semi-trailer system, for example, gladhand couplers for trailer pneumatic brakes.

BACKGROUND

An 18-wheeler or tractor-trailer truck includes a semi-trailer (also referred to herein as "trailer") releasably coupled to a tractor (also referred to herein as "truck" or "vehicle"). At distribution centers, marine terminals, rail heads, etc., the trailer is often disconnected from the truck, for example, for cargo loading, cargo unloading, storage, or changing between trucks. In such locations, rather than the truck used for road hauling, the trailer can be moved about by a specialized local tractor (also referred to herein as "hostler," "hostler truck," "yard truck," "yard dog," "terminal tractor," "shuttle truck," or "shunt truck"). However, trailers have a pneumatic parking brake (also referred to "spring brake" or "emergency brake") that mechanically engage when the tractor's pressurized pneumatic lines are disconnected (e.g., via gladhand couplers on the trailer). Thus, to allow movement of the trailer by the hostler, the trailer parking brake has to be disengaged by pressurizing the pneumatic lines. This requires manually connecting pneumatic lines between hostler and the trailer, as automatic connection tends to be difficult or subject to failure. Not only does manual connection of pneumatic lines require additional time and subject a user to potential risk, but it also limits the adoption of automation (e.g., automating operation of the hostler to move trailers) at such locations. Embodiments of the disclosed subject matter may address one or more of the above-noted problems and disadvantages, among other things.

SUMMARY

Embodiments of the disclosed subject matter provide systems, methods, and devices for autonomous or automated (e.g., remote controlled but without human contact with the gladhands) connection of pneumatic supply lines via gladhands couplers. In some embodiments, a positionable arm (e.g., robotic arm assembly) with an end effector can be used to couple and/or decouple a gladhand coupler or connector (e.g., from a tractor or from a trailer) to a conventional gladhand receptacle (e.g., on a trailer, on a tractor, or on another trailer). In some embodiments, the gladhand connector can be coupled to the receptacle via one or more clamping features (e.g., with clamp members on opposite sides of the receptacle). In some embodiments, the end effector can be removably mounted on the positionable arm (e.g., via magnetic attraction, vacuum force, or actuatable mechanical coupling), for example, to allow the end effector to be retained with the coupled gladhand receptacle after the positionable arm is retracted and/or stowed. Alternatively or additionally, in some embodiments, the conventional gladhand receptacle can be coupled to an adapter module that terminates in a pneumatic connector (e.g., male quick connect), and the end effector can have a counterpart pneumatic connector (e.g., female quick connect).

In some embodiments, the system can be configured to move the gladhand receptacle into an appropriate position for coupling (e.g., rotated outward away from the trailer), for example, using the positionable arm (or a portion thereof) or a second actuation mechanism (e.g., an auxiliary robotic arm). In some embodiments, after moving into the coupling position, the gladhand receptacle can be retained in that position during and/or after coupling to the gladhand connector, for example, via the second actuation mechanism and/or a separate device (e.g., a kickstand or standoff).

In one or more embodiments, a system can comprise a vehicle, a first arm assembly, first and second cable portions, at least one cable actuator, and an air supply line. The vehicle can comprise a pneumatic source of pressurized air. The first arm assembly can comprise at least one axially-extendable arm, at least one linear actuator, and a first end effector. Each axially-extendable arm can have a first end coupled to the vehicle and a second end opposite the first end along an axial direction of the arm. Each linear actuator coupled to the at least one axially-extendable arm. The first end effector can be releasably coupled proximal to the second end of the at least one axially-extendable arm. The first end effector can comprise a gladhand coupling portion configured to be coupled to a gladhand receptacle of a trailer. The first and second cable portions can extend between the vehicle and a distal portion of the first arm assembly. The at least one cable actuator can be configured to independently change respective lengths of the first and second cable portions between the vehicle and the distal portion of the first arm assembly. The air supply line can be coupled to the vehicle and the first end effector. The air supply line can be configured to deliver pressurized air from the pneumatic source to a braking system of the trailer when the gladhand coupling portion is coupled to the gladhand receptacle.

Any of the various innovations of this disclosure can be used in combination or separately. This summary is provided to introduce a selection of concepts in a simplified form that are further described below in the detailed description. This summary is not intended to identify key features or essential features of the claimed subject matter, nor is it intended to be used to limit the scope of the claimed subject matter. The foregoing and other objects, features, and advantages of the disclosed technology will become more apparent from the following detailed description, which proceeds with reference to the accompanying figures.

BRIEF DESCRIPTION OF THE DRAWINGS

Where applicable, some elements may be simplified or otherwise not illustrated in order to assist in the illustration and description of underlying features. Throughout the figures, like reference numerals denote like elements. An understanding of embodiments described herein and many of the attendant advantages thereof may be readily obtained by reference to the following detailed description when considered with the accompanying drawings, wherein:

FIGS. 1A-1C shows a truck coupled to a semi-trailer, a trailer supply connector station, and a gladhand receptacle, respectively, in a conventional tractor-trailer system;

FIGS. 2A-2D shows various stages for coupling a vehicle to a semi-trailer, including gladhand coupling via a robotic arm assembly, according to one or more embodiments of the disclosed subject matter;

FIG. 5B shows aspects of another gladhand coupling system with pneumatic line dispensing, according to one or more embodiments of the disclosed subject matter;

FIG. 9A shows various stages of gladhand coupling via a robotic arm assembly employing a clamping-style end effector, according to one or more embodiments of the disclosed subject matter;

FIGS. 9B-9C show various aspects of another clamping-style end effector, according to one or more embodiments of the disclosed subject matter;

DETAILED DESCRIPTION

I. Introduction

Figure 3:
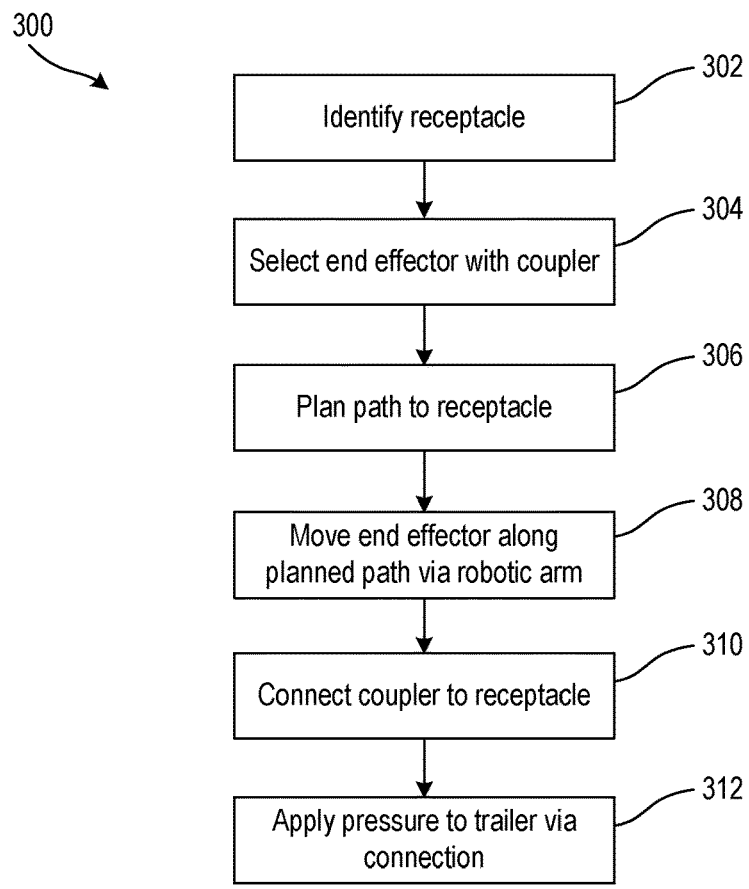
FIG. 3 is a process flow diagram of an exemplary method for coupling a vehicle to a semi-trailer via a robotic arm assembly, according to one or more embodiments of the disclosed subject matter.

In a tractor-trailer system 100 (e.g., an 18-wheeler or tractor-trailer truck), a semi-trailer 104 (also referred to herein as "trailer") is releasably coupled to a tractor 102 (also referred to herein as "truck" or simply "vehicle") via a fifth-wheel connector 106, as shown in FIG. 1A. A supply coupling 110 between the tractor 102 and the trailer 104 is used to provide the braking system of the trailer 104 with pressurized air (e.g., via pneumatic supply line 108) from the tractor 102 and/or the electrical system of the trailer 104 with power from the tractor 102. In North America, there are usually two gladhand receptacles 116 corresponding to separate pneumatic lines of the trailer 104. One gladhand receptacle 116a (and corresponding pneumatic line) is pressurized to release the brake drums of the trailer 104 that otherwise provides a fail-safe state (e.g., with the brakes applied to the trailer). The other gladhand receptacle 116b (and corresponding pneumatic line) is used as the service brakes to assist the braking provided by wheels of the tractor 102. The application of pressure to the pneumatic lines is typically controlled by the tractor driver, e.g., either a human driver or an autonomous control unit (e.g., via a drive-by-wire system).

As shown in FIG. 1B, a connector station 120 can be mounted on or part of a front-facing surface 104a of the trailer 104. The connector station 120 can have separate gladhand receptacles 116a, 116b flanking opposite lateral sides of an electrical receptacle 114, via which power can be applied to the electrical system of the trailer 104. In some embodiments, each gladhand receptacle 116 can extend from the trailer 104 along a longitudinal direction of the system 100 (e.g., from the trailer front surface 104a toward the vehicle 102), as shown in FIGS. 1B-1C.

Gladhands are designed to comply with one or more industry standards, such as Society of Automotive Engineers (SAE) J318_202106, "Automotive Air Brake Line Couplers (Gladhands)," J318_202106, published Jun. 10, 2021, and/ or International Organization for Standardization (ISO) 1728:2006, "Road vehicles—Pneumatic braking connections between motor vehicles and towed vehicles—Interchangeability," published September 2005, both of which are incorporated herein by reference. Different colors may be used to indicate gladhands and/or pneumatic lines corresponding to the service and emergency brakes (e.g., blue and red, respectively). In general, the same connector configuration may be used for the gladhand for each pneumatic line.

For example, as shown in FIG. 1C, each gladhand receptacle 116 can have an alignment member 118, a mounting member 122, a sealing member 124, a pneumatic port 128, and a detent plate 130. The gladhand receptacle 116 can be coupled to the trailer 104 (directly to the front surface 104a or indirectly via one or more intervening members) by mounting member 122. The alignment member 118 can be designed to interface with a cam flange (e.g., detent plate) of the standard gladhand coupler 112 to help position and retain the gladhand coupler thereto. A pneumatic line 126 can be fluid communication with the trailer braking system and the pneumatic port 128. When connected to the gladhand coupler 112, the sealing member 124 (e.g., gasket) of the receptacle 116 can interface with a corresponding member or surface of the gladhand coupler 112 to seal the area surrounding pneumatic port 128, such that pressurized air from the gladhand coupler 112 can be provided to the trailer braking system via the pneumatic port 128 and pneumatic line 126.

Coupling a gladhand coupler 112 to a gladhand receptacle 116 in conventional systems requires a human to manually connect and disconnect the pneumatic lines; however, such configurations may not be conducive to partially or fully autonomous operation. Although trailers may be designed with new versions of gladhand receptacles that are easier to autonomously connect, a large number of trailers in operation have been built and will continue to be built with conventional gladhand configurations. Disclosed herein are tractor-trailer systems, configurations, and methods that facilitate autonomous (semi-autonomous or automated) operation, for example, transport via an autonomous vehicle (e.g., truck or hostler). In some embodiments, the vehicle coupled to the trailer is an autonomous truck or vehicle, for example, a yard hostler. In some embodiments, the features of the tractor and/or the system can reduce the amount of manual intervention and/or human oversight required for transport of the trailer.

In some embodiments, the existing gladhand receptacle on the trailer (or on the truck or another trailer) can be retained, while the gladhand coupler that connects thereto can be modified to allow for robotic or automated positioning and coupling. Alternatively or additionally, an adapter can be preinstalled on the existing gladhand receptacle, for example, to allow for an easier connection via automated means. For example, in some embodiments, one end of the adapter can have a conventional gladhand configuration and can mate with the gladhand receptacle while the other end of the adapter can have a different pneumatic connector (e.g., a quick connect pneumatic coupler).

In some embodiments, an autonomous gladhand coupling system can employ an arm assembly (e.g., having one or more telescoping arms, one or more linear actuators, and/or one or more support cables) and a detachable end effector at an end of the arm assembly. The detachable end effector can be configured to mate with the existing gladhand receptacle. For example, the vehicle can have a single linearly-actuatable arm with a detachable end effector that is extendable from a rear of a tractor toward the gladhand receptacle on the trailer (or on the front of a trailer extendable toward a gladhand receptacle on a truck, or on the rear of a first trailer extendable toward a gladhand receptacle on a second trailer). Alternatively or additionally, one or more parallel telescoping arms with an end effector can be removably attached on a mounting surface at an end of one or more parallel telescoping arms extending from a rear of the vehicle.

In some embodiments, the autonomous gladhand coupling system can be integrated with the vehicle (e.g., where the truck is manufactured with the linear arm built in), or it can be an aftermarket add-on to the vehicle (e.g., as a modular unit coupled to a rear of the truck). Similarly, when the autonomous gladhand coupling system is on the trailer, it can be integrated with the trailer (e.g., where the trailer is manufactured with the linear arm built in), or it can be an aftermarket add-on to the trailer (e.g., as a modular unit coupled to a front or rear sidewall of the trailer).

II. Autonomous Gladhand Coupling Via Robotic Arm Assembly

In some embodiments, a telescoping arm 208 can be used to autonomously couple a pneumatic line 108 from a vehicle 202 to a gladhand receptacle 116 of a trailer 104, for example, as shown in FIGS. 2A-2D. In some embodiments, the vehicle 202 is an autonomous vehicle, for example, with a control system 204 for controlling operation of the vehicle 202. In some embodiments, control system 204 may also control operation of the gladhand coupling system, for example, to control movement of the robotic arm assembly for positioning an end effector 212 with respect to the receptacle 116, to control actuation of the end effector 212 to engage the receptacle 116, and/or to control movement of the robotic arm assembly without end effector 212 to a stowed position. Alternatively, in some embodiments, a control system for controlling operation of the robotic arm assembly can be separate from and/or communicate with a control system 204 for controlling vehicle operation.

In some embodiments, the vehicle 202 and/or gladhand coupling system can be provided with one or more sensors, for example, to detect a type, location, and/or orientation of the gladhand receptacle 116 and/or a location of the end effector 212 (e.g., during positioning and/or after positioning, for example, to retrieve the end effector 212 when the trailer 104 is being decoupled from the vehicle 202). For example, a sensor 206 can be provided on a cabin roof of the vehicle 202 and can have a rearward-facing field-of-view for detecting aspects of the gladhand receptacle 116. Other locations for sensor 206 are also possible, such as but not limited to a rear surface of the vehicle cabin, a side surface of the vehicle cabin, and a portion of the vehicle body supporting the fifth-wheel connector 106.

In the illustrated example of FIGS. 2A-2D, the robotic arm assembly can include a telescoping arm 208. A first end of the telescoping arm 208 can be coupled to the vehicle 202 (e.g., at a rear of a cabin of the vehicle) by a pivot 214 (e.g., universal joint). Alternatively, in some embodiments, the pivot 214 can be mounted at different locations on the vehicle 202, such as but not limited to a side of the vehicle cabin or a part of the rear frame between the fifth-wheel connector and the cabin. The end effector 212 can be releasably mounted to a second end of the telescoping arm 208 opposite the first end, and at least two position control members 210 (e.g., support cables, wires, or tethers) can be coupled to the telescoping arm 208 in a region between the pivot 214 and the end effector 212 (e.g., closer to the second end of the telescoping arm 208 than to the first end). In some embodiments, the change in length of the telescoping arm 208 together with changes in respective lengths of the at least two position control members 210 can operate to position the end effector 212 with three degrees of freedom.

During the approach stage 200 of FIG. 2A, a rear end of the vehicle 202 can approach a front end of the trailer 104, with the telescoping arm 208 oriented close to the vehicle 202 and with the end effector 212 retained at the second end of the arm 208. During the gladhand coupling stage of FIG. 2B, the vehicle 202 can further approach the trailer 104, and/or the arm 208 can be lowered about pivot 214 and can be moved into position (e.g., via position control members 210) with respect to the trailer gladhand receptacle 116. For example, the arm 208 can be moved such that an air supply outlet of the end effector 212 is aligned with the pneumatic port of the receptacle 116, after which the supply outlet can be mated with the pneumatic port, for example, by clamping the end effector 212 to the receptacle. Once effectively coupled to the receptacle 116, the end effector 212 can then be de-coupled from the arm 208, and the arm 208 can be retracted and/or returned to a stowed position, for example, as shown in the stowing stage 230 of FIG. 2C. Finally, the vehicle 102 can further approach the trailer 104 to connect and lock the fifth-wheel connector 106 to the trailer 104, as shown in the trailer attachment stage 240 of FIG. 2D. Air can then be supplied to lines 108, such that the emergency brakes on the trailer are released and/or the service brakes are functional. In some embodiments, the reverse steps can be followed when the trailer is decoupled from the vehicle.

In some embodiments, the retraction of the arm 208 in the stowing stage 230 can allow for free movement between the vehicle 202 and the trailer 104, which may aid in performing standard maneuvers). Alternatively or additionally, the clearance 222a between the rear of the vehicle cabin and the front of the trailer prior to connecting the fifth-wheel connector 106 may allow for greater freedom of movement for the arm 208, while connecting the fifth-wheel connector 106 to the trailer 104 may reduce clearance 222b to a narrower region (e.g., along the longitudinal direction, which may be further reduced during turning maneuvers) that could otherwise inhibit free movement of the arm 208. Alternatively, in some embodiments, the connection of the end effector 212 to the gladhand receptacle 116 may occur only after the fifth-wheel connector 106 is attached to the trailer 104.

Referring to FIG. 3, an exemplary method 300 for autonomous coupling to a gladhand receptacle to provide pressurized air to a trailer braking system is shown. The method 300 can initiate at process block 302, where the gladhand receptacle is identified. For example, one or more sensors of a vehicle to be coupled to the trailer and/or one or more sensors of an autonomous coupling system on the vehicle can be used to identify the gladhand receptacle. In some embodiments, the identification of process block 302 can include identifying the type of the gladhand receptacle (e.g., for selecting an appropriate end effector configuration and/or end effector), identifying a location of the gladhand receptacle (e.g., a location of the pneumatic port and/or sealing member), and/or determining an orientation of the gladhand receptacle (e.g., stowed position and/or deviation from a standard coupling orientation).

The method 300 can proceed to process block 304, where an end effector with coupling portion can be selected for coupling to the identified gladhand receptacle. In some embodiments, a robotic arm assembly can pick an appropriate end effector from among a plurality of different end effectors, for example, in a passive holder or actuatable library (e.g., carousel). For example, the robotic arm assembly can select a first end effector connected to the service pneumatic line for coupling to the gladhand receptacle connected to the service braking line of the trailer, and/or can select a second end effector connected to parking pneumatic line for coupling to the gladhand receptacle connected to the emergency brake line of the trailer. In some embodiments, the robotic arm assembly can select additional end effectors for coupling to gladhand receptacles connected to air-actuated machinery aboard the trailer, for example, trailer-mounted winches, container locks, etc. Alternatively or additionally, in some embodiments, the robotic arm assembly can select different end effectors for respective connection to non-gladhand receptacles, such as but not limited to the electrical receptacle for trailer power.

The method 300 can proceed to process block 306, where a path for the end effector (and/or the robotic arm assembly connected thereto) can be planned. For example, a control system of the autonomous coupling system (e.g., control system 204) can perform the planning based at least in part on the receptacle identified in process block 302 and/or other features detected in an environment surrounding the vehicle (e.g., by sensor 206). In some embodiments, the path can be planned from an initial stowed position proximal to the rear of the vehicle (e.g., when the end effector was already held by the arm assembly) to a final coupling position, where an outlet of the end effector aligned with the pneumatic port of the gladhand receptacle. Alternatively or additionally, in some embodiments, the path can be planned from an end effector selection position to the final coupling position. Alternatively or additionally, the path can be planned from an initial stowed position to an end effector selection position and then on to the final coupling position. In some embodiments, the planning can include a return path of the robotic arm assembly without the end effector (e.g., after the end effector has been successfully coupled to the receptacle and thus released from the arm assembly), for example, to a stowed position. In some embodiments, the planning can be such that the path avoids moving or stationary obstacles.

At process block 308, the end effector can be moved along the planned path by the robotic arm assembly, for example, to the final coupling position. The method 300 can proceed to process block 310, where the coupling portion of the end effector at the final coupling position is connected to the gladhand receptacle. In some embodiments, the connection of process block 310 can include actuating the end effector, or a portion thereof, to securely mate with the gladhand receptacle, for example, by using opposing members to apply a clamping force to the receptacle between the opposing members. The method 300 can then proceed to process block 312, where pressurized air can be applied from the vehicle to the trailer via the connection between the end effector and the gladhand receptacle, for example, to apply pressure for releasing emergency brakes and/or apply pressure to engage service brakes. In some embodiments, once the end effector has been successfully engaged with the gladhand receptacle, the end effector can be disengaged from the robotic arm assembly (e.g., by terminating or altering magnetic attraction, by providing a mechanical separation force that exceeds a magnetic attraction between the assembly and the end effector, by sliding the end effector out of contact with the robotic arm assembly, by discontinuing vacuum application, by disengaging a securing member, etc.), and the robotic arm assembly can be returned to its stowed position or other position that does not obstruct movement of the trailer and/or vehicle.

Although illustrated separately, it is contemplated that various process blocks may occur simultaneously or iteratively. Furthermore, certain process blocks illustrated as occurring after others may indeed occur before. Although some of blocks 302-312 of method 300 have been described as being performed once, in some embodiments, multiple repetitions of a particular process block may be employed before proceeding to the next decision block or process block. In addition, although blocks 302-312 of method 300 have been separately illustrated and described, in some embodiments, process blocks may be combined and performed together (simultaneously or sequentially). Moreover, although FIG. 3 illustrates a particular order for blocks 302-312, embodiments of the disclosed subject matter are not limited thereto. Indeed, in certain embodiments, the blocks may occur in a different order than illustrated or simultaneously with other blocks. In some embodiments, method 300 may comprise only some of blocks 302-312 of FIG. 3.

III. Robotic Arm Assemblies

Figure 4A:
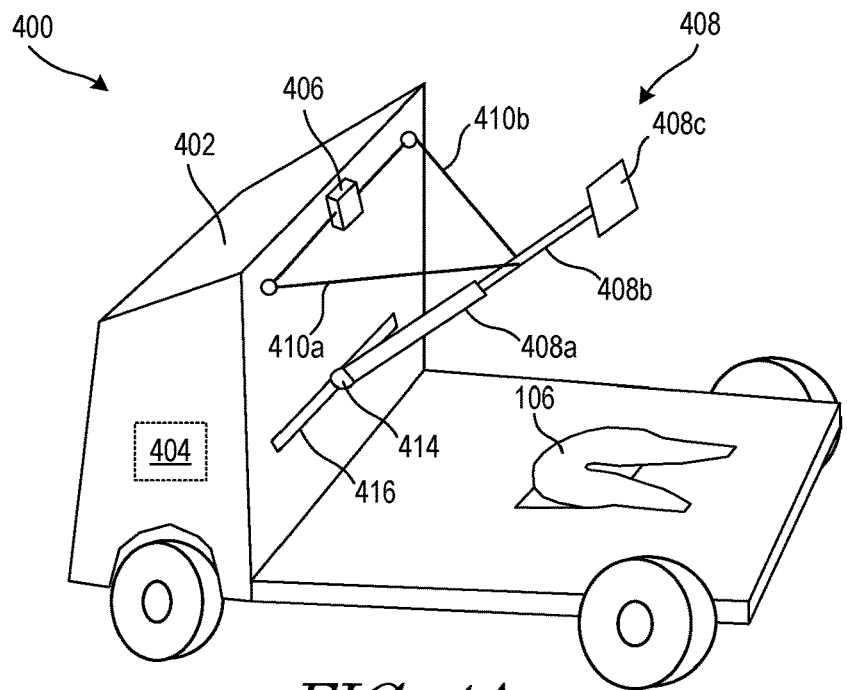
FIG. 4A shows a towing system with robotic arm assembly, according to one or more embodiments of the disclosed subject matter.

In some embodiments, a towing system 400 can have a vehicle 402 (e.g., an autonomous vehicle) with a robotic arm assembly (e.g., mounted to or part of a rear of a cabin of the vehicle 402), as shown in FIG. 4A. Operation of the robotic arm assembly and/or the vehicle 402 can be controlled by one or more controllers 404. In the illustrated example, the robotic arm assembly includes a linearly-extendable arm 408 formed by a first and second arm sections 408a, 408b. The first and second arm sections 408a, 408b can move axially with respect to each other so as to change an overall axial length of the arm 408. In some embodiments, one or more actuators (not shown) can be used to change the length of the arm 408. For example, the arm actuator can be a linear actuator coupled to or integrated with the arm 408. In some embodiments, each arm actuator can be provided with a feedback mechanism (e.g., incremental or absolute encoder, such as a linear or rotary encoder). In some embodiments, data from the feedback mechanism may be used in determining, or at least estimating, a pose of the arm 408, portions thereof (e.g., distal face 408c), and/or the end effector supported by the arm 408.

A pair of cables 410a, 410b can be used to move the linearly-extendable arm 408 about a pivot 414 (e.g., universal joint) attached to the rear of the vehicle 402, for example, via one or more cable actuators 406 (e.g., one or more winches) that can change respective lengths of the cables 410a, 410b independently. A distal face 408c of the second section 408b can serve as a mating portion for the detachable end effector. In some embodiments, the pivot 414 can be mounted on a linear traveler 416, for example, to allow additional degrees of freedom to address more complex trailer configurations. For example, the two cables 410a, 410b and the change in overall length of the arm 408 can provide three degrees of freedom at the end of the arm (e.g., distal face 408c). The linear traveler 416 can add a fourth degree of freedom that can be used to further control the attitude of the end effector and therefore provide service on a wider array of trailer configurations.

Figure 4B:
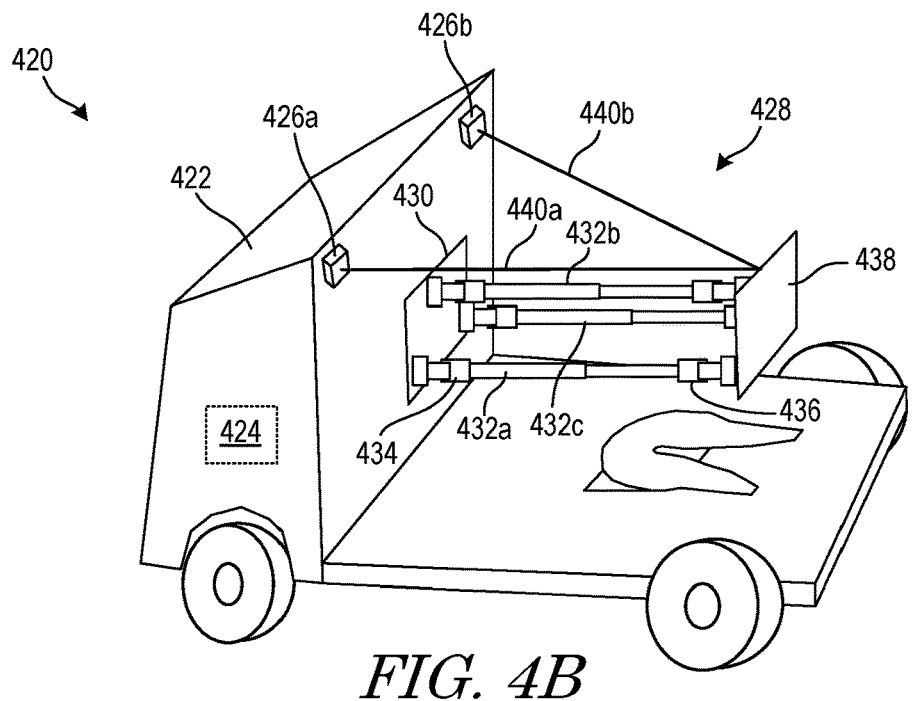
FIG. 4B shows a towing system with another robotic arm assembly, according to one or more embodiments of the disclosed subject matter.
Figure 4C:
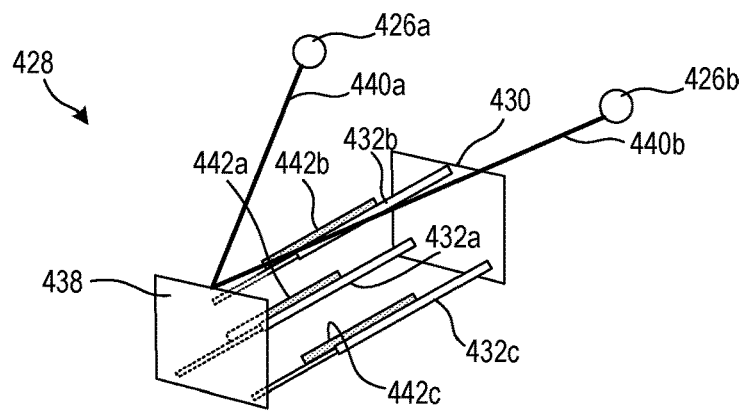
FIG. 4C shows features of the robotic arm assembly of FIG. 4B.

In some embodiments, the robotic arm assembly can employ multiple linearly-extendable arms and/or multiple arm actuators. For example, FIGS. 4B-4C shows another towing system 420 (e.g., an autonomous vehicle) with a robotic arm assembly 428 (e.g., mounted to or part of a rear of a cabin of the vehicle) having three linearly-extendable arms 432a-432c with respective arm actuators 442a-442c (e.g., linear actuators). In the illustrated example, the arms 432a-432c can have a substantially parallel arrangement. Each linearly-extendable arm 432a-432c can be coupled at one end to a base member 430 (e.g., support plate attached to the vehicle 422) by a first pivot 434 (e.g., universal joint) and at an opposite end to a distal member 438 (e.g., coupling plate for the end effector) by a second pivot 436 (e.g., universal joint). For clarity of illustration, the pivots have not been shown in FIG. 4C, and the arm actuators have not been shown in FIG. 4B. A pair of cables 440a, 440b, each with a respective cable actuator 426a, 426b (e.g., winch), can extend from a rear of the vehicle cabin to the distal member 438.

As with the above-described example, operation of the robotic arm assembly and/or the vehicle 422 can be controlled by one or more controllers 424. For example, the controller 424 can independently control the cable actuators 426a, 426b to change a length of the respective cable 440a, 440b and/or independently control the arm actuators 442a-442c to change a length of the respective arm 432a-432c, so as to change a position and pose of the distal member 438. In some embodiments, the pose of the distal member 438 can be dictated, at least in part, based on lengths of the arms 432a-432c. Alternatively or additionally, the distance of the distal member 438 along the longitudinal direction (e.g., front to rear) from the rear of vehicle 422 and/or from the front of the trailer can be dictated, at least in part, based on the lengths of the arms 432a-432c. In some embodiments, the distal member 438 can be moved in multiple dimensions in a vertical plane (e.g., in a plane perpendicular to the longitudinal direction) based at least in part on the movement of the cables 440a, 440b, while the lengths of the arms 432a-432c can passively control a pose of the distal member 438 (and thereby the end effector coupled thereto).

Figure 4D:
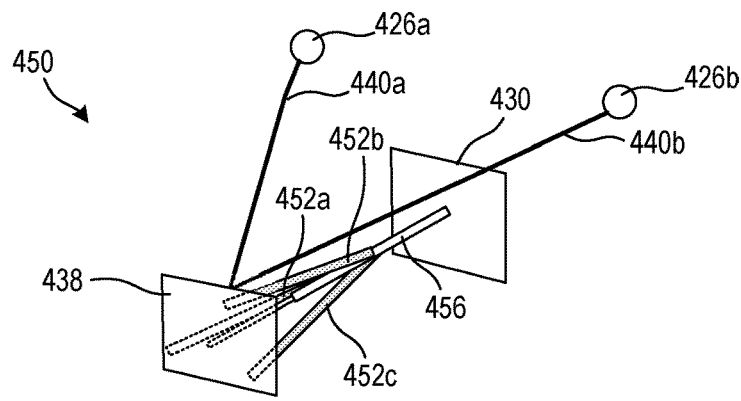
FIG. 4D shows features of another robotic arm assembly that can be employed in a towing system, according to one or more embodiments of the disclosed subject matter.

In some embodiments, the robotic arm assembly can employ a single linearly-extendable arm in combination with multiple arm actuators. For example, FIG. 4D shows another robotic arm assembly 450 similar to robotic arm assembly 428 in that both have a base member 430 (e.g., support plate attached to the vehicle), a distal member 438 upon which an end effector can be releasably supported, and a pair of cables 440a, 440b actuated by respective cable actuators 426a, 426b. However, in contrast to robotic arm assembly 428, the robotic arm assembly 450 in the example of FIG. 4D has only a single linearly-extendable arm 456, which can be coupled at a first end to base member 430 by a pivot (not shown; e.g., universal joint) and at an opposite second end to distal member 438 by another pivot (not shown; e.g., universal joint). In some embodiments, the second end of the linearly-extendable arm 456 can be arranged at about a center of the distal member 438. Moreover, the robotic arm assembly 450 has a trio of arm actuators 452a-452c (e.g., linear actuator), each arm actuator being coupled at a first end to the linearly-extendable arm 456 and at a opposite second end to the distal member 438. In some embodiments, the second ends of the arm actuators 452a-452c can be arranged on the distal member 438 equidistantly from the second end of the linearly-extendable arm 456.

In the illustrated example of FIG. 4D, the provision of a single arm lacks the capability to passively maintain pose control (as with the multi-arm arrangement); nevertheless, the provision of multiple arm actuators together with the cables and linearly-extendable arm can still offer full control over the location and pose of the distal member 438. For example, the distance of the distal member 438 along the longitudinal direction from the rear of the vehicle 422 and/or from the front of the trailer can be dictated, at least in part, based on the lengths of the arm actuators 452a-452c. Moreover, the distal member 438 can be moved in multiple dimensions in a vertical plane (e.g., in a plane perpendicular to the longitudinal direction) based at least in part on the movement of the cables 440a, 440b, while the lengths of the arm actuators 452a-452c can control arm assembly length as well as distal end pose (and thereby the end effector coupled thereto).

IV. Pneumatic Line Positioning

In some embodiments, the pneumatic line 108 from the vehicle is connected to the end effector throughout operation, including while the robotic arm assembly moves the end effector to connect with the gladhand receptacle as well as after the gladhand connection is made and the robotic arm assembly is returned to a stowed position. The pneumatic line 108 may thus be susceptible to getting snagged on something as the robotic arm assembly positions the end effector for coupling or otherwise tugging on the end effector during manipulation, which could lead to misalignment between the end effector and the gladhand receptable and/or damage to the towing system. Accordingly, in some embodiments, the towing system may employ one or more hose support mechanisms, for example, active or passive means that prevents the pneumatic line from interfering with operation of the robotic arm assembly.

Figure 5A:
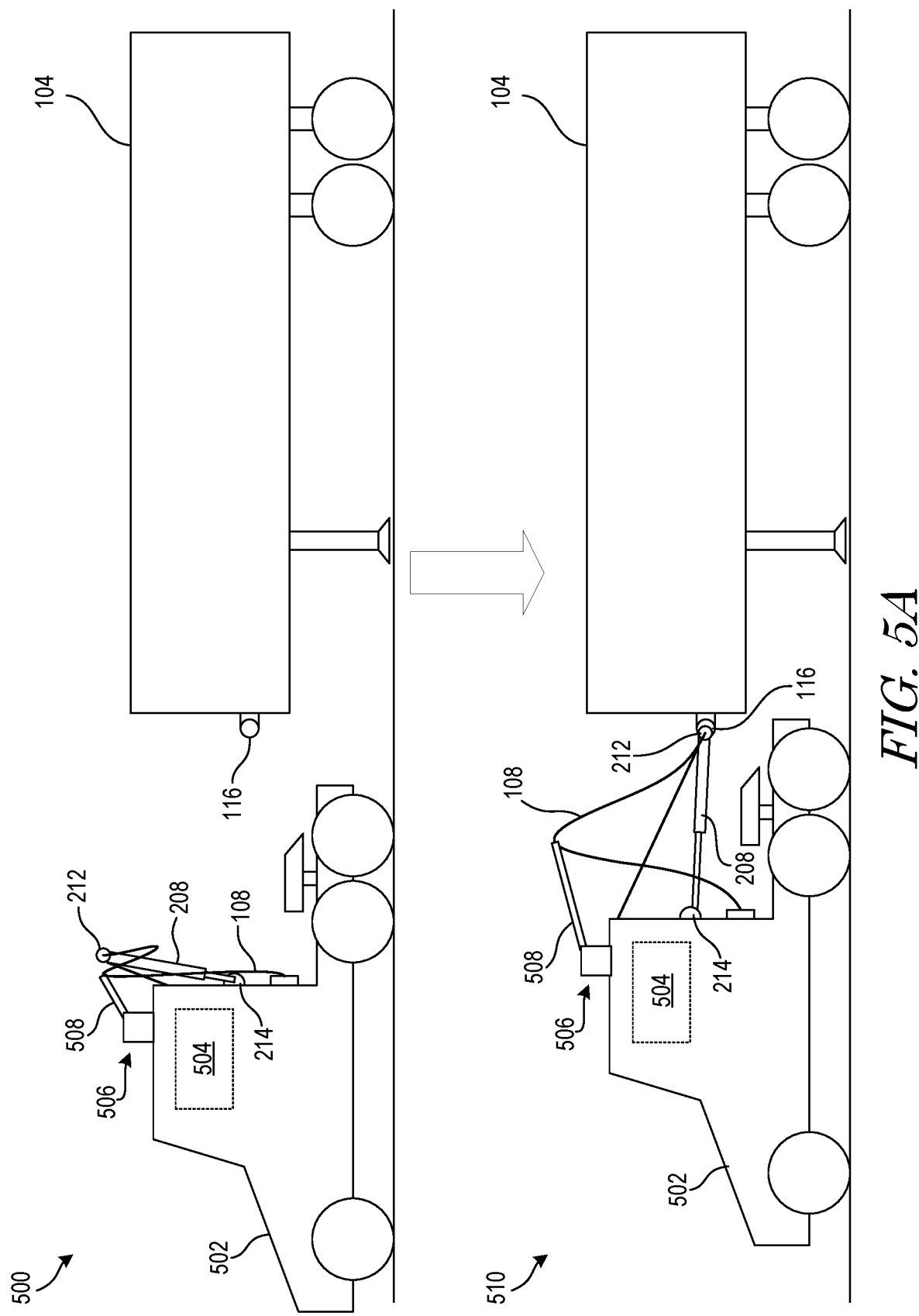
FIG. 5A shows aspects of a gladhand coupling system with pneumatic line support, according to one or more embodiments of the disclosed subject matter.

For example, FIG. 5A illustrates a vehicle 502 with a pneumatic line support system 506 and trailer 104 with gladhand receptacle 116, during an approach stage 500 and gladhand coupling stage 510. In the illustrated example, the pneumatic line support system 506 comprises gallows 508 that supports the pneumatic line 108 at an intermediate point along its length. The gallows 508 can actively move the pneumatic line 108 as the telescoping arm 208 moves the end effector 212 to the gladhand receptacle 116 for coupling, for example, to avoid or at least reduce any tension on the end effector 212 from the pneumatic line 108 and/or avoid snagging of the pneumatic line on vehicle features, trailer features, and/or obstacles between the vehicle and trailer. For example, operation of the gallows 508 can be controlled by controller 504, which may be separate from or part of a controller that operates the robotic arm assembly and/or a controller that operates vehicle 502. Alternatively, in some embodiments, gallows 508 can employ a passive following modality, for example, using one or more springs to support the pneumatic line 108. Although shown mounted on (or an integral part of) a roof of the vehicle cabin, the pneumatic line support system 506 can be mounted on (or form an integral part of) any other part of the vehicle, such as but not limited to a rear wall of the cabin, a part of the rear frame of the vehicle between the cabin and the fifth-wheel connector 106, or a side wall of the cabin. Alternatively, in some embodiments, the pneumatic line support system 506 can be mounted on or form an integral part of the robotic arm assembly.

Instead of or in combination with the one or more hose support mechanisms, in some embodiments, the towing system may employ a hose dispensing mechanism, for example, active or passive means that controls an exposed length of the pneumatic line during operation of the robotic arm assembly. For example, FIG. 5B illustrates a vehicle 522 with a pneumatic line dispenser 526, during an approach stage 520 and gladhand coupling stage 530. The pneumatic line dispenser 526 (e.g., retractable hose reel) can dispense the pneumatic line 108 on as-needed basis, for example, to avoid, or at least reduce, the likelihood of the pneumatic line snagging on vehicle features, trailer features, and/or obstacles between the vehicle and trailer. For example, operation of the pneumatic line dispenser 526 can employ a passive modality, for example, spring-driven construction, that automatically dispenses pneumatic line in response to a pulling force exceeding a predetermined threshold and automatically retracts the pneumatic line in response to the pulling force being below the predetermined threshold. Alternatively, in some embodiments, pneumatic line dispenser 526 can employ an active modality, for example, a motor-drive dispensing/retraction mechanism (e.g., winch). In some embodiments, operation of such an active modality can be controlled by controller 524, which may be separate from or part of a controller that operates the robotic arm assembly and/or a controller that operates vehicle 502. For example, the active modality can be controlled by controller 524 to dispense or retract pneumatic line 108 in coordination with movement of the robotic arm assembly.

V Robotic Arm and End Effector Assemblies

Figure 6A:
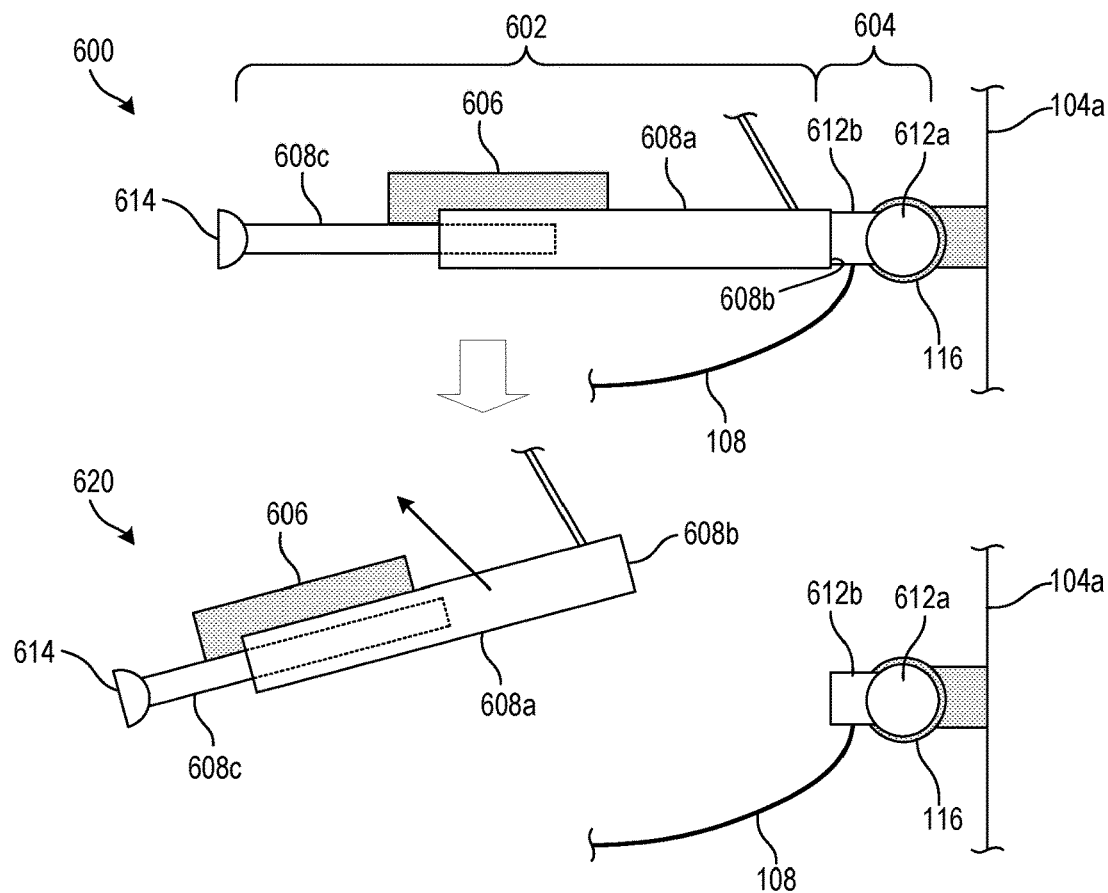
FIGS. 6A-6G shows various configurations for robotic arm assemblies with detachable end effectors, according to one or more embodiments of the disclosed subject matter.

Referring to FIG. 6A, a robotic arm assembly 602 and detachable end effector 604 are shown during gladhand coupling stage 600 and arm stowing stage 620. In the illustrated example, the robotic arm assembly 602 includes pivot 614 (e.g., universal joint), arm actuator 606 (e.g., linear actuator), and a telescoping arm formed by a first arm section 608a and a second arm section 608c. The second arm section 608c can be coupled to and extend from pivot 614, and the first arm section 608a can be coupled to and extend from the second arm section 608c. The arm actuator 606 can be used to move the first section 608a and/or the second section 608c axially with respect to each other. A distal face 608b of the first section 608a can serve as a mating portion for the detachable end effector 604.

In the illustrated example of FIG. 6A, the end effector 604 can include a gladhand coupling portion 612a and a mating frame 612b. The mating frame 612b can be releasably coupled to the distal face 608b of the first arm section 608a. In some embodiments, the pneumatic supply line 108 can be connected to the end effector 604, for example, via the mating frame 612b. In some embodiments, an electrical power line (not shown) may also be provided to the end effector 604, for example, to power a motor or other actuator of the end effector 604 that actuates the coupling portion 612a (e.g., to clamp to the gladhand receptacle 116). Alternatively or additionally, in some embodiments, the electrical power can be provided to the end effector 604 through the robotic arm assembly 602, for example, via the mating surface 608b (e.g., electrical contacts on the mating surface 608b, inductive power transfer via the mating surface 608b, etc.)

In some embodiments, the releasable mating between the robotic arm assembly and the end effector can include one or more features for aligning the end effector to the robotic arm assembly, for example, such that a location of the coupling portion of the end effector can be more reliably determined based on a known or detected location of the mating surface 6008b of the robotic arm assembly. In addition, the releasable mating can be provided via any type of mechanism, such as but not limited to magnetic attraction between mating surfaces, vacuum applied between mating surfaces, a mechanically-actuatable latching mechanism, and a passive latching mechanism (e.g., spring catch).

Figure 6B:
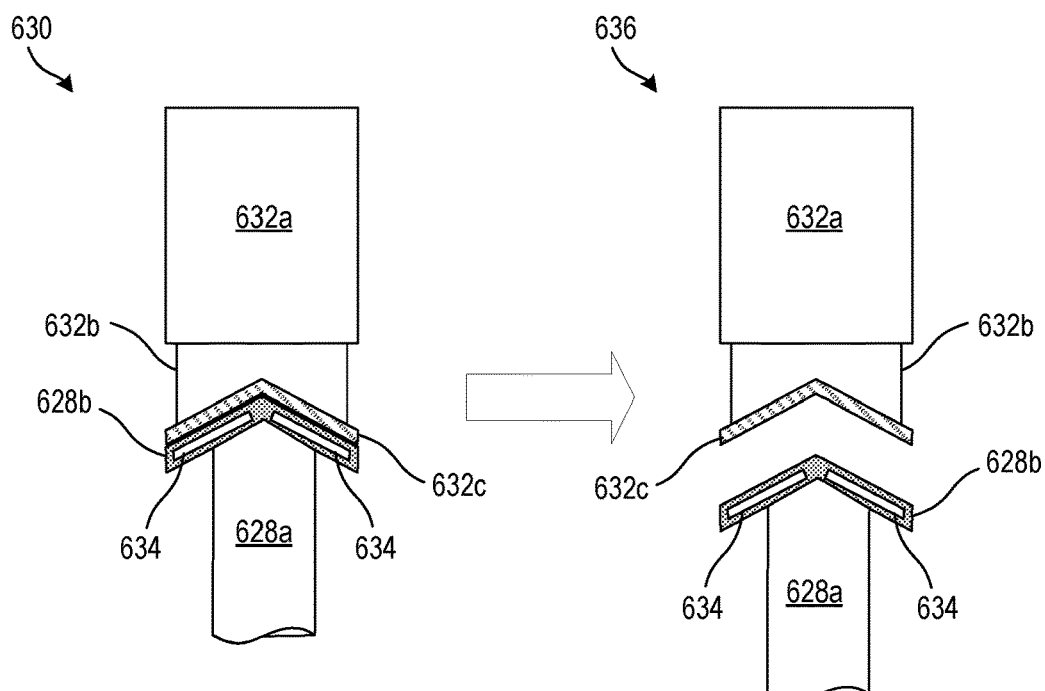

For example, FIG. 6B illustrates exemplary configurations of an end effector and mating surface of a robotic arm assembly for alignment, in an engaged state 630 and a disengaged state 636. In the illustrated example, the end effector has a coupling portion 632a and a mating frame 632b with a mating surface or member 632c (e.g., a V-shaped metal plate), and the robotic arm assembly has a first arm section 628a with a mating surface or member 628b having a shape complementary to that of the end effector mating surface 632c (e.g., negative equivalent). The complementary shapes of the end effector mating member 632c and robotic arm assembly mating member 628b can help to align the two together. In addition, the arm mating member 628b can include one or more electromagnets 634, which can be energized during the engaged state 630 to provide an attractive magnetic force to end effector mating member 632c and which can be de-energized during the disengaged state 636 to allow the end effector to remain with and attached to the gladhand receptacle.

Figure 6C:
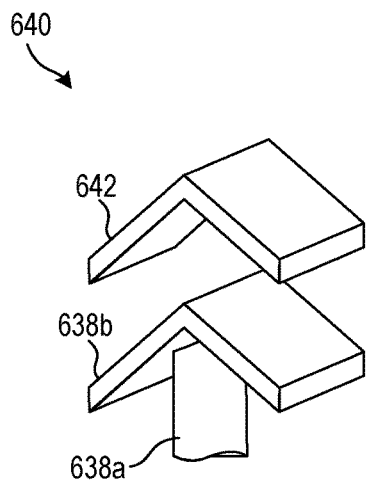
Figure 6D:
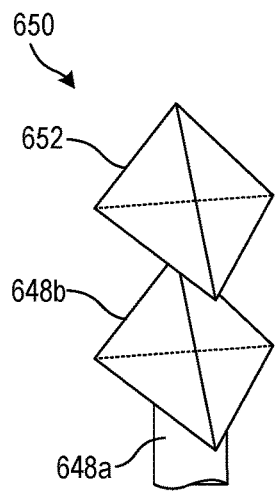
Figure 6E:
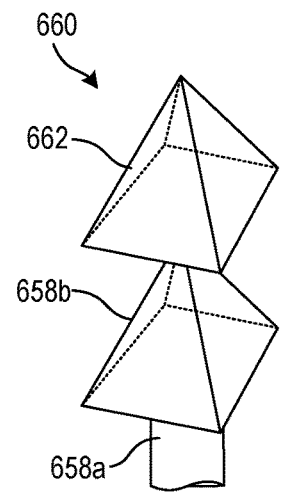

Different mechanical and geometric configurations can be used for the mating between end effector and the robotic arm assembly. For example, FIG. 6C illustrates a mating configuration 640, where the end effector has a V-shaped mating member 642 and the distal section 638a of the robotic arm assembly has a complementary V-shaped mating member 638b. In addition to providing alignment, the mating configuration 640 can also enhance stiffness of the mating along a single direction. FIG. 6D shows another example of a mating configuration 650, where the end effector has a triangular-base pyramid-shaped mating member 652 and the distal section 648a of the robotic arm assembly has a complementary triangular-base pyramid-shaped mating member 648b. In addition to providing alignment, the mating configuration 650 can also enhance stiffness of the mating along two orthogonal directions. FIG. 6E shows another example of a mating configuration 660, where the end effector has a square-base pyramid-shaped mating member 662 and the distal section 658a of the robotic arm assembly has a complementary square-base pyramid-shaped mating member 658b. Similar to mating configuration 650, mating configuration 660 can provide both alignment and stiffness enhancement along two orthogonal directions. Other shapes for the mating members are also possible according to one or more contemplated embodiments.

Figure 6F:
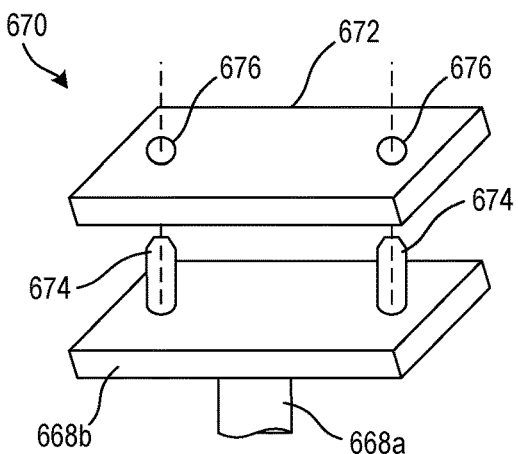

In some embodiments, the mating members of the end effector and robotic arm assembly can have a substantially planar configuration, which may simplify manufacture of the coupling system. However, such planar mating surfaces may be susceptible to misalignment or disconnection (e.g., due to sliding of the end effector across the mating surface of the robotic arm assembly). In some embodiments, one or both mating surfaces can be provided with features to encourage alignment of the end effector and/or to discourage undesirable displacement of the end effector with respect to the robotic arm assembly prior to desired disengagement (e.g., once the end effector is successfully coupled to the gladhand receptacle). For example, FIG. 6F shows another example of a mating configuration 670, where the end effector has a planar-shaped mating member 672 with one or more alignment features 676 (e.g., through-holes or blind recesses) and the distal section 668a of the robotic arm assembly has a planar-shaped mating member 668b with one or more complementary alignment features 674 (e.g., pins or tapered projections). During the engaged state, interaction between alignment features 674, 676 (e.g., insertion of a pin into a respective hole) can help align the mating members 668b, 672 together as well as enhance stiffness of the mating.

Figure 6G:
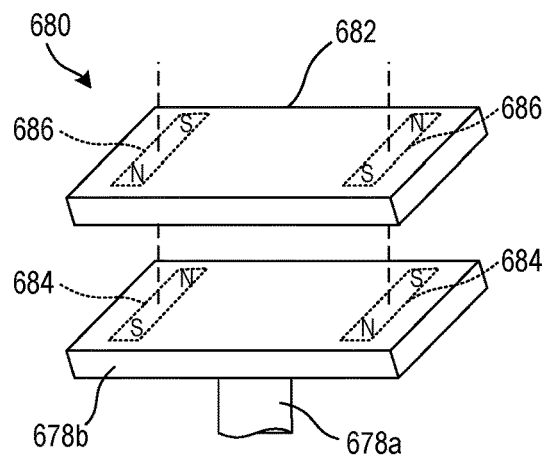

Alternatively or additionally, the mating members can be urged into a desired alignment via an appropriate arrangement of permanent magnets. For example, FIG. 6G shows another example of a mating configuration 680, where the end effector has a planar-shaped mating member 682 with first arrangement of permanent magnets 686 and the distal section 678a of the robotic arm assembly has a planar-shaped mating member 678b with a second arrangement of permanent magnets 684. The first arrangement of permanent magnets 686 can be opposite to that of the second arrangement of permanent magnets 684. The attraction between the opposite poles of the magnets can provide a passive force that draws the opposite poles together, thereby automatically aligning the mating members 678b, 682.

In some embodiments, displacement of the end effector with respect to the mating surface of the robotic arm assembly during the engaged state (e.g., prior to the end effector being coupled to the gladhand receptable of the trailer) can lead to premature separation of the end effector from the robotic arm assembly (e.g., sliding off of the robotic arm assembly mating surface), which can damage the end effector or at least delay successful gladhand coupling. In some embodiments, the coupling system can be provided with means for monitoring displacement of the end effector, for example, with respect to the mating surface of the robotic arm assembly.

Figure 6H:
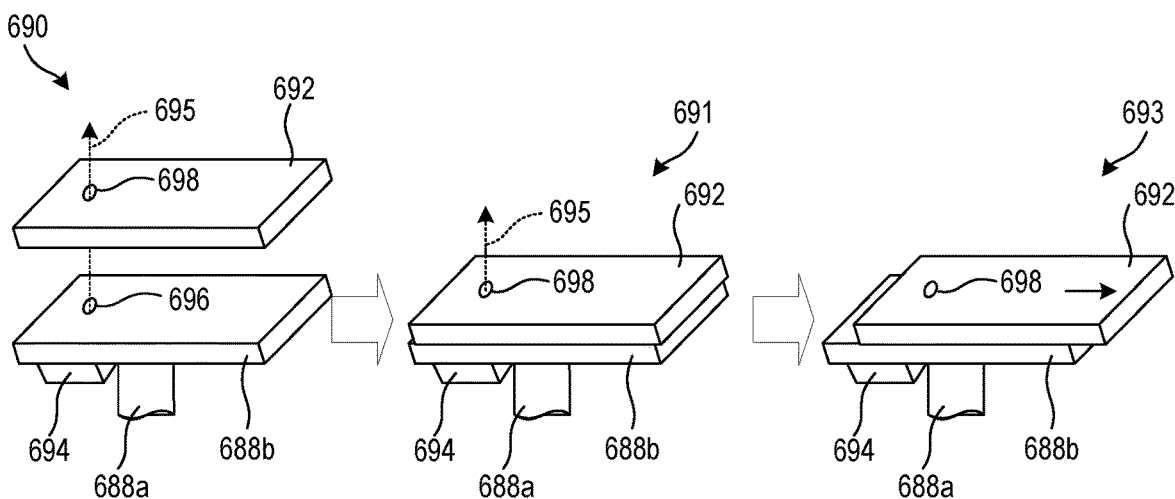
FIG. 6H shows a configuration for a robotic arm assembly with detachable end effector and a position detection mechanism, according to one or more embodiments of the disclosed subject matter.

For example, FIG. 6H shows an example of a mating configuration in a disengaged state 690 and an engaged state 691. The end effector can have a planar-shaped mating member 692, and the distal section 688a of the robotic arm assembly can have a planar-shaped mating member 688b. The robotic arm assembly can also be provided with a displacement sensor 694, which shines a light beam through interrogating path 696 (e.g., through-hole) in the mating member 688b and through confirmation path 698 (e.g., through-hole) in the mating member 692. In the engaged state 691 with mating members 688b, 692 aligned, the light beam can travel through both paths 696, 698. However, in a misaligned state 693, the mating member 692 of the end effector becomes displaced with respect to the mating member 688b of the robotic arm assembly, and the confirmation path 698 is no longer aligned with the interrogation path 696. The displacement sensor 694 can detect this obstruction to the light path, for example, by detecting reflection of the light beam from the mating member 692 of the end effector. In response to the detected obstruction, motion of the robotic arm assembly may be stopped or paused, for example, if the displacement suggests that the end effector is in danger of being knocked off the mating member 688b (e.g., due to interaction with an obstacle).

Although the example of FIG. 6H has the displacement sensor 694 with the robotic arm assembly, it is also possible for the end effector to include a displacement sensor (in addition to or in place of displacement sensor 694). Moreover, although FIG. 6H illustrates a particular configuration for displacement sensor 694, embodiments of the disclosed subject matter are not limited thereto. Rather other displacement sensor configurations and/or sensors for monitoring the location of the end effector with respect to the mating surface of the robotic arm assembly are also possible according to one or more contemplated embodiments.

VI. End Effector Selection

In some embodiments, a single robotic arm assembly can be used to sequentially or separately connect multiple end effectors to respective receptacles on a trailer. For example, the robotic arm assembly can be used to connect one end effector to a service brake gladhand receptacle on the trailer, and to subsequently connect another end effector to an emergency brake gladhand receptacle on the trailer. Alternatively or additionally, the robotic arm assembly can connect other end effectors to other pneumatic gladhand receptacles (e.g., for air-actuated machinery aboard the trailer) and/or to non-gladhand receptacles (e.g., connectors for electrical power). In some embodiments, the towing system (e.g., vehicle plus coupling system) can be provided with a library of multiple different end effectors, from which the robotic arm assembly can select. In some embodiments, the end effector library can comprise an active tool changer (e.g., that selects, dispenses, and/or positions one end effector from a plurality of end effectors for mating with the robotic arm assembly) or a passive holder or magazine (e.g., where the robotic arm assembly can pick from a plurality of end effectors in an array)

Figure 7A:
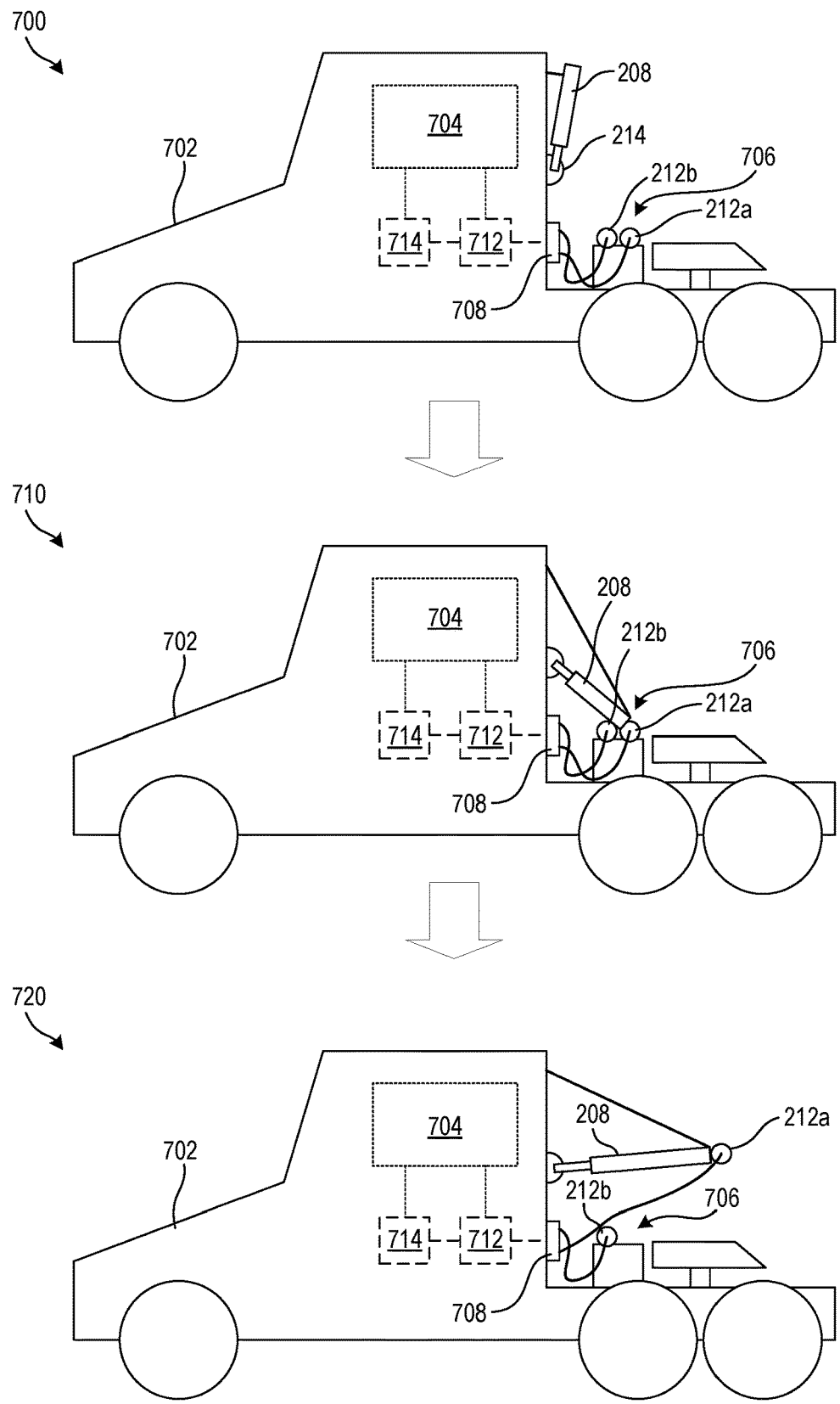
FIG. 7A shows aspects of a gladhand coupling system with multiple end effectors, according to one or more embodiments of the disclosed subject matter.

For example, FIG. 7A illustrates a towing system 700 with end effector holder 706, during end effector selection 710 and coupling 720 stages. In the illustrated example, the towing system 700 has a vehicle 702 (e.g., autonomous vehicle), a telescoping arm 208 connected to the vehicle 702 via position control members 210 (e.g., cables) and pivot 214, and a holder 706 that passively holds end effectors 212a, 212b for selection. Although only two end effectors are shown in FIG. 7A, any number of end effectors can be housed by holder 706. In the selection stage 710, the telescoping arm 208 can move a mating end thereof to the holder 706 and can select an appropriate end effector, for example, based on its position within the holder 706. The selected end effector 212a can be mated to the distal end of the telescoping arm 208 (e.g., via magnetic attraction, vacuum application, mechanical connection, or other means) and positioned by the telescoping arm 208 for coupling to the appropriate gladhand receptacle during the coupling stage 720.

In some embodiments, the towing system can be configured to selectively energize the coupled end effector, for example, without energizing other unused end effectors in the library. For example, the vehicle 702 can have a pneumatic source 714 that provides a supply of pressurized air for use by the end effectors 212a, 212b, as shown in FIG. 7A. The vehicle 702 can also have a manifold 712 (e.g., comprising one or more valves), which can direct the pressurized air from source 714 to one or more of the pneumatic lines coupled to vehicle interface 708 at one end thereof and to one of the end effectors 212a, 212b at an opposite end thereof. In some embodiments, operation of the manifold 712 and/or the pneumatic source 714 can be controlled by controller 704, which may be separate from or part of a controller that operates the robotic arm assembly and/or a controller that operates vehicle 702. In some embodiments, the pressurized air can be directed via manifold 712 based at least in part on the location that the telescoping arm 208 picked up the end effector 212a from the holder 706 (or position of a tool changer during pickup, if an active mechanism), the location of gladhand receptacle coupled to the end effector 212a, and/or presence/absence of sensing at the end effector 212a.

Figure 7B:
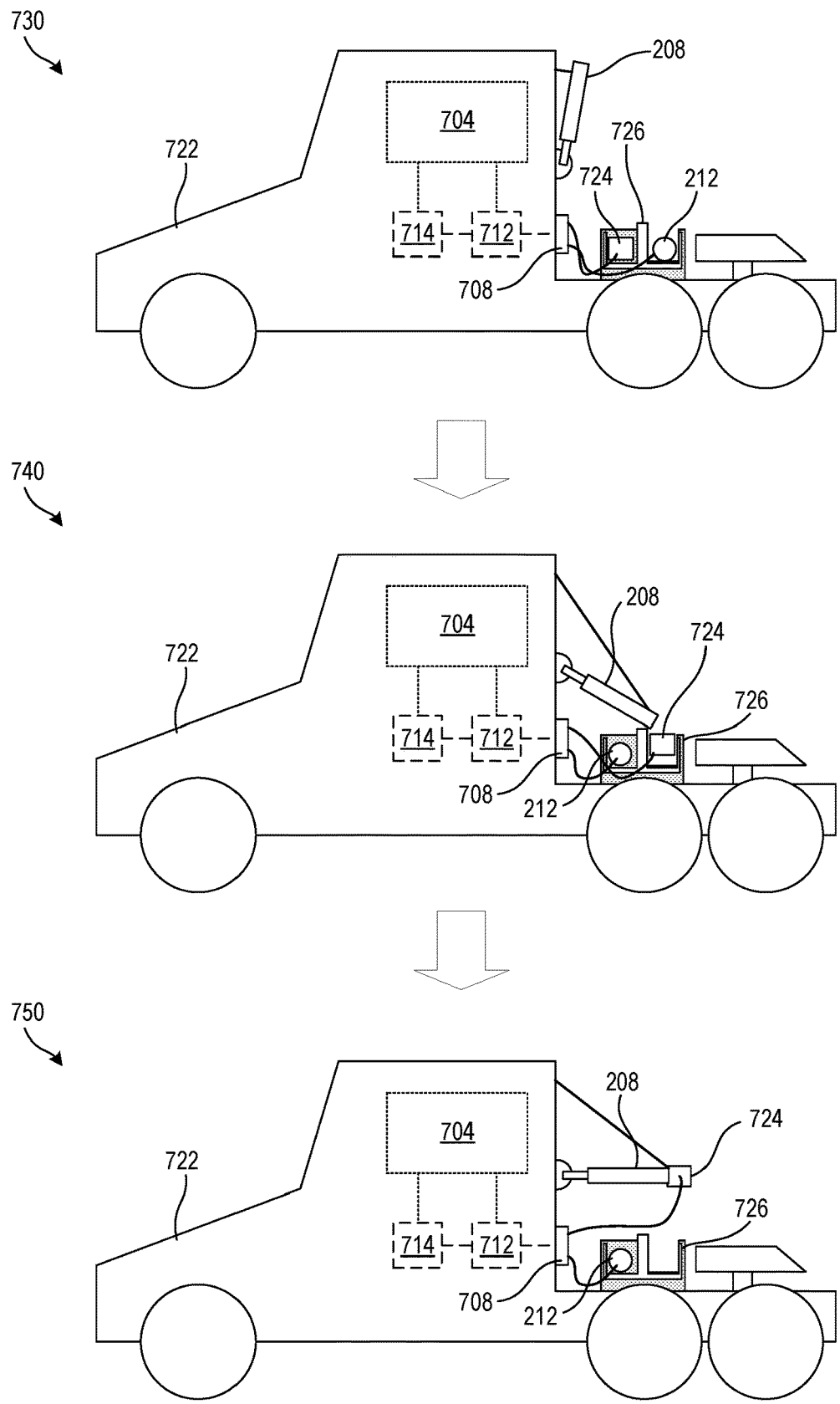
FIG. 7B shows aspects of a gladhand coupling system with selectable end effector library, according to one or more embodiments of the disclosed subject matter.

FIG. 7B illustrates another towing system 730 during selection 740 and coupling 750 stages. In the illustrated example, the towing system 730 has a vehicle 722 (e.g., autonomous vehicle), a telescoping arm 208 connected to the vehicle 722 via position control members 210 and pivot 214, and an active tool changer 726 that can move the end effectors and/or dispense one of the end effectors for selection. Although only two end effectors are shown in FIG. 7B, the tool changer 726 can be in charge of any number of end effectors. In some embodiments, the active tool changer 726 can be a rotary or actuatable carousel-type device, for example, that spins to present a new end effector to the mating end of the telescoping arm 208. For example, in the selection stage 740, tool changer 726 can rotate a selected end effector 724 to a selection outlet, and the telescoping arm 208 can move a mating end thereof to the selection output to pick up the selected end effector 724. The selected end effector 724 can be mated to the distal end of the telescoping arm 208 (e.g., via magnetic attraction, vacuum application, mechanical connection, or other means) and positioned by the telescoping arm 208 for coupling to the appropriate receptacle (e.g., gladhand or otherwise) during the coupling stage 750.

Figure 7C:
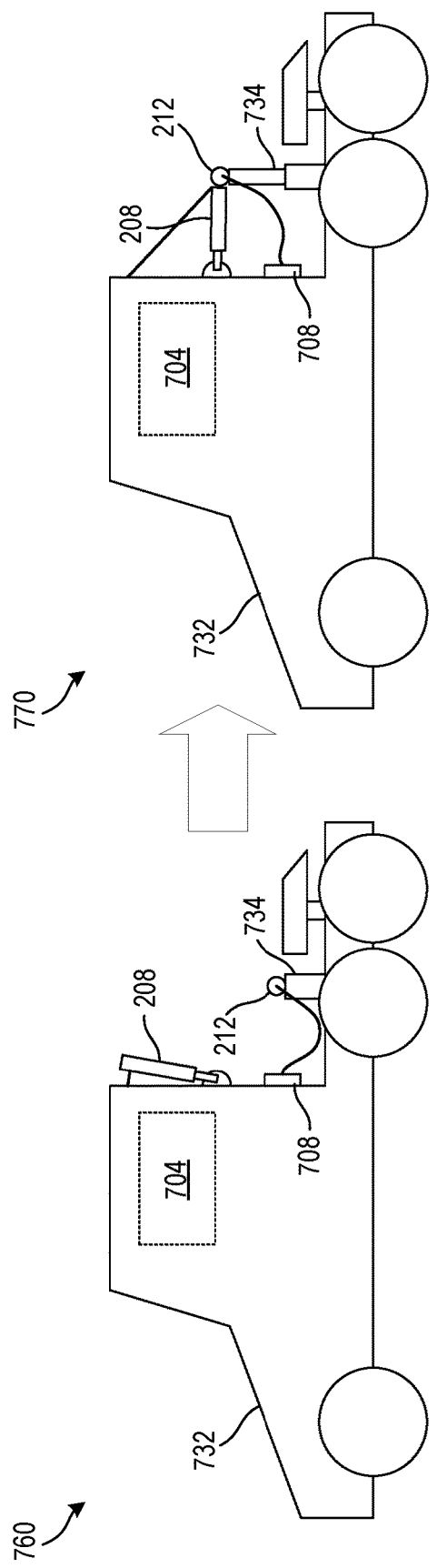
FIGS. 7C-7D shows aspects of gladhand coupling systems with end effector selectors, according to one or more embodiments of the disclosed subject matter.
Figure 7D:
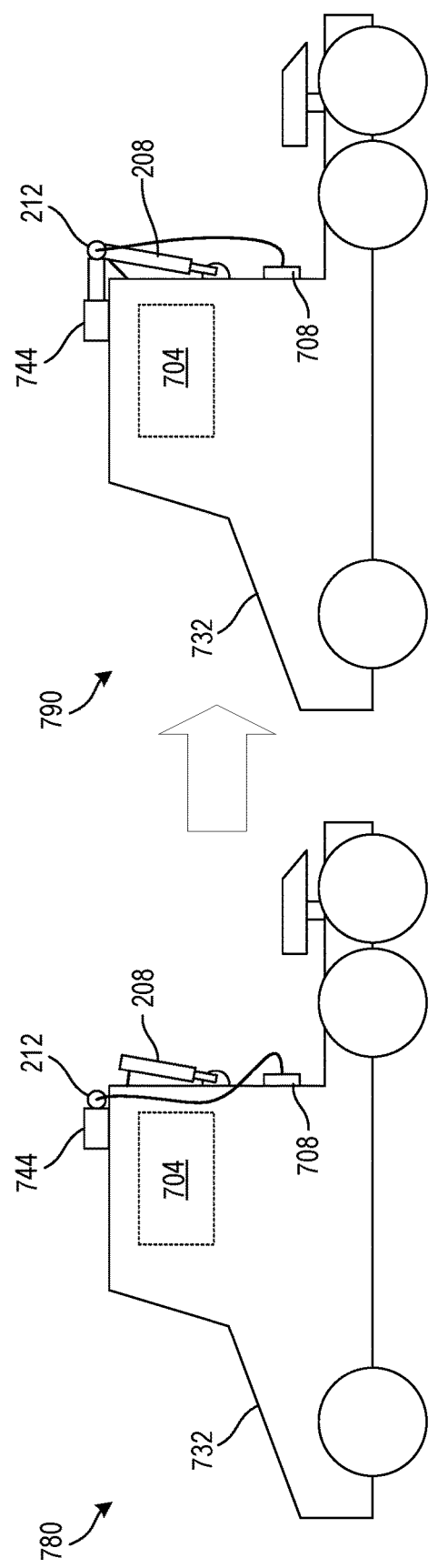

FIG. 7C illustrates another towing system 760 during a connection stage 770. In the illustrated example, the towing system 760 has a vehicle 732 (e.g., autonomous vehicle), a telescoping arm 208 connected to the vehicle 732 via positioning cables and a pivot, and a secondary robotic arm assembly 734. In some embodiments, the secondary robotic arm assembly 734 can select an end effector 212 for subsequent receptacle coupling by the telescoping arm 208. In the connection stage 770, the secondary robotic arm assembly 734 can deliver the selected end effector 212 to the mating end of the telescoping arm 208. In the illustrated example of FIG. 7D, the secondary robotic arm assembly 734 is mounted on a frame of the vehicle between the cabin and the fifth-wheel connector. However, other locations and/or configurations for the secondary robotic arm assembly are also possible according to one or more contemplated embodiments. For example, FIG. 7D illustrates another towing system 780 during a connection stage 790, where a secondary robotic arm assembly 744 can be mounted on a roof of a cabin of the vehicle 732.

VII. End Effectors with Gladhand Couplers

Figure 8B:
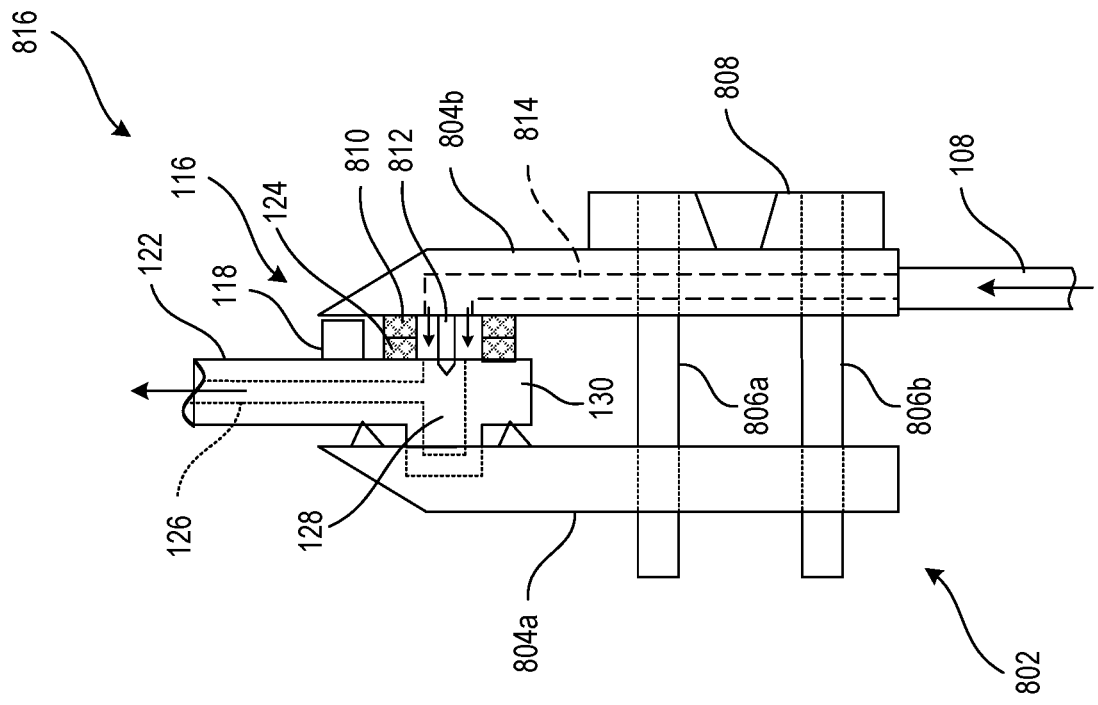
FIGS. 8A-8B show simplified cross-sectional views of gladhand coupling with end effector in initial positioning and secured configurations, respectively, according to one or more embodiments of the disclosed subject matter.
Figure 8A:
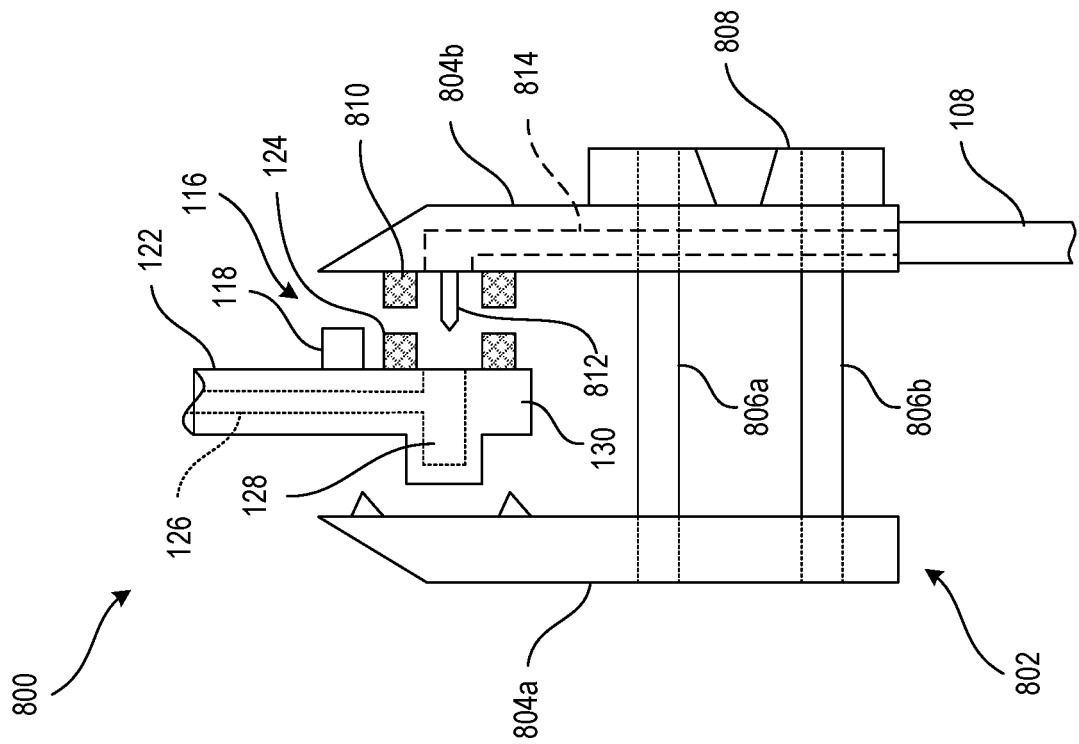

In some embodiments, the end effector can connect to the existing gladhand receptacle by clamping around the receptacle. For example, FIGS. 8A-8B illustrate an exemplary coupling operation between an end effector 802 and gladhand receptacle 116, in particular an initial alignment stage 800 and a coupling stage 816. As discussed above, the gladhand receptacle 116 can include a sealing member 124 (e.g., rubber gasket) surrounding pneumatic port 128, which in turn connects to the pneumatic line 126 of the trailer braking system via connector station 120. In the illustrated example, the end effector 802 employs a clamping mechanism to securely couple to the gladhand receptacle 116, for example, by movement of opposing clamping members 804a, 804b toward (e.g., to couple to the receptacle 116) or away (e.g., to disengage from the receptacle 116) from each other. The second clamping member 804b can have a second sealing member 810 (e.g., rubber gasket) surrounding an alignment member 812 (e.g., pin or projection) that mates with or fits into the pneumatic port 128 upon clamping, as shown in FIG. 8B. The alignment member 812 may aid in correct positioning of the end effector 802 with respect to the gladhand receptacle 116, as well as improve stability of the connection once fully clamped.

In some embodiments, the clamping members 804a, 804b can be connected together via one or more actuation members 806a, 806b (e.g., screws), and one or more drive motor 808 (e.g., electric motor) can be used to reposition the clamping members 804a, 804b along the actuation members 806a, 806b, for example, to change a distance between the clamping members 804a, 804b and/or to provide a clamping force to the receptacle 116 disposed between the clamping members, as shown in FIG. 8B. Alternatively, in some embodiments, the clamping motion and/or clamping force can be provided via a spring mechanism. In such configurations, an actuator on the end effector or on the robotic arm assembly can be used to hold the clamping members 804a, 804b open against the spring force, for example, during the alignment stage 800 and/or when disconnecting the end effector from the receptacle 116.

Figure 8C:
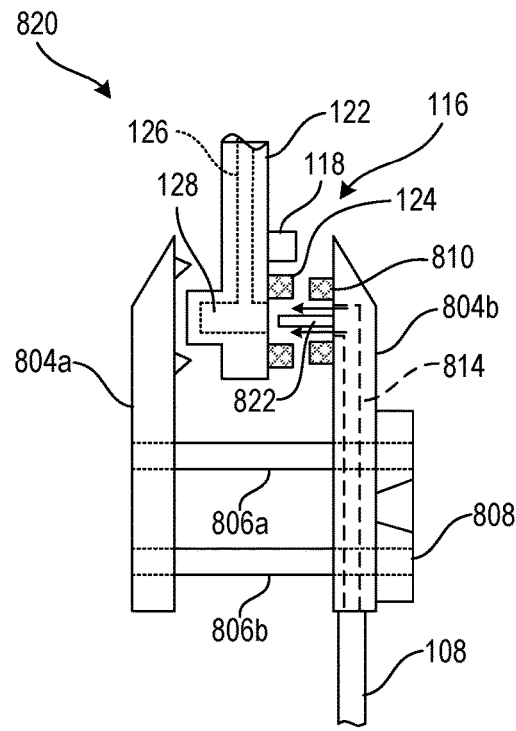
FIGS. 8C-8D shows simplified cross-sectional views of gladhand coupling with different alignment pin configurations, according to one or more embodiments of the disclosed subject matter.
Figure 8D:
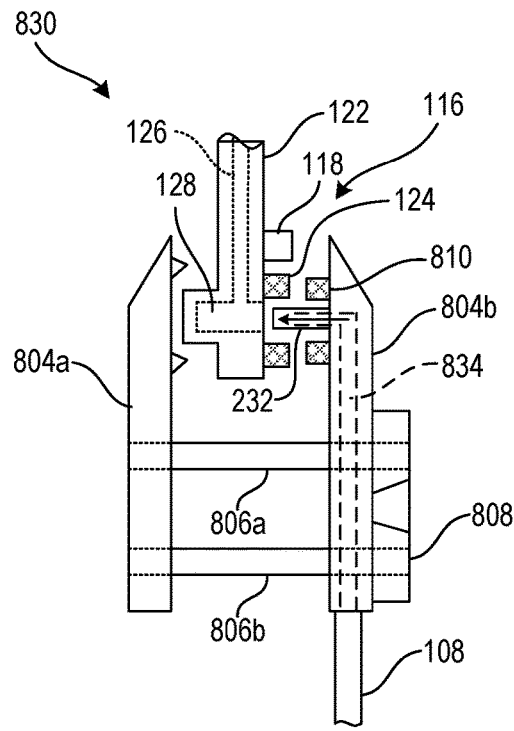

In the illustrated example of FIGS. 8A-8B, the alignment member 812 has a pointed or tapered tip. However, other configurations for the alignment member are also possible, such as but not limited to the blunt tip alignment pin 822 (e.g., constant width along its length) illustrated in configuration 820 of FIG. 8C or a rounded tip alignment pin (not shown). In the illustrated examples of FIGS. 8A-8C, pressurized air from the pneumatic line 108 flows around alignment member 812 into the pneumatic port 128 of gladhand receptacle 116. For example, adjacent to and/or between sealing member 810 and the alignment member (e.g., 812 in FIGS. 8A-8B, or 822 in FIG. 8C), one or more outlet ports can be provided to allow pressurized air applied via internal conduit 834 and pneumatic line 108 to be communicated to the pneumatic line 126 via pneumatic port 128. However, other air flow configurations are also possible. For example, the alignment member itself can include one or more outlet ports, such as but not limited to open-ended alignment member 832 illustrated in configuration 830 of FIG. 8D.

Unlike conventional gladhand coupling, the clamping end effectors of FIGS. 8A-8D do not require the use of the existing alignment/locking brackets (e.g., alignment member 118 and detent plate 130) of the gladhand receptacle 116 provided on the trailer side, which use would otherwise require a rotation around the center axis of the sealing member 124 that cannot be easily automated without large sequential robotic arms. Instead, secure coupling can be effected in embodiments of the disclosed subject matter without rotation by using an end effector with clamping mechanism. In addition, the alignment member of the end effector can be inserted into the hole of the sealing member 124 and/or the pneumatic port 128 of the gladhand receptacle 116 on the trailer side, which insertion can help maintain alignment and/or reduce issues with sealing between sealing members 124, 810.

Figure 8E:
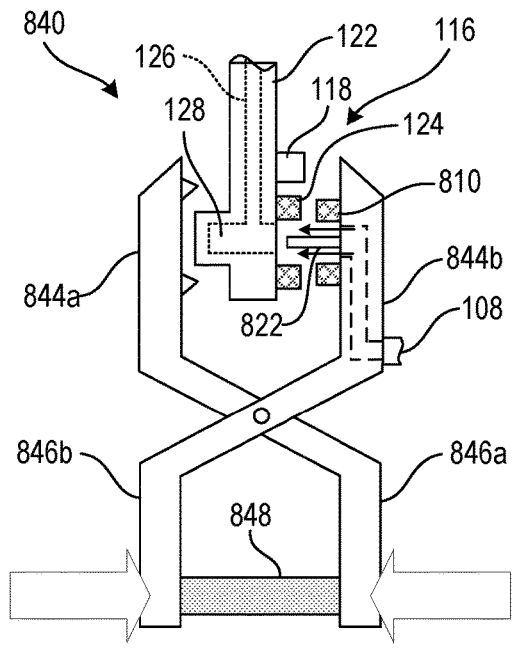
FIG. 8E shows a simplified cross-sectional view of gladhand coupling employing a scissor-style actuation mechanism, according to one or more embodiments of the disclosed subject matter.

Although FIGS. 8A-8D illustrate one type of clamping mechanism, embodiments of the disclosed subject matter are not limited thereto. Rather, other clamping mechanisms are also possible according to one or more contemplated embodiments. For example, FIG. 8E illustrates an exemplary configuration 840 for an end effector that employs a scissor-style mechanism (or locking-plyer-style mechanism), where a squeezing force applied to actuation ends 846a, 846b causes clamping via first and second arms 844a, 844b. In some embodiments, the squeezing force can be applied by an electric motor, such as motor 808 of FIGS. 8A-8D. Alternatively or additionally, in some embodiments, the squeezing force can be applied via a pneumatic actuator or hydraulic actuator, such as pneumatic actuator 848 in FIG. 8E. Alternatively or additionally, in some embodiments, the squeezing force can be applied via one or more springs, for example, extending between actuations ends 846a, 846b.

Figure 8F:
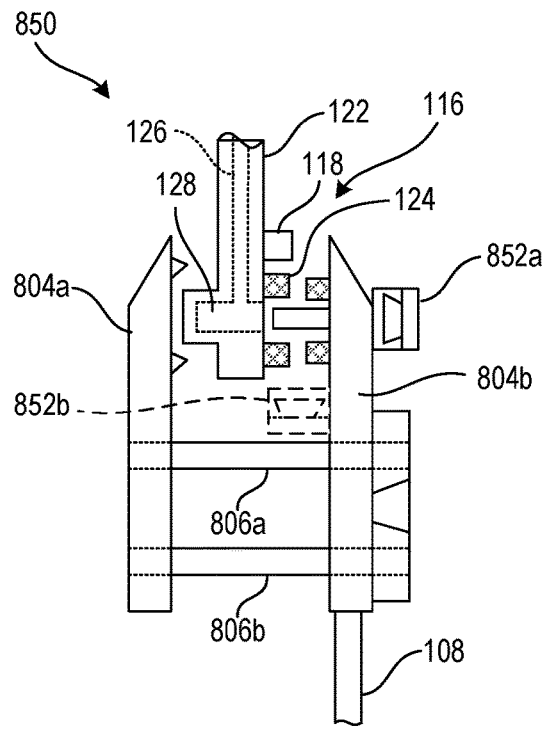
FIG. 8F shows a simplified cross-sectional view of gladhand coupling employing an on-board imaging system for receptacle alignment, according to one or more embodiments of the disclosed subject matter.

In some embodiments, the end effector is attached to the pneumatic line 108 (e.g., supply air hose), and has a channel (e.g., channel 814 or 834) that connects the supply line to the pocket created inside the trailer-side sealing member 124 (e.g., and alignment pin 812, 822, or 832). In some embodiments, one or more sensors 852a (e.g., visible light cameras, infrared imagers, LIDAR systems, acoustic sensors, ultrasonic sensors, etc.) can be coupled to the end effector and/or to the positioning arm to aid in aligning the end effector to the gladhand receptacle 116, for example, as shown in the end effector configuration 850 of FIG. 8F. Although FIG. 8F shows a particular position for sensor 852a external to the clamping members 804a, 804b, other positions for the sensor are also possible. For example, sensor 852b can be disposed between the clamping members 804a, 804b to provide imaging or other detection modality of the receptacle 116 as the end effector clamps therearound. The end effector can be provided with other types of sensors as well, such as but not limited to force sensors (e.g., to detect a force applied to the gladhand receptacle via the end effector), pressure sensors (e.g., to detect a pressure of the air delivered to the pneumatic port 128), and position sensors (e.g., to detect position of the clamping members 804a, 804b, and/or to detect a position of features of the end effector and/or the gladhand receptacle with respect to each other).

FIG. 9A illustrates a coupling operation between another exemplary clamping end effector 912 and gladhand receptacle 116, in particular, an initial approach stage 900, an alignment stage 910, a coupling stage 920, and a release stage 930. In the illustrated example, the end effector 912 has first and second clamp members 902a, 902b, a pair of actuation members 906 (e.g., threaded rails) extending between the clamp members, a pair of actuators 904 (e.g., rotary actuators) that drive respective actuation members 906, and a mating member 914. Also shown is a mating member 908b disposed on a distal plate 908c of an arm section 908a of a robotic arm assembly. The end effector 912 is initially coupled to the robotic arm assembly via mating between mating member 908b and mating member 914, for example, via magnetic attraction. In the approach stage 900, the clamp members 902a, 902b of the end effector 912 can be in an open configuration (e.g., with a gap therebetween of sufficient size to accommodate insertion of the gladhand receptacle 116 therein), and the robotic arm assembly can position the end effector 912 with the gladhand receptacle 116 in between the clamp members 902a, 902b. The pneumatic port 128 of the gladhand receptacle 116 can be positioned facing an alignment member extending the second clamp member 902b of the end effector 912.

In the alignment stage 910, the positioning of the end effector 912 by the robotic arm assembly can be further refined such that the alignment member of the second clamp member 902b is substantially aligned with the pneumatic port 128 of the gladhand receptacle 116. In the coupling stage 920, the actuators 904 can drive the actuation members 906 such that the first and second clamp members 902a, 902b approach each other, thereby clamping the gladhand receptacle 116 therebetween. The clamping force provided by the clamp members 902a, 902b can maintain a seal with the sealing member 124 when pressurized air is supplied to the pneumatic port 128 via pneumatic line 108. In the release stage 930, the mating member 914 of the end effector 912 can be detached from the mating member 908b of the robotic arm assembly (e.g., by de-energizing an electromagnet within the mating member 908b), thereby retaining the end effector 912 coupled to the gladhand receptacle 116 while robotic arm assembly can move away (e.g., to connect another end effector to a different receptacle or to move to a stowed position).

FIGS. 9B-9C illustrate another exemplary clamping end effector 940. In the illustrated example, the end effector 940 has a body 922 (e.g., at least a portion of which can act as a mating member to the robotic arm assembly), an actuation member 924 (e.g., a linear actuator), a pawl member 926 with an alignment portion 928, and a clamp base 930 having a landing surface 932 with pneumatic port. The pawl member 926 can be coupled to the body 922 about a pivot 944, such that, when actuation member 924 engages with an outer surface portion 936, the pawl member 926 is urged toward the clamp base 930, for example, to clamp the gladhand receptacle therebetween. For example, the pneumatic port of the gladhand receptacle can be aligned with the pneumatic port of the landing surface 932, which can provide a seal, for example, by interacting with sealing member 124 of the gladhand receptacle 116. In some embodiments, the end effector 940 can additionally be provided with an extension section 934, for example, extending from the clamp base and supporting one or more sensors 938. In some embodiments, sensor 938 can have a view of the region between the clamp base 930 and pawl member 926, for example, to assist in aligning the end effector 940 to the gladhand receptacle 116 (e.g., landing surface 932 aligned with sealing member 124 and/or to pneumatic port 128 of the gladhand receptacle 116).

VIII. Gladhand Receptacle Positioning

Figure 10A:
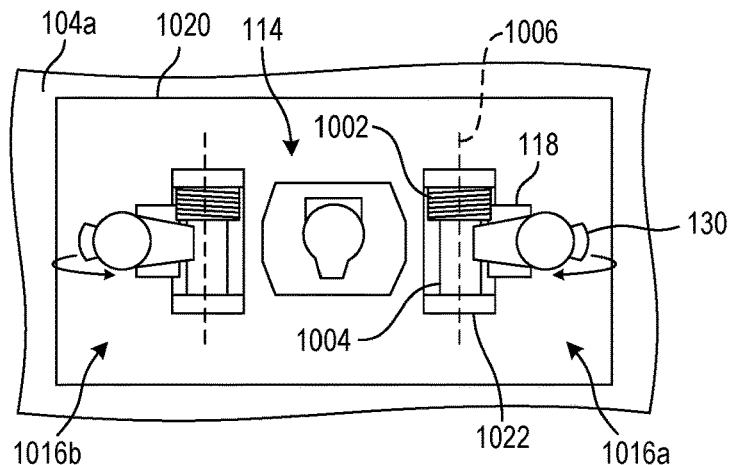
FIG. 10A shows aspects of a trailer supply connector station with stowed gladhand receptacles, according to one or more embodiments of the disclosed subject matter.

In the above-noted examples, the gladhand receptacle 116 extends longitudinally from the front face of the trailer. However, in some cases, the gladhand receptacle may initially extend laterally, for example, with its pneumatic port facing toward the front face of the trailer. For example, FIG. 10A illustrates an exemplary connector station 1020 that can be mounted on or part of a front-facing surface 104a of trailer 104. The connector station 120 can have separate gladhand receptacles 1016a, 1016b flanking opposite lateral sides of the electrical receptacle 114. In some embodiments, each gladhand receptacle 1016a, 1016b can extend initially along a lateral direction of the trailer 104 and can be supported on mounting member 1022 via a rotatable shaft 1004, which can allow the receptacle to be rotated about vertical rotation axis 1006. For example, the gladhand receptacle can be rotated about its respective rotation axis 1006 such that it extends substantially longitudinally. In some embodiments, the gladhand receptacle 1016 can be biased by spring 1002 toward the lateral-extension orientation.

Figure 10B:
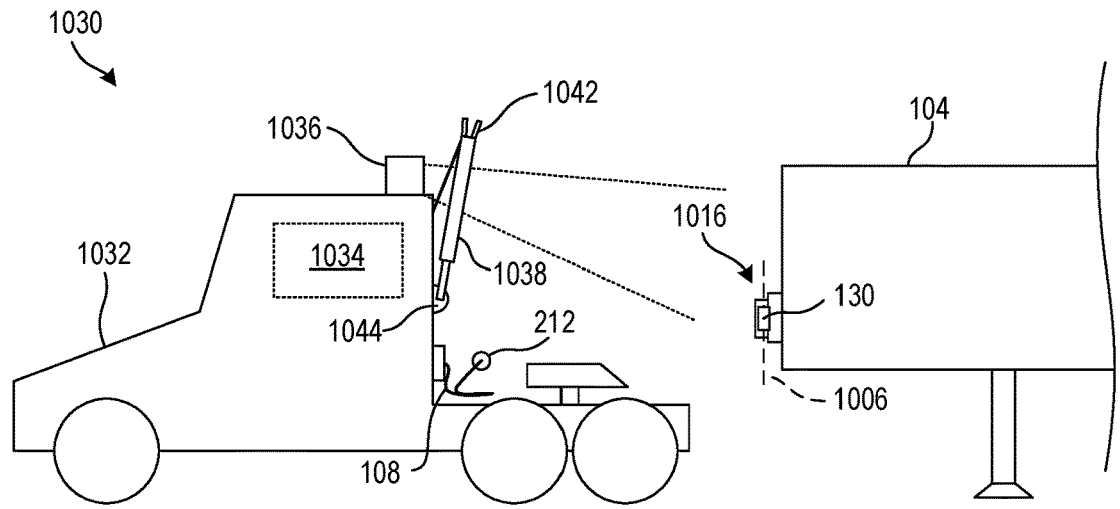
FIG. 10B shows various stages of a system for deploying a stowed gladhand receptacle for subsequent coupling, according to one or more embodiments of the disclosed subject matter.
Figure 10B:
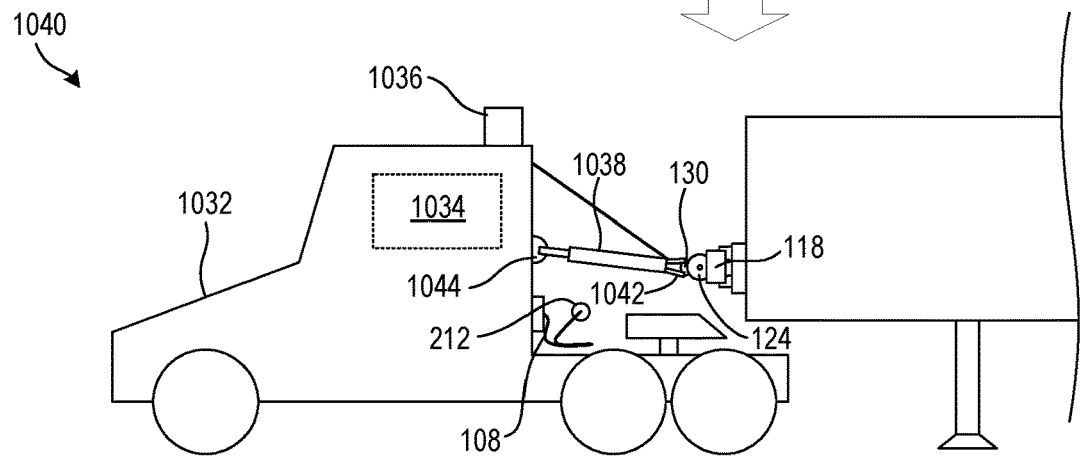

In some embodiments, the gladhand receptacle 1016 can be rotated about its respective rotation axis 1006 from the initial lateral-extension orientation prior to coupling an end effector thereto via a robotic arm assembly. In some embodiments, a towing system can identify the gladhand receptacle 1016 and/or features thereof and a robotic arm assembly used to autonomously rotate the receptacle 1016 from its stowed orientation for subsequent coupling thereto, for example, as shown in FIG. 10B. In the illustrated example, the towing system has a vehicle 1032 (e.g., an autonomous vehicle) and a robotic arm 1038. A first end of the robotic arm 1038 can be coupled to the vehicle 1032 (e.g., at a rear of a cabin of the vehicle) by a pivot 1044 (e.g., universal joint) and a second end of the robotic arm 1038 can hold an end effector 1042 (e.g., hook, claw, grip, lasso, snare, or noose) for actuating the gladhand receptacle 1016 from its stowed position. Alternatively, in some embodiments, the pivot 1044 can be mounted at different locations on the vehicle 1032, such as but not limited to a side of the vehicle cabin or a part of the rear frame between the fifth-wheel connector and the cabin.

In some embodiments, the robotic arm 1038 can be the same assembly used to couple an end effector to the gladhand receptacle 1016 (e.g., telescoping arm 208). Alternatively, in some embodiments, the robotic arm 1038 is different than the assembly used to couple an end effector to the gladhand receptacle 1016, for example, when the robotic arm 1038 is used to hold the receptacle 1016 in position while the other robotic arm assembly connects the appropriate end effector to the receptacle 1016. For example, operation of the robotic arm 1038 and/or sensor 1036 can be controlled by controller 1034, which may be separate from or part of a controller that operates the robotic arm assembly and/or a controller that operates vehicle 1032. Alternatively or additionally, in some embodiments, operation of the robotic arm 1038 can be remotely controlled by a human operator, for example, at a remote station (e.g., teleoperated) to rotate the receptacle 1016 out of its stowed position.

In the illustrated example of FIG. 10B, a sensor 1036 is provided on a cabin roof of the vehicle 1032 and can have a rearward-facing field-of-view for detecting aspects of the gladhand receptacle 1016. Other locations for sensor 1036 are also possible, such as but not limited to a rear surface of the vehicle cabin, a side surface of the vehicle cabin, and a portion of the vehicle body supporting the fifth-wheel connector 106. During an approach stage 1030, the gladhand receptacle 1016 can be imaged or otherwise detected by sensor 1036, and the rotation axis 1006 identified (e.g., based on an identified location of the shaft 1004). Alternatively or additionally, one or more gripping features of the receptacle 1016 can be identified, for example, an outermost point of detent plate 130. The towing system may automatically assess the distance between the rotation axis 1006 and the outermost point of detent plate 130 and can plan an arc through which an end effector should travel in order to remain engaged with the detent plate 130 while pulling the gladhand receptacle 1016 out of its stowed position during the coupler preparation stage 1040.

Alternatively or additionally, in some embodiments, a specialized tool for positioning the gladhand receptacle for coupling can be mounted or otherwise integrated with the robotic arm assembly for coupling the end effector to the gladhand receptacle. For example, the specialized tool can utilize an engagement member and one or more actuators coupled to the engagement member. In some embodiments, the one or more actuators can be configured to move the engagement member relative to the robotic arm assembly (e.g., while the robotic arm assembly remains stationary). For example, the one or more actuators can include, but is not limited to, a rotary actuator, a linear actuator, a cable actuator, or any combination of the foregoing. In some embodiments, the engagement member can be positioned behind a distal portion of the gladhand receptacle, for example, proximal to the detent plate (e.g., between the trailer front surface and the detent plate). The one or more actuators can then move the engagement member (either alone while the robotic arm remains stationary or in combination with movement of the robotic arm) to contact the distal portion of the gladhand receptacle and to rotate about its rotation axis out of its stowed position.

Figure 10C:
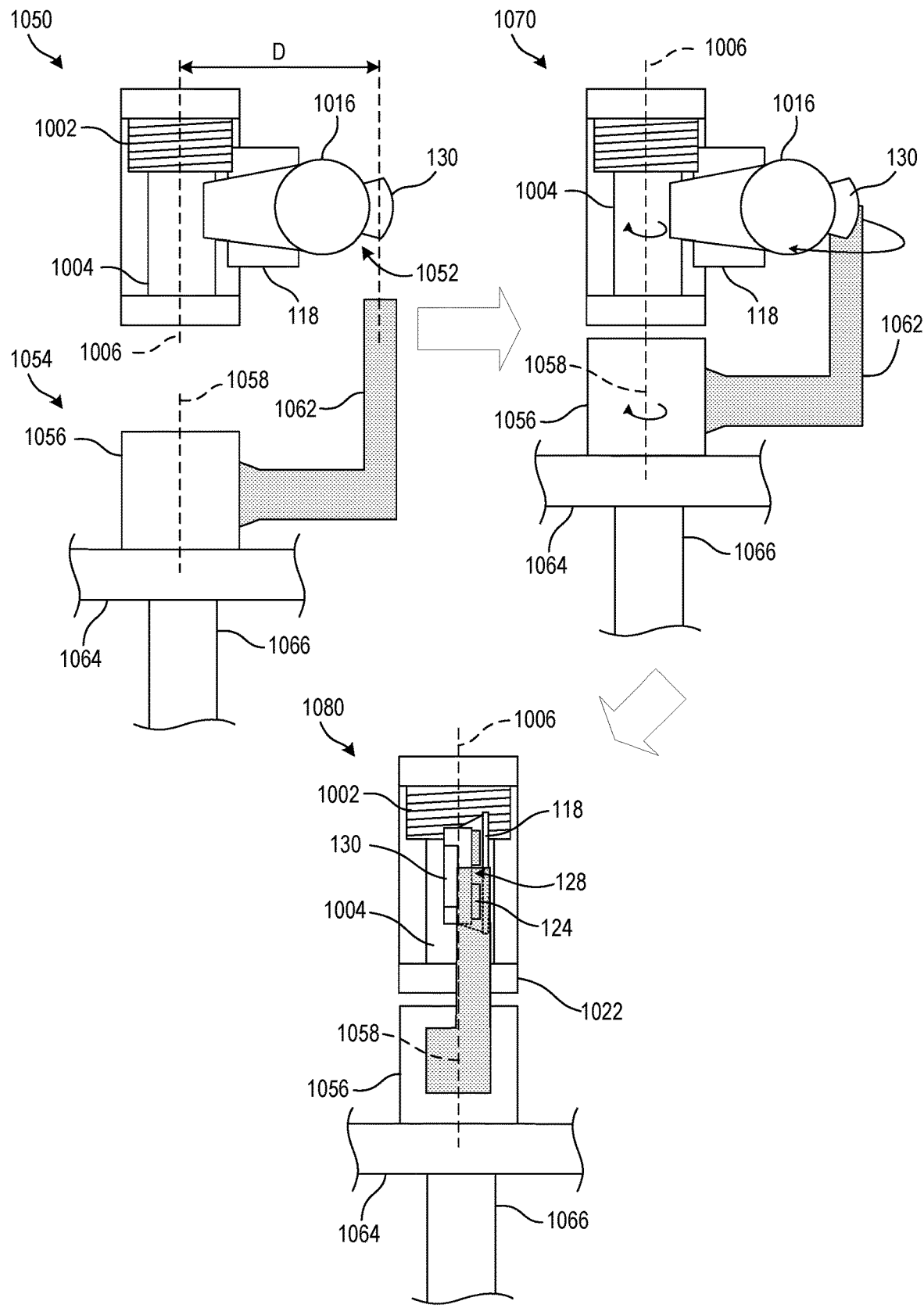
FIG. 10C shows various stages of an end-of-arm (EOA) tool for deploying a stowed gladhand receptacle for subsequent coupling, according to one or more embodiments of the disclosed subject matter.

For example, FIG. 10C illustrates an end-of-arm (EOA) tool 1054 that can be used to move the gladhand receptacle 1016 out of the stowed position. The EOA tool 1054 can be mounted on the distal member 1064 of an arm section 1066, for example, the same robotic arm used to attach the end effector to the gladhand receptacle 1016. The EOA tool 1054 can have a rotary actuator 1056 coupled to a lever arm 1062 and having a rotation axis 1058. During an approach stage 1050, the gladhand receptacle 1016 can be imaged or otherwise detected, and the rotation axis 1006 of the receptacle 1016 identified (e.g., based on an identified location of the shaft 1004). Alternatively or additionally, one or more gripping features of the receptacle 1016 can be identified, for example, an outermost point of detent plate 130. Alternatively or additionally, a distance, D, between the detent plate 130 and the rotation axis 1006 can be identified, for example, to determine a path to be followed by the lever arm 1062 to rotate the gladhand receptacle to its coupling position. Alternatively or additionally, in some embodiments, a distal or rounded portion 1052 of the gladhand receptacle 1016 can be identified and/or contacted by the lever arm 1062 for receptacle actuation.

In some embodiments, during the approach stage 1050, the EOA tool 1054 can be positioned such that the rotation axis 1058 of the rotary actuator 1056 is substantially aligned with the rotation axis 1006 of the receptacle 1016 (e.g., rotation axes 1006, 1058 are collinear or at least substantially parallel). In the illustrated example of FIG. 10C, the EOA tool 1054 is positioned below and aligned with the rotation axis 1006; however, other positions and orientations are also possible according to one or more contemplated embodiments. In some embodiments, the lever arm can be positionable relative to the rotary actuator, for example, such that a distance between the lever arm 1062 and the rotation axis 1058 of rotary actuator 1056 matches the distance, D, between the detent plate 130 and the rotation axis 1006.

During a subsequent engagement stage 1070, the lever arm 1062 of the EOA tool 1054 can be positioned behind the detent plate 130 (e.g., between the receptacle 1016 and the trailer front surface), so as to contact the detent plate 130. For example, the EOA tool 1054 can be moved (e.g., by movement of the arm section 1066) upward toward the receptacle 1016 in a direction substantially parallel to the rotation axis 1058 and/or rotation axis 1006. The rotary actuator 1056 can then rotate the lever arm 1062 about rotation axis 1058 so as to pull the gladhand receptacle 1016 from the stowed position during the coupler preparation stage 1080.

Figure 11:
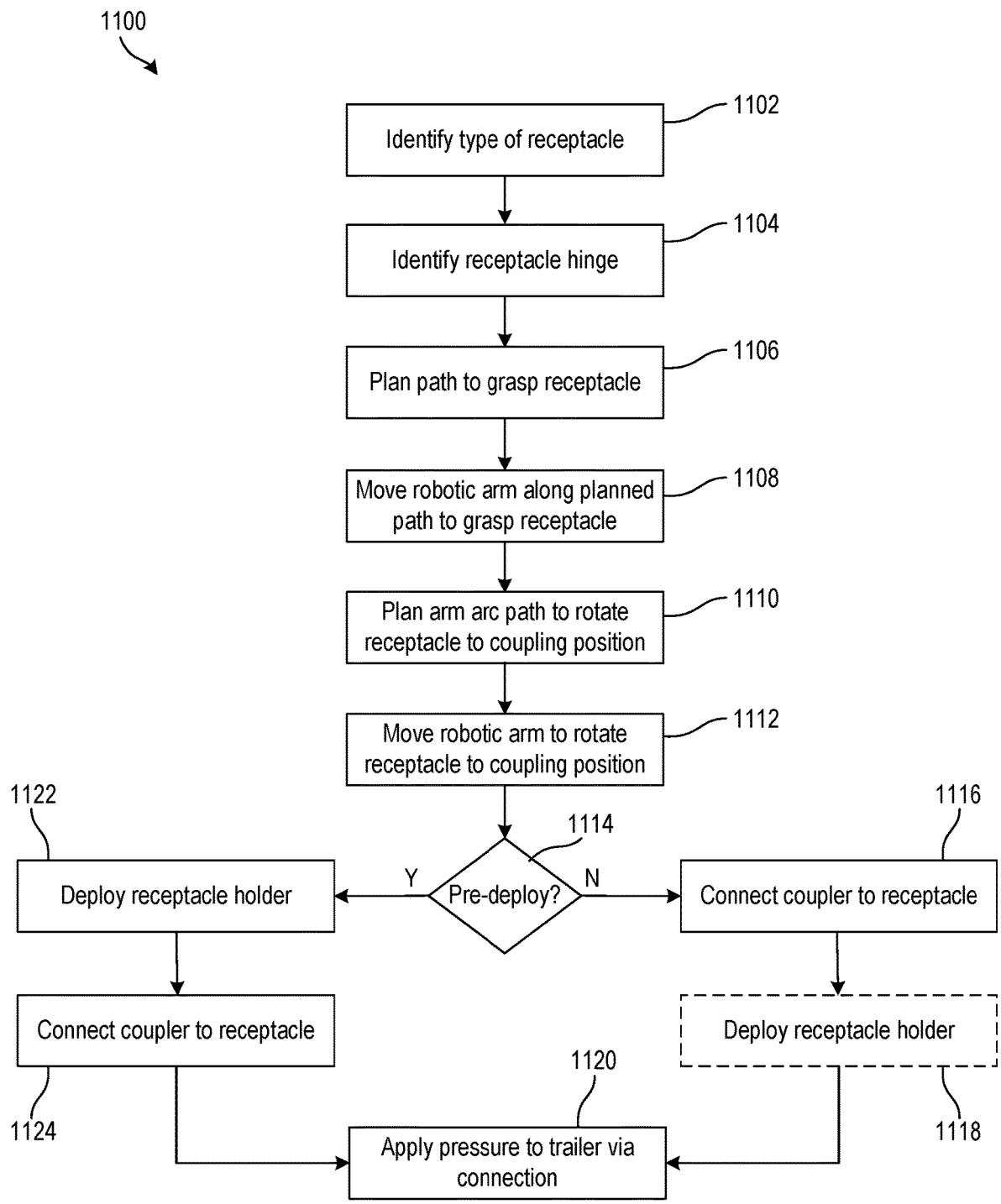
FIG. 11 is a process flow diagram of an exemplary method for coupling a vehicle to a semi-trailer with stowed gladhand receptacle via a robotic arm assembly, according to one or more embodiments of the disclosed subject matter.

Referring to FIG. 11, an exemplary method 1100 for autonomous coupling to a gladhand receptacle to provide pressurized air to a trailer braking system is shown. The method 1100 can initiate a process block 1102, where the gladhand receptacle is identified. In some embodiments, the identification of process block 1102 can be similar to the identification of process block 302 in method 300 of FIG. 3. Alternatively or additionally, the identification of process block 1102 can use machine vision, or other means, to automatically recognize the type of gladhand receptacle and/or to locate the pneumatic port 128 and/or central opening of the sealing member 124 of the gladhand receptacle. The method 1100 can proceed to process block 1104, where one or more vertical features of the gladhand receptacle can be identified, for example, a hinge or joint. Alternatively or additionally, the identification of process block 1104 can include identifying a gripping portion of the gladhand receptacle, for example, detent plate 130. In some embodiments, the identification further includes determining a distance between the identified vertical feature (e.g., hinge 1004) and a portion of the round gladhand receptacle (e.g., detent plate 130). In some embodiments, the identifying of process block 1102 and/or process block 1104 can be based on signals from one or more sensors, for example, a visible light camera, a single point range finder, a light detection and ranging (LIDAR) system, etc.

The method 1100 can proceed to process block 1106, where a path for the end effector (and/or the robotic arm assembly connected thereto) can be planned to grasp the gladhand receptacle. For example, a control system of the autonomous coupling system (e.g., control system 1034) can perform the planning based at least in part on the identification in process block 1102 and/or process block 1104, and/or on other features detected in an environment surrounding the vehicle (e.g., by sensor 1036). In some embodiments, the path can be planned from an initial stowed position proximal to the rear of the vehicle (e.g., when the end effector was already held or part of the robotic arm) to the gladhand receptacle, for example, a region between the front face of the trailer and a facing surface of the detent plate 130. Alternatively or additionally, in some embodiments, the path can be planned from an end effector selection position to the gladhand receptacle. Alternatively or additionally, the path can be planned from an initial stowed position to an end effector selection position and then on to the gladhand receptacle position. In some embodiments, the planning can include a return path of the robotic arm, for example, to a stowed position. In some embodiments, the planning can be such that the path avoids moving or stationary obstacles.

At process block 1108, an end effector can be moved along the planned path by the robotic arm assembly to the gladhand receptacle, and the end effector can grasp or otherwise contact the detent plate of the gladhand receptacle. The method 1100 can proceed to process block 1110, where a path for the end effector (and/or the robotic arm assembly connected thereto) can be planned to rotate the gladhand receptacle to a coupling position. For example, the distance between the hinge 1004 and the detent plate 130 determined in process block 1104 can define a radius of a path that the robotic arm would have to follow to get behind the gladhand receptacle and rotate it from the stowed position. At process block 1112, the end effector can be moved along the planned path by the robotic arm assembly, thereby rotating the gladhand receptacle to the coupling position via the grasped or contacted detent plate 130.

The method 1100 can proceed to decision block 1114, where it is determined if a receptacle holder (e.g., kickstand) should be deployed to the gladhand receptacle to maintain the receptacle in the coupling position before an end effector is subsequently coupled thereto. For example, the receptacle holder can be any type of mechanism that keeps the gladhand receptacle from rotating back to its stowed position. Alternatively or additionally, the receptacle holder can keep the gladhand receptacle from rotating downward, for example, due to the additional weight of the end effector after being coupled to the gladhand receptacle. In some embodiments, the receptacle holder can employ a spring-loaded mechanism, an inflatable member (e.g., bag or balloon), a pneumatic actuator, a hydraulic actuator, or a rotary actuator.

If such a receptacle holder should be deployed prior to end effector coupling, the method 1100 can proceed to process block 1122, where the receptacle holder is deployed to hold the gladhand receptacle in the coupling position such that a coupling portion of an end effector can subsequently be coupled to the gladhand receptacle in process block 1124. If no receptacle holder is needed or desired, the method 1100 can proceed from decision block 1114 to process block 1116, where a coupling portion of an end effector can be coupled to the gladhand receptacle. Optionally, in some embodiments, a receptacle holder can be deployed at process block 1118 after the coupling of process block 1116, for example, to keep the gladhand receptacle out of the stowed position while the end effector is coupled thereto. In some embodiments, the coupling of process block 1116 and/or process block 1124 can be similar to the coupling of process block 310 in method 300 of FIG. 3. The method 1100 can then proceed to process block 1120, where pressurized air can be applied from the vehicle to the trailer via the connection between the end effector and the gladhand receptacle, for example, to apply pressure for releasing emergency brakes and/or apply pressure to engage service brakes.

Although illustrated separately, it is contemplated that various process blocks may occur simultaneously or iteratively. Furthermore, certain process blocks illustrated as occurring after others may indeed occur before. Although some of blocks 1102-1124 of method 1100 have been described as being performed once, in some embodiments, multiple repetitions of a particular process block may be employed before proceeding to the next decision block or process block. In addition, although blocks 1102-1124 of method 1100 have been separately illustrated and described, in some embodiments, process blocks may be combined and performed together (simultaneously or sequentially). Moreover, although FIG. 11 illustrates a particular order for blocks 1102-1124, embodiments of the disclosed subject matter are not limited thereto. Indeed, in certain embodiments, the blocks may occur in a different order than illustrated or simultaneously with other blocks. In some embodiments, method 1100 may comprise only some of blocks 1102-1124 of FIG. 11.

IX. Adapter-Based Coupling

In some embodiments, rather than directly connecting the end effector to gladhand receptacle, a different type of connector can be added to the trailer-side gladhand receptacle via an adapter to simplify the process of coupling. Any type of connector can be used, for example, a quick connect pneumatic coupler. For example, the quick connect pneumatic coupler can be similar to those typically used for air compressors or hydraulic tools, although any of various commercially available connector configurations are also possible.

Figure 12A:
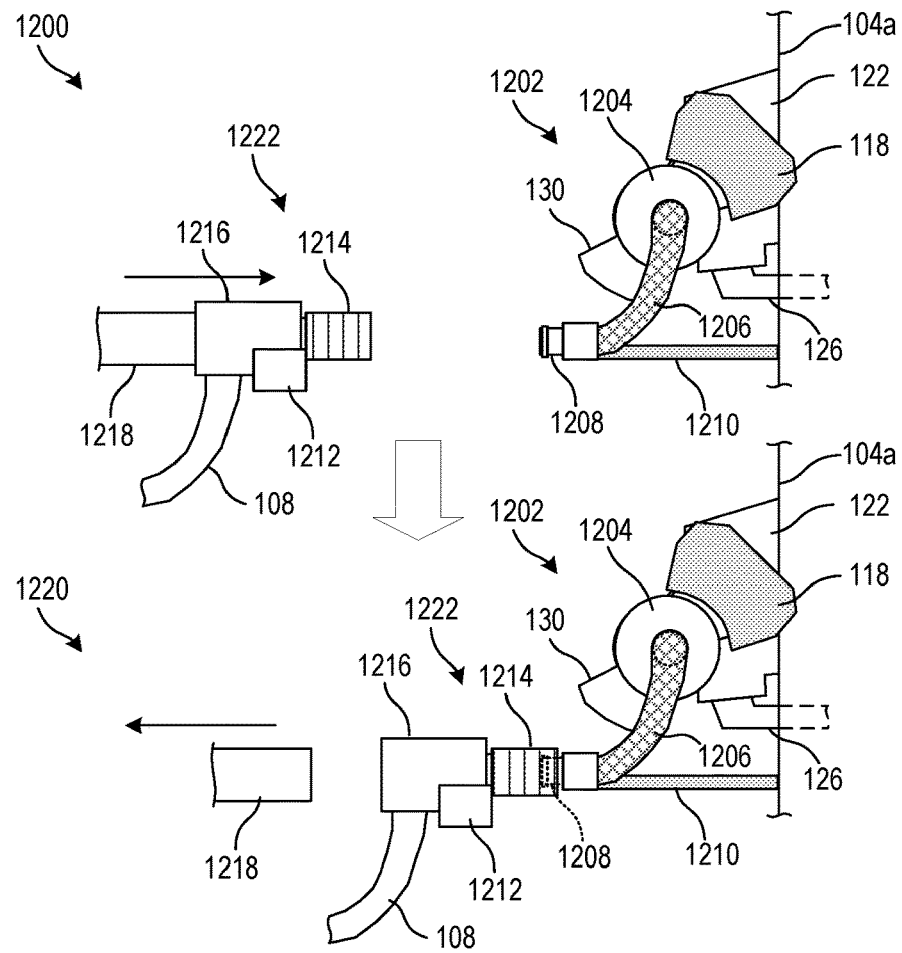
FIG. 12A shows aspects of end effector coupling via an adapter connected to the gladhand receptacle, according to one or more embodiments of the disclosed subject matter.

For example, FIG. 12A shows an approach stage 1200 and a coupling stage 1220 of a coupling configuration employing an adapter assembly 1202 pre-coupled to the gladhand receptacle 116 of a trailer. In the illustrated example, the adapter assembly 1202 includes a conventional gladhand coupling portion 1204 mounted to the gladhand receptacle 116, an attachment line 1206, and a connector 1208 (e.g., male quick connect) at an end of the attachment line 1206. In some embodiments, the adapter assembly 1202 can further include a positioning member 1210, which positions the connector 1208 for easier connection, for example, extending along a longitudinal direction and facing toward the truck being coupled to the trailer.

In the illustrated example, an end effector 1222 is releasably mounted to a distal end of arm section 1218 of a robotic arm assembly, for example, via a surface of mating frame 1216. The end effector 1222 can have a connector 1214 (e.g., female quick connect) complementary to connector 1208. In some embodiments, the end effector 1222 can optionally include an actuator 1212 (e.g., motor or linear actuator), for example, for actuating a portion of the connector 1214 (e.g., to retract a sheath of the connector) to allow decoupling of end effector connector 1214 from adapter connector 1208. Alternatively or additionally, actuation of connector 1214 to enable decoupling can be provided via a portion of the robotic arm assembly.

Figure 12B:
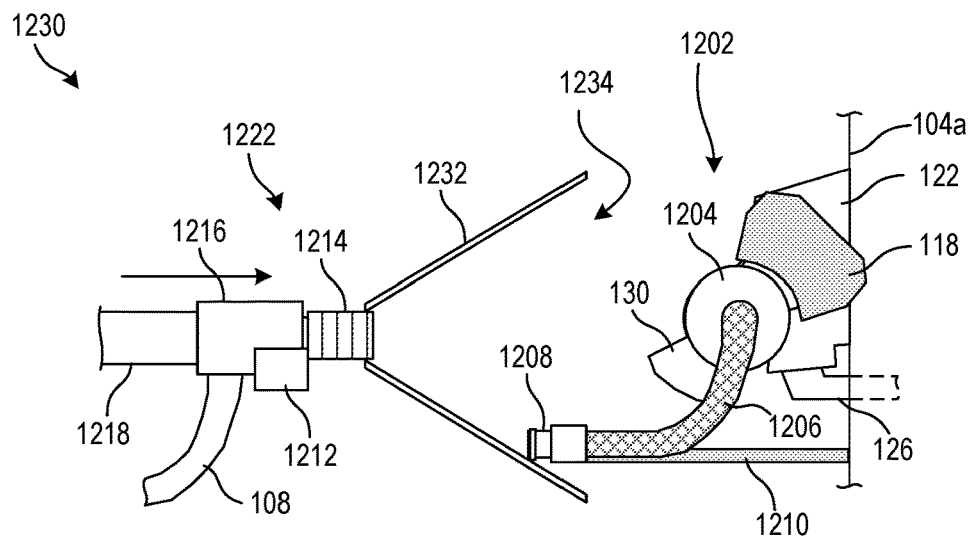
FIG. 12B shows aspects of another end effector coupling via an adapter connected to the gladhand receptacle, according to one or more embodiments of the disclosed subject matter.

In some embodiments, the end effector can include one or more features to help with alignment and/or pairing between the connectors 1214, 1208. For example, FIG. 12B shows a coupling configuration 1230 having a guide member 1232 (e.g., funnel) with tapered interior region 1234. Interaction between bounding surfaces of the tapered interior region 1234 and the adapter connector 1208 can guide the connector 1208 toward the end effector connector 1214, thereby simplifying the positioning of the end effector 1222 via the robotic arm assembly.

X. Vehicle Systems with Autonomous Gladhand Coupling

Figure 13:
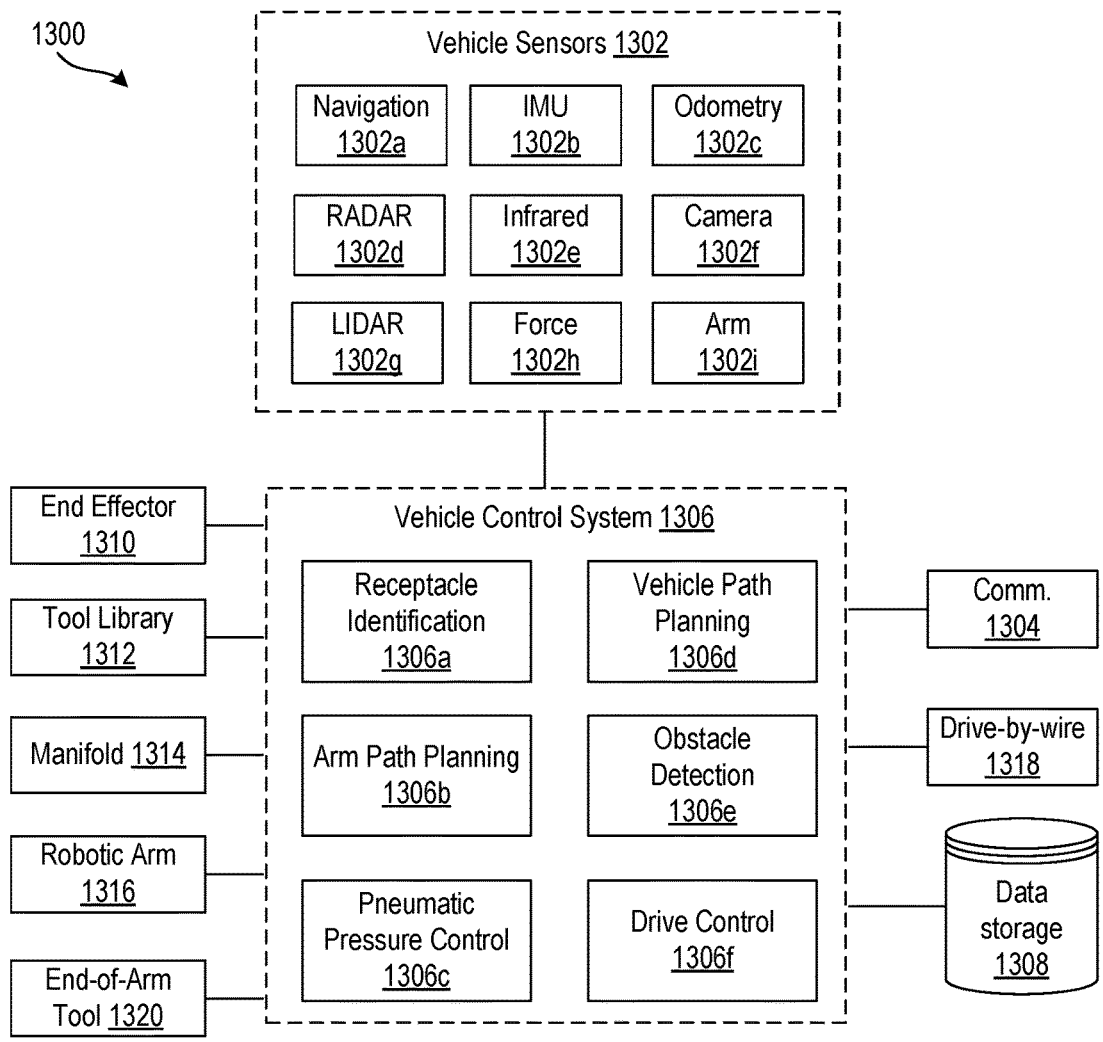
FIG. 13 is a simplified schematic diagram of a vehicle system with autonomous gladhand coupling, according to one or more embodiments of the disclosed subject matter.

FIG. 13 illustrates an exemplary configuration of a vehicle system 1300 that can facilitate autonomous operation, for example, by using a robotic arm assembly to provide gladhand coupling between a towing vehicle and a towed trailer in an autonomous or automated manner. The system 1300 can include a vehicle control system 1306, one or more vehicle sensors 1302, a drive-by-wire system 1318, an end effector 1310, a tool library 1312, an air pressure manifold 1314, a robotic arm assembly 1316, an end-of-arm tool 1320, and a communication unit 1304. The drive-by-wire system 1318 can include, for example, electrical and/or electro-mechanical components for performing one or more vehicle functions traditionally provided by mechanical linkages, e.g., braking, gearing, acceleration, and/or steering. In some embodiments, system 1300 can further include one or more memories or databases. For example, system 1300 can include one or more databases 1308 that store driving rules (e.g., "rules of the road") and/or a road or terrain map of an area in which the vehicle operates. Alternatively or additionally, one or more databases 1308 can store details regarding one or more trailers to which the vehicle may be coupled, for example, features of gladhand receptacles of the trailers.

In some embodiments, the vehicle sensors 1302 can include a navigation sensor 1302a, an inertial measurement unit (IMU) 1302b, an odometry sensor 1302c, a RADAR system 1302d, an infrared (IR) imager 1302e, a visual camera 1302f, a LIDAR system 1302g, one or more force sensors 1302h, one or more arm assembly sensors 1302i, or any combination thereof. Other sensors are also possible according to one or more contemplated embodiments. For example, sensors 1302 can further include an ultrasonic or acoustic sensor for detecting distance or proximity to objects, a compass to measure heading, inclinometer to measure an inclination of a path traveled by the vehicle (e.g., to assess if the vehicle may be subject to slippage), ranging radios (e.g., as disclosed in U.S. Pat. No. 11,234,201, incorporated herein by reference), or any combination thereof.

In some embodiments, the navigation sensor 1302a can be used to determine relative or absolute position of the vehicle. For example, the navigation sensor 1302a can comprise one or more global navigation satellite systems (GNSS), such as a global positioning system (GPS) device. In some embodiments, IMU 1302b can be used to determine orientation or position of the vehicle. In some embodiments, the IMU 1302b can comprise one or more gyroscopes or accelerometers, such as a microelectromechanical system (MEMS) gyroscope or MEMS accelerometer.

In some embodiments, the odometry sensor 1302c can detect a change in position of the vehicle over time (e.g., distance). In some embodiments, odometry sensors 1302c can be provided for one, some, or all of wheels of the vehicle, for example, to measure corresponding wheel speed, rotation, and/or revolutions per unit time, which measurements can then be correlated to change in position of the vehicle. For example, the odometry sensor 1302c can include an encoder, a Hall effect sensor measuring speed, or any combination thereof.

In some embodiments, the RADAR system 1302d can use irradiation with radio frequency waves to detect obstacles or features within an environment surrounding the vehicle. In some embodiment, the RADAR system 1302d can be configured to detect a distance, position, and/or movement vector of a feature (e.g., obstacle) within the environment. For example, the RADAR system 1302d can include a transmitter that generates electromagnetic waves (e.g., radio frequency or microwaves), and a receiver that detects electromagnetic waves reflected back from the environment.

In some embodiments, the IR sensor 1302e can detect infrared radiation from an environment surrounding the vehicle. In some embodiments, the IR sensor 1302e can detect obstacles or features in low-light level or dark conditions, for example, by including an IR light source (e.g., IR light-emitting diode (LED)) for illuminating the surrounding environment. Alternatively or additionally, in some embodiments, the IR sensor 1302e can be configured to measure temperature based on detected IR radiation, for example, to assist in classifying a detected feature or obstacle as a person or vehicle.

In some embodiments, the camera sensor 1302f can detect visible light radiation from the environment, for example, to determine features (e.g., obstacles) within the environment and/or features of the trailer (e.g., gladhand receptacle). For example, the camera sensor 1302f can include an imaging sensor array (e.g., a charge-coupled device (CCD) or complementary metal-oxide semiconductor (CMOS) sensor) and associated optical assembly for directing light onto a detection surface of the sensor array (e.g., lenses, filters, mirrors, etc.). In some embodiments, multiple camera sensors 1302f can be provided in a stereo configuration, for example, to provide depth measurements.

In some embodiments, the LIDAR sensor system 1302g can include an illumination light source (e.g., laser or laser diode), an optical assembly for directing light to/from the system (e.g., one or more static or moving mirrors (such as a rotating mirror), phased arrays, lens, filters, etc.), and a photodetector (e.g., a solid-state photodiode or photomultiplier). In some embodiments, the LIDAR sensor system 1302g can use laser illumination to measure distances to obstacles or features within an environment surrounding the trailer. In some embodiments, the LIDAR sensor system 1302g can be configured with a field-of-view primarily directed to detect features at the rear and/or sides of the trailer. Alternatively or additionally, in some embodiments, the LIDAR sensor system 1302g can be used to identify the loading dock and/or measure features thereof. Alternatively or additionally, in some embodiments, the LIDAR sensor system 1302g can be configured to provide three-dimensional imaging data of the environment, and the imaging data can be processed (e.g., by the LIDAR system itself or by a module of control system 1306) to generate a view of the environment (e.g., at least a 180-degree view, a 270-degree view, or a 360-degree view).

In some embodiments, the force sensor 1302h can measure forces applied to the robotic arm assembly 1316 and/or an end effector 1310, for example, to measure a clamping force applied by the end effector 1310 to the corresponding gladhand receptacle. In some embodiments, the force sensor 1302h can comprise a strain gauge, a piezoelectric sensor, a capacitive sensor, an inductive sensor, a load cell, or any combination thereof. In some embodiments, the arm sensor 1302i can measure characteristics of the robotic arm assembly 1316 and/or end effector 1310, for example, a position of a telescoping arm and/or displacement of linear actuators. In some embodiments, arm sensor 1302i can comprise a linear encoder, a rotary encoder, or any combination thereof. Alternatively or additionally, in some embodiments, the arm sensor 1302i can measure location of the gladhand receptacle with respect to the end effector, for example, to assist in alignment between the end effector and the gladhand receptacle. For example, the arm sensor 1302i can include an optical detector to image the pneumatic port and/or sealing member of the gladhand receptacle, and optionally part of the end effector that interfaces with the pneumatic port and/or sealing member.

The vehicle sensors 1302 can be operatively coupled to the control system 1306, such that the control system 1306 can receive data signals from the sensors 1302 and control operation of the vehicle (e.g., hostler), or components thereof (e.g., drive-by-wire system 1318, communication unit 1304, end effector 1310, tool library 1312, manifold 1314, and/or robotic arm assembly 1316), responsively thereto. For example, FIG. 13 shows a configuration of a control system 1306 that includes, in accordance with some embodiments, one or more modules, programs, software engines or processor instructions for performing at least some of the functionalities described herein.

FIG. 13 shows a configuration of a control system 1306 that includes, in accordance with some embodiments, one or more modules, programs, software engines or processor instructions for performing at least some of the functionalities described herein. For example, control system 1306 may comprise one or more software module(s) or engine(s) for directing one or more processors of system 1300 to perform certain functions. In some embodiments, software components, applications, routines or sub-routines, or sets of instructions for causing one or more processors to perform certain functions may be referred to as "modules" or "engines." It should be noted that such modules or engines, or any software or computer program referred to herein, may be written in any computer language and may be a portion of a monolithic code base, or may be developed in more discrete code portions, such as is typical in object-oriented computer languages. In addition, the modules or engines, or any software or computer program referred to herein, may in some embodiments be distributed across a plurality of computer platforms, servers, terminals, and the like. For example, a given module or engine may be implemented such that the described functions are performed by separate processors and/or computing hardware platforms. Further, although certain functionality may be described as being performed by a particular module or engine, such description should not be taken in a limiting fashion. In other embodiments, functionality described herein as being performed by a particular module or engine may instead (or additionally) be performed by a different module, engine, program, sub-routine or computing device without departing from the spirit and scope of the invention(s) described herein.

It should be understood that any of the software modules, engines, or computer programs illustrated herein may be part of a single program or integrated into various programs for controlling one or more processors of a computing device or system. Further, any of the software modules, engines, or computer programs illustrated herein may be stored in a compressed, uncompiled, and/or encrypted format and include instructions which, when performed by one or more processors, cause the one or more processors to operate in accordance with at least some of the methods described herein. Of course, additional and/or different software modules, engines, or computer programs may be included, and it should be understood that the examples illustrated and described with respect to FIG. 7A are not necessary in any embodiments. Use of the terms "module" or "software engine" is not intended to imply that the functionality described with reference thereto is embodied as a stand-alone or independently functioning program or application. While in some embodiments functionality described with respect to a particular module or engine may be independently functioning, in other embodiments such functionality is described with reference to a particular module or engine for ease or convenience of description only and such functionality may in fact be a part of, or integrated into, another module, engine, program, application, or set of instructions for directing a processor of a computing device.

In some embodiments, the instructions of any or all of the software modules, engines or programs described above may be read into a main memory from another computer-readable medium, such from a read-only memory (ROM) to random access memory (RAM). Execution of sequences of instructions in the software module(s) or program(s) can cause one or more processors to perform at least some of the processes or functionalities described herein. Alternatively or additionally, in some embodiments, hard-wired circuitry may be used in place of, or in combination with, software instructions for implementation of the processes or functionalities described herein. Thus, the embodiments described herein are not limited to any specific combination of hardware and software.

In the illustrated example of FIG. 13, the control system 1306 includes a receptacle identification module 1306*a*, an arm path planning module 1306*b*, and a pneumatic pressure control module 1306*c*. In some embodiments, the receptacle identification module 1306*a* can be configured to automatically identify features of a gladhand receptacle for coupling thereto. For example, the receptacle identification module 1306*a* can identify the type of the gladhand receptacle (e.g., for selecting an appropriate end effector configuration and/or end effector), identify a location of the gladhand receptacle (e.g., a location of the pneumatic port and/or sealing member), and/or determine an orientation of the gladhand receptacle (e.g., stowed position and/or deviation from a standard coupling orientation). In some embodiments, the receptacle identification module 1306*a* can identify a gripping portion of the gladhand receptacle, for example, detent plate 130. In some embodiments, the receptacle identification module 1306*a* can further determine a distance between an identified vertical feature (e.g., hinge or joint) and a portion of the round gladhand receptacle.

In some embodiments, the arm path planning module 1306*b* can plan a path for the end effector and/or the robotic arm assembly connected thereto. The arm path planning module 1306*b* can plan a path from an initial stowed position proximal to the rear of the vehicle (e.g., when the end effector was already held by the arm assembly) to a final coupling position, where an outlet of the end effector aligned with the pneumatic port of the gladhand receptacle. Alternatively or additionally, in some embodiments, the path can be planned from an end effector selection position (e.g., via tool library 1312) to the final coupling position. Alternatively or additionally, the path can be planned from an initial stowed position to an end effector selection position and then on to the final coupling position. Alternatively or additionally, the path can be planned by module 1306*b* for the end effector (and/or the robotic arm assembly connected thereto) to rotate the gladhand receptacle to a coupling position. In some embodiments, the arm path planning module 1306*b* can plan a return path of the robotic arm assembly without the end effector (e.g., after the end effector has been successfully coupled to the receptacle and thus released from the arm assembly), for example, to a stowed position. In some embodiments, the planning can be such that the path avoids moving or stationary obstacles. In some embodiments, the arm path planning module 1306*b* can control the robotic arm assembly 1316 to follow the planned path, and/or actuate the end effector 1310 to engage the gladhand receptacle.

In some embodiments, the pneumatic pressure control module 1306*c* can control manifold 1314 (e.g., comprising one or more valves) to direct pressurized air from a pneumatic source to end effector 1310. For example, the pneumatic pressure control module 1306*c* can route to the appropriate end effector 1310 based at least in part on the location that the robotic arm assembly 1316 picked up the end effector 1310 from the tool library 1312, the location of gladhand receptacle coupled to the end effector 1310, and/or presence/absence of sensing at the end effector 1310.

The control system 1306 can also include an obstacle detection module 1306*d*, a route planning module 1306*e*, and/or a drive control module 1306*f*. Other modules or components are also possible according to one or more contemplated embodiments. In some embodiments, the route planning module 1306*d* can be configured to plan a route for the vehicle to follow. In some embodiments, the route planning module 1306*d* can employ data stored in database 1308 regarding rules of the road and/or the road network or area to plan a route while avoiding known or detected obstacles in the environment. In some embodiments, the control system 1306 can use signals from the sensors 1302 to identify traversable paths through the area, for example, using vehicle position and/or features identified in the surrounding environment by one or more of sensors 1302. In some embodiments, drive control module 1306*f* can then control the drive-by-wire system 1318 (e.g., an electrical or electro-mechanical system that controls steering, gearing, velocity, acceleration, and/or braking) to have the vehicle (e.g., with trailer coupled thereto) follow the planned route. Alternatively or additionally, in some embodiments, the control system 1306 can control the drive-by-wire system 1318 based one or more signals received via communication unit 1314 (e.g., transceiver for wireless communication), for example, to follow another vehicle (e.g., autonomous or manually-operated leader vehicle). In some embodiments, the obstacle detection module 1306*e* can be configured to detect obstacles (e.g., impassable road features, other vehicles, pedestrians, etc.) as the vehicle moves. Control system 1306 can be further configured to avoid the detected obstacles, for example, by instructing the vehicle to follow an alternative path.

In some embodiments, the vehicle can communicate with other vehicles and/or a communication infrastructure (e.g., cellular network) via communication unit 1304. Alternatively or additionally, the communication unit 1304 can communicate instructions to and/or receive signals from an end effector coupled to the gladhand receptacle of the trailer, for example, to control coupling operation thereof. In some embodiments, the communication unit employs a wireless communication modality, such as radio, ultra-wideband (UWB), Bluetooth, Wi-Fi, cellular, optical, or any other wireless communication modality.

XI. Computer Implementation

Figure 14:
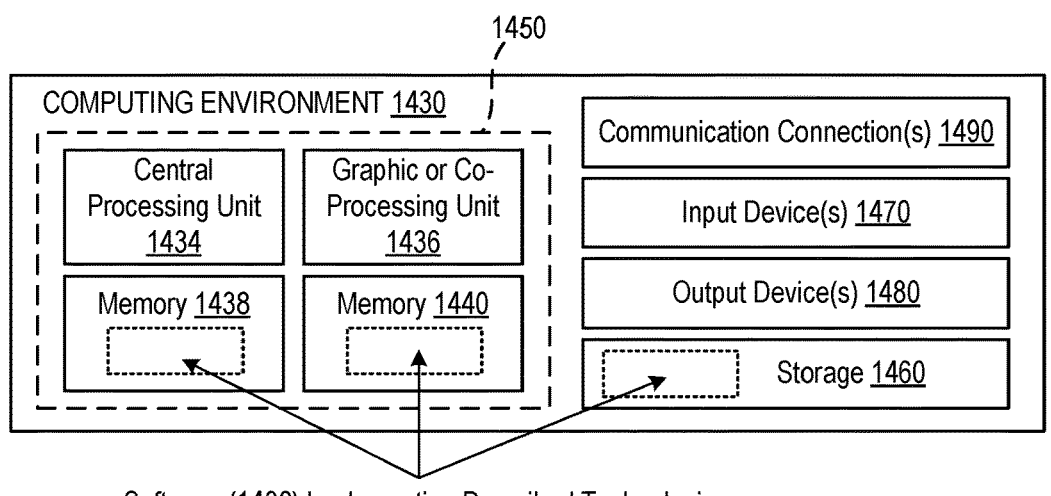
FIG. 14 depicts a generalized example of a computing environment in which the disclosed technologies may be implemented.

FIG. 14 depicts a generalized example of a suitable computing environment 1430 in which the described innovations may be implemented, such as aspects of control system 204, method 300, controller 404, controller 424, controller 504, controller 524, controller 704, controller 1034, method 1100, vehicle control system 1306, etc. The computing environment 1430 is not intended to suggest any limitation as to scope of use or functionality, as innovations may be implemented in diverse general-purpose or special-purpose computing systems. For example, computing environment 1430 can be any of a variety of computing devices (e.g., desktop computer, laptop computer, server computer, tablet computer, etc.).

In the illustrated example, the computing environment 1430 includes one or more processing units 1434, 1436 and one or more memories 1438, 1440, with this base configuration 1450 included within a dashed line. The processing units 1434, 1436 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 14 shows a central processing unit 1434 as well as a graphics processing unit or co-processing unit 1436. The tangible memory 1438, 1440 may be volatile memory (e.g., registers, cache, RAM), non-volatile memory (e.g., ROM, EEPROM, flash memory, etc.), or some combination of the two, accessible by the processing unit(s). The memory 1438, 1440 stores software 1432 implementing one or more innovations described herein, in the form of computer-executable instructions suitable for execution by the processing unit(s).

A computing system may have additional features. For example, the computing environment 1430 includes one or more storage 1460, one or more input devices 1470, one or more output devices 1480, and one or more communication connections 1490. An interconnection mechanism (not shown) such as a bus, controller, or network interconnects the components of the computing environment 1430. In some embodiments, an operating system software (not shown) can provide an operating environment for other software executing in the computing environment 1430 and can coordinate activities of the components of the computing environment 1430.

The tangible storage 1460 may be removable or non-removable, and includes magnetic disks, magnetic tapes or cassettes, CD-ROMs, DVDs, or any other medium which can be used to store information in a non-transitory way, and which can be accessed within the computing environment 1430. The storage 1460 can store instructions for the software 1432 implementing one or more innovations described herein.

The input device(s) 1470 may be a touch input device such as a keyboard, mouse, pen, or trackball, a voice input device, a scanning device, or another device that provides input to the computing environment 1430. The output device(s) 1470 may be a display, printer, speaker, CD-writer, or another device that provides output from computing environment 1430.

The communication connection(s) 1490 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, radio-frequency (RF), or another carrier.

Any of the disclosed methods can be implemented as computer-executable instructions stored on one or more computer-readable storage media (e.g., one or more optical media discs, volatile memory components (such as DRAM or SRAM), or non-volatile memory components (such as flash memory or hard drives)) and executed on a computer (e.g., any commercially available computer, including smart phones or other mobile devices that include computing hardware). The term computer-readable storage media does not include communication connections, such as signals and carrier waves. Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, aspects of the disclosed technology can be implemented by software written in C++, Java, Python, Perl, any other suitable programming language. Likewise, the disclosed technology is not limited to any particular computer or type of hardware. Certain details of suitable computers and hardware are well known and need not be set forth in detail in this disclosure.

It should also be well understood that any functionality described herein can be performed, at least in part, by one or more hardware logic components, instead of software. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOC s), Complex Programmable Logic Devices (CPLDs), etc.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means. In any of the above described examples and embodiments, provision of a request (e.g., data request), indication (e.g., data signal), instruction (e.g., control signal), or any other communication between systems, components, devices, etc. can be by generation and transmission of an appropriate electrical signal by wired or wireless connections.

XII. Additional Examples of the Disclosed Technology

In view of the above-described implementations of the disclosed subject matter, this application discloses the additional examples in the clauses enumerated below. It should be noted that one feature of a clause in isolation, or more than one feature of the clause taken in combination, and, optionally, in combination with one or more features of one or more further clauses are further examples also falling within the disclosure of this application.

Clause 1. A system comprising:
(a) a vehicle comprising a pneumatic source of pressurized air;
(b) a first arm assembly comprising:
  (i) at least one axially-extendable arm having a first end coupled to the vehicle and a second end opposite the first end along an axial direction of the arm;
  (ii) at least one linear actuator coupled to the at least one axially-extendable arm; and
  (iii) a first end effector releasably coupled proximal to the second end of the at least one axially-extendable arm, the first end effector comprising a gladhand coupling portion configured to be coupled to a gladhand receptacle of a trailer;
(c) first and second cable portions extending between the vehicle and a distal portion of the first arm assembly;
(d) at least one cable actuator configured to independently change respective lengths of the first and second cable portions between the vehicle and the distal portion of the first arm assembly; and
(e) an air supply line coupled to the vehicle and the first end effector, the air supply line being configured to deliver pressurized air from the pneumatic source to a braking system of the trailer when the gladhand coupling portion is coupled to the gladhand receptacle.

Clause 2. The system of any clause or example herein, in particular, Clause 1, further comprising:
one or more sensors mounted on the vehicle and configured to detect features in an environment surrounding the vehicle; and
a control system operatively coupled to the one or more sensors, the first arm assembly, and the at least one cable actuator, the control system comprising one or more processors and one or more non-transitory computer-readable media storing computer-readable instructions that, when executed by the one or more processors, cause the one or more processors to:
identify, based at least in part on one or more signals from the one or more sensors, the gladhand receptacle of the trailer;
plan a path so as to position the gladhand coupling portion of the first end effector with respect to the identified gladhand receptacle of the trailer;
move, via the at least one linear actuator and/or the at least one cable actuator, the first end effector along the planned path;
connect the gladhand coupling portion to the identified gladhand receptacle;
disconnect the first end effector from a remainder of the first arm assembly; and
move, via the at least one linear actuator and/or the at least one cable actuator, the remainder of the first arm assembly to a stowed position remote from the trailer.

Clause 3. The system of any clause or example herein, in particular, any one of Clauses 1-2, wherein:
the vehicle comprises a drive-by-wire kit and one or more motors;
the system further comprises:
  one or more sensors mounted on the vehicle and configured to detect features in an environment surrounding the vehicle; and
  a control system operatively coupled to the one or more sensors and the vehicle, the control system comprising one or more processors and one or more non-transitory computer-readable media storing computer-readable instructions that, when executed by the one or more processors, cause the one or more processors to autonomously operate the vehicle via the drive-by-wire kit and the one or motors.

Clause 4. The system of any clause or example herein, in particular, any one of Clauses 1-3, further comprising one or more second end effectors configured to be coupled proximal to the second end of the at least one axially-extendable arm.

Clause 5. The system of any clause or example herein, in particular, Clause 4, wherein the one or more second end effectors are stored in an actuatable library or passive holder disposed on the vehicle.

Clause 6. The system of any clause or example herein, in particular, any one of Clauses 4-5, further comprising a second arm assembly configured to select and/or load one of the one or more second end effectors onto the first arm assembly.

Clause 7. The system of any clause or example herein, in particular, any one of Clauses 4-6, further comprising a manifold configured to redirect pressurized air from the pneumatic source to a selected one of the first and second end effectors.

Clause 8. The system of any clause or example herein, in particular, any one of Clauses 1-7, wherein the gladhand coupling portion of the first end effector comprises first and second parts that clamp together from opposite sides of the gladhand receptacle in order to couple the gladhand coupling portion to the gladhand receptacle.

Clause 9. The system of any clause or example herein, in particular, Clause 8, wherein one of the first and second parts comprises an alignment member extending therefrom and configured to be inserted into a pneumatic port of the gladhand receptacle when the gladhand coupling portion is coupled to the gladhand receptacle.

Clause 10. The system of any clause or example herein, in particular, any one of Clauses 8-9, wherein the first end effector further comprises at least one of an electric motor, a hydraulic actuator, a hydraulic supply line, a pneumatic actuator, a pneumatic supply line, a spring, or any combination of the foregoing configured to supply a clamping force between the first and second parts of the gladhand coupling portion.

Clause 11. The system of any clause or example herein, in particular, any one of Clauses 1-10, wherein the first end effector has a first mating member, the first arm assembly comprises a second mating member at the second end of the at least one axially-extendable arm, and the first end effector is coupled via contact between the first and second mating members.

Clause 12. The system of any clause or example herein, in particular, Clause 11, wherein at least one of the first and second mating members comprises a permanent magnet, an electromagnet, servo lock, or any combination of the foregoing configured to retain the first end effector to the first arm assembly.

Clause 13. The system of any clause or example herein, in particular, any one of Clauses 11-12, wherein the first end effector is retained to the first arm assembly by magnetic attraction between the first and second mating members or vacuum applied between the first and second mating members.

Clause 14. The system of any clause or example herein, in particular, any one of Clauses 11-13, wherein the first mating member has a non-planar, three-dimensional shape, and the second mating member has a shape complementary to that of the first mating member.

Clause 15. The system of any clause or example herein, in particular, any one of Clauses 11-14, wherein the first and second mating members is V-shaped, pyramid-shaped, dome-shaped, or polyhedron-shaped.

Clause 16. The system of any clause or example herein, in particular, any one of Clauses 11-15, wherein one of the first and second mating members has at least one projecting member and the other of the first and second mating members has at least one recessed member or hole, the at least one projecting member being configured to fit into a respective one of the at least one recessed member or hole so as to provide alignment between the first and second mating members.

Clause 17. The system of any clause or example herein, in particular, any one of Clauses 11-16, wherein one of the first and second mating members comprises a displacement sensor configured to detect misalignment between the first and second mating members.

Clause 18. The system of any clause or example herein, in particular, any one of Clauses 1-17, wherein:
  an adapter providing a fluidic connection to the gladhand receptable of the trailer, the adapter having a first connector coupled to the gladhand receptacle and a second connector extending away from the gladhand receptacle; and
  the gladhand coupling portion of the adapter comprises a third connector different than the first connector.

Clause 19. The system of any clause or example herein, in particular, Clause 18, wherein the second connector is one of a male quick connect pneumatic coupler and a female quick connect pneumatic coupler, and the third connector is the other of the male quick connect pneumatic coupler and the female quick connect pneumatic coupler.

Clause 20. The system of any clause or example herein, in particular, any one of Clauses 18-19, wherein the end effector further comprises a guide member with a tapered interior region configured to guide the second connector toward the third connector during coupling of the gladhand coupling portion to the adapter.

Clause 21. The system of any clause or example herein, in particular, any one of Clauses 18-20, wherein the gladhand receptacle, the first connector, or both of the foregoing satisfy Society of Automotive Engineers (SAE) Standard J318_202106 or International Organization for Standardization (ISO) Standard 1728:2006.

Clause 22. The system of any clause or example herein, in particular, any one of Clauses 1-21, further comprising a pneumatic line support system disposed on the vehicle and configured to hold a portion of the air supply line away from obstacles during movement of the first arm assembly.

Clause 23. The system of any clause or example herein, in particular, any one of Clauses 1-22, further comprising a pneumatic line dispenser disposed on the vehicle and configured to change a change an exposed length of the air supply line in response to movement of the first end effector.

Clause 24. The system of any clause or example herein, in particular, any one of Clauses 1-23, wherein the at least one axially-extendable arm is a single axially-extendable arm coupled to the vehicle via a universal joint.

Clause 25. The system of any clause or example herein, in particular, Clause 24, wherein the vehicle comprises a linear traveler coupled to the universal joint, the linear traveler being configured to position the universal joint along a horizontal direction perpendicular to a longitudinal direction of the vehicle.

Clause 26. The system of any clause or example herein, in particular, any one of Clauses 24-25, wherein the at least one linear actuator is three linear actuators, each linear actuator being coupled at one end thereof to the single axially-extendable arm and being coupled at an opposite end thereof to a distal member supporting the first end effector thereon.

Clause 27. The system of any clause or example herein, in particular, any one of Clauses 1-23, wherein:
  the at least one axially-extendable arm is three axially-extendable arms; and
  the at least one linear actuator is three linear actuators, each linear actuator being coupled to and controlling extension of a respective one of the axially-extendable arms.

Clause 28. The system of any clause or example herein, in particular, any one of Clauses 1-27, wherein each axially-extendable arm is coupled to the vehicle at the first end via a respective first universal joint and coupled to a mating member at the second end via a respective second universal joint.

Clause 29. The system of any clause or example herein, in particular, any one of Clauses 1-28, wherein the first end effector comprises at least one sensor configured to detect the gladhand receptacle.

Clause 30. The system of any clause or example herein, in particular, Clause 29, wherein the at least one sensor comprises an optical camera, an infrared imager, a light detection and ranging (LIDAR) system, a radio detection and ranging (RADAR) system, an acoustic sensor, an ultrasonic sensor, or any combination of the foregoing.

Clause 31. The system of any clause or example herein, in particular, any one of Clauses 1-30, wherein:
  the gladhand receptacle is rotatable between a first position and a second position,
  in the first position, the gladhand receptacle has a parallel orientation to a front surface of the trailer such that a pneumatic port of the gladhand receptacle faces toward the trailer,
  in the second position, the gladhand receptacle has a non-parallel orientation to the front surface such that the pneumatic port is exposed, and
  the system further comprises a position holding device coupled to the gladhand receptacle and configured to retain the gladhand receptacle in the second position prior to and after the gladhand coupling portion is coupled to the gladhand receptacle.

Clause 32. The system of any clause or example herein, in particular, Clause 31, wherein the position holding device comprises a spring-loaded member, an inflatable member, a pneumatic actuator, a hydraulic actuator, a rotary actuator, a mechanical standoff, or any combination of the foregoing.

Clause 33. The system of any clause or example herein, in particular, any one of Clauses 31-32, further comprising:
one or more sensors mounted on the vehicle and configured to detect features in an environment surrounding the vehicle; and
a control system operatively coupled to the one or more sensors, the first arm assembly, and the at least one cable actuator, the control system comprising one or more processors and one or more non-transitory computer-readable media storing computer-readable instructions that, when executed by the one or more processors, cause the one or more processors to:
identify, based at least in part on one or more signals from the one or more sensors, the gladhand receptacle in the first position and a pivot or hinge of the gladhand receptacle;
plan a first path so as to position a part of the first arm assembly to grasp a portion of the gladhand receptacle remote from the identified pivot or hinge;
move, via the at least one linear actuator and/or the at least one cable actuator, the part of the first arm assembly along the first planned path;
grasp, via the part of the first arm assembly, the portion of the gladhand receptacle remote from the identified pivot or hinge;
plan a second path for the part of the first arm assembly so as to rotate the gladhand receptacle from the first position to the second position;
move, via the at least one linear actuator and/or the at least one cable actuator, the part of the first arm assembly along the second planned path; and
deploy the position holding device to retain the gladhand receptacle in the second position.

Clause 34. The system of any clause or example herein, in particular, Clause 33, wherein the part of the first arm assembly comprises a gripping member, a magnetic member, a lasso member a lever arm, an actuator, or any combination of the foregoing.

Clause 35. The system of any clause or example herein, in particular, any one of Clauses 31-32, wherein the first arm assembly comprises an end-of-arm (EOA) tool configured to reposition the gladhand receptacle from the first position to the second position.

Clause 36. The system of any clause or example herein, in particular, Clause 35, wherein the EOA tool comprises at least one actuator configured to move a portion of the EOA tool relative to the at least one axially-extendable arm.

Clause 37. The system of any clause or example herein, in particular, Clause 36, wherein the at least one actuator is a rotator actuator, and/or the EOA tool comprises a lever arm coupled to the rotary actuator and constructed to engage a portion of the gladhand receptacle remote from a pivot or hinge of the gladhand receptacle.

Clause 38. The system of any clause or example herein, in particular, Clause 37, further comprising:
one or more sensors mounted on the vehicle and configured to detect features in an environment surrounding the vehicle; and
a control system operatively coupled to the one or more sensors, the first arm assembly including the EOA tool, and the at least one cable actuator, the control system comprising one or more processors and one or more non-transitory computer-readable media storing computer-readable instructions that, when executed by the one or more processors, cause the one or more processors to:
identify, based at least in part on one or more signals from the one or more sensors, the gladhand receptacle in the first position, a pivot or hinge of the gladhand receptacle, and the portion of the gladhand receptacle remote from the pivot or hinge;
plan a path so as to position EOA tool such that a rotation axis or pivot point of the rotary actuator is substantially aligned with a rotation axis of the identified pivot or hinge of the gladhand receptacle;
move, via the at least one linear actuator and/or the at least one cable actuator, the first arm assembly along the planned path;
engage the lever arm of the EOA tool with the identified portion of the gladhand receptacle remote from the pivot or hinge;
move, via the rotary actuator of the EOA tool, the lever arm so as to reposition the gladhand receptacle in the second position; and
deploy the position holding device to retain the gladhand receptacle in the second position.

Clause 39. The system of any clause or example herein, in particular, any one of Clauses 1-30, wherein:
the gladhand receptacle is rotatable between a first position and a second position,
in the first position, the gladhand receptacle has a parallel orientation to a front surface of the trailer such that a pneumatic port of the gladhand receptacle faces toward the trailer,
in the second position, the gladhand receptacle has a non-parallel orientation to the front surface such that the pneumatic port is exposed, and
the first arm assembly comprises an end-of-arm (EOA) tool configured to reposition the gladhand receptacle from the first position to the second position.

Clause 40. The system of any clause or example herein, in particular, Clause 39, wherein the EOA tool comprises at least one actuator configured to move a portion of the EOA tool relative to the at least one axially-extendable arm.

Clause 41. The system of any clause or example herein, in particular, Clause 40, wherein the at least one actuator is a rotary actuator, and/or the EOA tool comprises a lever arm coupled to the rotary actuator and constructed to engage a portion of the gladhand receptacle remote from a pivot or hinge of the gladhand receptacle.

Clause 42. The system of any clause or example herein, in particular, Clause 41, further comprising:
one or more sensors mounted on the vehicle and configured to detect features in an environment surrounding the vehicle; and
a control system operatively coupled to the one or more sensors, the first arm assembly including the EOA tool, and the at least one cable actuator, the control system comprising one or more processors and one or more non-transitory computer-readable media storing computer-readable instructions that, when executed by the one or more processors, cause the one or more processors to:
identify, based at least in part on one or more signals from the one or more sensors, the gladhand receptacle in the first position, a pivot or hinge of the gladhand receptacle, and the portion of the gladhand receptacle remote from the pivot or hinge;
plan a path so as to position EOA tool such that a rotation axis or pivot point of the rotary actuator is substantially aligned with a rotation axis of the identified pivot or hinge of the gladhand receptacle;

move, via the at least one linear actuator and/or the at least one cable actuator, the first arm assembly along the planned path;

engage the lever arm of the EOA tool with the identified portion of the gladhand receptacle remote from the pivot or hinge;

move, via the rotary actuator of the EOA tool, the lever arm so as to reposition the gladhand receptacle in the second position;

connect, via the first end effector, the gladhand coupling portion to the gladhand receptacle in the second position;

disconnect the first end effector from a remainder of the first arm assembly; and move, via the at least one linear actuator and/or the at least one cable actuator, the remainder of the first arm assembly to a stowed position remote from the trailer.

Clause 43. The system of any clause or example herein, in particular, any one of Clauses 1-30, wherein:

the gladhand receptacle is rotatable between a first position and a second position, in the first position, the gladhand receptacle has a parallel orientation to a front surface of the trailer such that a pneumatic port of the gladhand receptacle faces toward the trailer, in the second position, the gladhand receptacle has a non-parallel orientation to the front surface such that the pneumatic port is exposed, and the system further comprises:

one or more sensors mounted on the vehicle and configured to detect features in an environment surrounding the vehicle; and a control system operatively coupled to the one or more sensors, the first arm assembly, and the at least one cable actuator, the control system comprising one or more processors and one or more non-transitory computer-readable media storing computer-readable instructions that, when executed by the one or more processors, cause the one or more processors to:

identify, based at least in part on one or more signals from the one or more sensors, the gladhand receptacle in the first position and a pivot or hinge of the gladhand receptacle;

plan a first path so as to position a part of the first arm assembly to grasp a portion of the gladhand receptacle remote from the identified pivot or hinge;

move, via the at least one linear actuator and/or the at least one cable actuator, the part of the first arm assembly along the first planned path;

grasp, via the part of the first arm assembly, the portion of the gladhand receptacle remote from the identified pivot or hinge;

plan a second path for the part of the first arm assembly so as to rotate the gladhand receptacle from the first position to the second position;

move, via the at least one linear actuator and/or the at least one cable actuator, the part of the first arm assembly along the second planned path such that the gladhand receptacle is in the second position;

connect the gladhand coupling portion to the gladhand receptacle in the second position;

disconnect the first end effector from a remainder of the first arm assembly; and move, via the at least one linear actuator and/or the at least one cable actuator, the remainder of the first arm assembly to a stowed position remote from the trailer.

Clause 44. The system of any clause or example herein, in particular, any one of Clauses 1-30, wherein:

the gladhand receptacle is rotatable between a first position and a second position, in the first position, the gladhand receptacle has a parallel orientation to a front surface of the trailer such that a pneumatic port of the gladhand receptacle faces toward the trailer, in the second position, the gladhand receptacle has a non-parallel orientation to the front surface such that the pneumatic port is exposed, and the system further comprises:

one or more sensors mounted on the vehicle and configured to detect features in an environment surrounding the vehicle;

a second arm assembly; and a control system operatively coupled to the one or more sensors, the first arm assembly, the second arm assembly, and the at least one cable actuator, the control system comprising one or more processors and one or more non-transitory computer-readable media storing computer-readable instructions that, when executed by the one or more processors, cause the one or more processors to:

identify, based at least in part on one or more signals from the one or more sensors, the gladhand receptacle in the first position and a pivot or hinge of the gladhand receptacle;

plan a first path so as to position the second arm assembly to grasp a portion of the gladhand receptacle remote from the identified pivot or hinge;

move the second arm assembly along the first planned path;

grasp, via the second arm assembly, the portion of the gladhand receptacle remote from the identified pivot or hinge;

plan a second path for the second arm assembly so as to rotate the gladhand receptacle from the first position to the second position;

move the second arm assembly along the second planned path such that the gladhand receptacle is in the second position;

plan a third path for the first end effector so as to position the gladhand coupling portion of the first end effector with respect to the gladhand receptacle in the second position;

move, via the at least one linear actuator and/or the at least one cable actuator, the first end effector along the planned third path;

connect the gladhand coupling portion to the gladhand receptacle in the second position;

disconnect the first end effector from a remainder of the first arm assembly; and move, via the at least one linear actuator and/or the at least one cable actuator, the remainder of the first arm assembly to a stowed position remote from the trailer.

Clause 45. An autonomous gladhands coupling system, comprising:

a positionable arm; and an end effector releasably coupled to the arm and configured to clamp around a gladhands receptacle attached to a trailer, wherein the end effector is configured to be decoupled from the arm such that an air coupling is connected to the gladhands receptacle.

Clause 46. The system of any clause or example herein, in particular, any one of Clauses 1-45, further comprising a second end effector releasably coupled to the arm and configured to clamp around a second gladhands receptacle attached to the trailer.

Clause 47. The system of any clause or example herein, in particular, any one of Clauses 1-46, wherein each end effector has an alignment pin that is inserted into the gasket of the respective gladhands receptacle so as to provide alignment during coupling and/or support while under pressure.

Clause 48. The system of any clause or example herein, in particular, any one of Clauses 1-47, wherein the clamping force is provided by an electric motor, a hydraulic actuator or line, a pneumatic actuator or line, or any combination of the foregoing.

Clause 49. The system of any clause or example herein, in particular, any one of Clauses 1-48, wherein alignment between the arm and the end effector is provided by mechanical interaction between conforming shapes.

Clause 50. The system of any clause or example herein, in particular, Clause 49, wherein the conforming shapes comprise a pyramid shape, a plate with alignment pins or projections, or any combination of the foregoing.

Clause 51. The system of any clause or example herein, in particular, any one of Clauses 1-50, wherein the releasable coupling between the arm and the end effector is achieved by an electromagnet, a servo lock, or any combination of the foregoing.

Clause 52. The system of any clause or example herein, in particular, any one of Clauses 1-51, further comprising a pair of actuating members coupled to the arm.

Clause 53. The system of any clause or example herein, in particular, Clause 52, wherein one or both of the actuating members comprises a wire or cable.

Clause 54. The system of any clause or example herein, in particular, any one of Clauses 1-53, wherein the arm is a linear-extensible beam.

Clause 55. The system of any clause or example herein, in particular, any one of Clauses 1-54, further comprising a traveler coupled to the tractor and the arm so as to provide at least one additional degree of freedom to positioning of the end effector.

Clause 56. The system of any clause or example herein, in particular, any one of Clauses 1-55, further comprising a user interface configured to allow an operator to manually control positioning of the arm and/or end effector.

Clause 57. The system of any clause or example herein, in particular, any one of Clauses 1-56, further comprising a controller configured to automatically control positioning of the arm and/or end effector.

Clause 58. The system of any clause or example herein, in particular, any one of Clauses 1-57, further comprising at least one sensor constructed to detect the gladhands receptacle, wherein the at least one sensor comprises an optical camera, an infrared imager, a light detection and ranging (LIDAR) system, a radar system, an acoustic sensor, an ultrasonic sensor, or any combination of the foregoing, and/or the at least one sensor is configured to assist in aligning the end effector with the gladhands receptacle.

Clause 59. The system of any clause or example herein, in particular, Clause 58, wherein the controller employs artificial intelligence (AI) or machine learning to process data from the at least one sensor and/or to align the end effector and the gladhands receptacle.

Clause 60. An autonomous gladhands coupling system, comprising:
an arm attached to a tractor;
an adaptor configured to be coupled to a gladhands receptacle attached to a trailer and comprising a first quick connect pneumatic coupler; and
an end effector releasably coupled to the arm and comprising a second quick connect pneumatic coupler configured to be coupled to the first quick connect pneumatic coupler,
wherein the end effector is configured to be decoupled from the arm such that an air coupling is connected to the gladhands receptacle via the first and second quick connect pneumatic couplers.

Clause 61. The system of any clause or example herein, in particular, Clause 60, wherein one of the first and second quick connect pneumatic couplers is motorized to allow decoupling of the pneumatic couplers.

Clause 62. The system of any clause or example herein, in particular, any one of Clauses 60-61, wherein one of the first and second quick connect pneumatic couplers comprises a funnel to guide the first and second quick connect pneumatic couplers together during coupling.

Clause 63. The system of any clause or example herein, in particular, any one of Clauses 1-62, further comprising one or more first strain sensors coupled to the arm, one or more second strain sensor coupled to the end effector, one or more third strain sensors coupled to the actuating members, or any combination of the foregoing.

Clause 64. The system of any clause or example herein, in particular, any one of Clauses 1-63, further comprising a remote user interface configured to control the arm and/or end effectors.

Clause 65. The system of any clause or example herein, in particular, any one of Clauses 1-64, wherein the arm is coupled to or a part of a rear of a first trailer for connecting to another trailer.

Clause 66. The system of any clause or example herein, in particular, any one of Clauses 1-64, wherein the arm is coupled to or a part of a rear of a tractor for connecting to a trailer.

Clause 67. The system of any clause or example herein, in particular, any one of Clauses 1-64, wherein the arm is coupled to or a part of a front of a trailer for connecting to a tractor.

Clause 68. The system of any clause or example herein, in particular, any one of Clauses 1-67, further comprising a safety system configured to decouple the end effector from the gladhands receptacle so as to provide emergency braking of the trailer.

Clause 69. A method for operating the system of any clause or example herein, in particular, any one of Clauses 1-68.

XIII. Rules of Interpretation

Throughout the description herein and unless otherwise specified, the following terms may include and/or encompass the example meanings provided. These terms and illustrative example meanings are provided to clarify the language selected to describe embodiments both in the specification and in the appended points of focus, and accordingly, are not intended to be generally limiting. While not generally limiting and while not limiting for all described embodiments, in some embodiments, the terms are specifically limited to the example definitions and/or examples provided. Other terms are defined throughout the present description.

Some embodiments described herein are associated with a "user device" or a "network device". As used herein, the terms "user device" and "network device" may be used interchangeably and may generally refer to any device that can communicate via a network. Examples of user or network devices include a PC, a workstation, a server, a printer, a scanner, a facsimile machine, a copier, a Personal Digital Assistant (PDA), a storage device (e.g., a disk drive), a hub, a router, a switch, and a modem, a video game console, or a wireless phone. User and network devices may comprise one or more communication or network components. As used herein, a "user" may generally refer to any individual and/or entity that operates a user device.

As used herein, the term "network component" may refer to a user or network device, or a component, piece, portion, or combination of user or network devices. Examples of network components may include a Static Random Access Memory (SRAM) device or module, a network processor, and a network communication path, connection, port, or cable.

In addition, some embodiments are associated with a "network" or a "communication network". As used herein, the terms "network" and "communication network" may be used interchangeably and may refer to any object, entity, component, device, and/or any combination thereof that permits, facilitates, and/or otherwise contributes to or is associated with the transmission of messages, packets, signals, and/or other forms of information between and/or within one or more network devices. Networks may be or include a plurality of interconnected network devices. In some embodiments, networks may be hard-wired, wireless, virtual, neural, and/or any other configuration of type that is or becomes known. Communication networks may include, for example, one or more networks configured to operate in accordance with the Fast Ethernet LAN transmission standard 802.3-2002® published by the Institute of Electrical and Electronics Engineers (IEEE). In some embodiments, a network may include one or more wired and/or wireless networks operated in accordance with any communication standard or protocol that is or becomes known or practicable.

As used herein, the terms "information" and "data" may be used interchangeably and may refer to any data, text, voice, video, image, message, bit, packet, pulse, tone, waveform, and/or other type or configuration of signal and/or information. Information may comprise information packets transmitted, for example, in accordance with the Internet Protocol Version 6 (IPv6) standard as defined by "Internet Protocol Version 6 (IPv6) Specification" RFC 1883, published by the Internet Engineering Task Force (IETF), Network Working Group, S. Deering et al. (December 1995). Information may, according to some embodiments, be compressed, encoded, encrypted, and/or otherwise packaged or manipulated in accordance with any method that is or becomes known or practicable.

In addition, some embodiments described herein are associated with an "indication". As used herein, the term "indication" may be used to refer to any indicia and/or other information indicative of or associated with a subject, item, entity, and/or other object and/or idea. As used herein, the phrases "information indicative of" and "indicia" may be used to refer to any information that represents, describes, and/or is otherwise associated with a related entity, subject, or object. Indicia of information may include, for example, a code, a reference, a link, a signal, an identifier, and/or any combination thereof and/or any other informative representation associated with the information. In some embodiments, indicia of information (or indicative of the information) may be or include the information itself and/or any portion or component of the information. In some embodiments, an indication may include a request, a solicitation, a broadcast, and/or any other form of information gathering and/or dissemination.

Numerous embodiments are described in this patent application and are presented for illustrative purposes only. The described embodiments are not, and are not intended to be, limiting in any sense. The presently disclosed invention(s) are widely applicable to numerous embodiments, as is readily apparent from the disclosure. One of ordinary skill in the art will recognize that the disclosed invention(s) may be practiced with various modifications and alterations, such as structural, logical, software, and electrical modifications. Although particular features of the disclosed invention(s) may be described with reference to one or more particular embodiments and/or drawings, it should be understood that such features are not limited to usage in the one or more particular embodiments or drawings with reference to which they are described, unless expressly specified otherwise.

The present disclosure is neither a literal description of all embodiments of the invention nor a listing of features of the invention that must be present in all embodiments. A description of an embodiment with several components or features does not imply that all or even any of such components and/or features are required. On the contrary, a variety of optional components are described to illustrate the wide variety of possible embodiments of the present invention(s). Unless otherwise specified explicitly, no component and/or feature is essential or required. Although a product may be described as including a plurality of components, aspects, qualities, characteristics and/or features, that does not indicate that all of the plurality are essential or required. Various other embodiments within the scope of the described invention(s) include other products that omit some or all of the described plurality. A description of an embodiment with several components or features does not imply that all or even any of such components and/or features are required. On the contrary, a variety of optional components are described to illustrate the wide variety of possible embodiments of the present invention(s). Unless otherwise specified explicitly, no component and/or feature is essential or required.

Neither the Title (set forth at the beginning of the first page of this patent application) nor the Abstract (set forth at the end of this patent application) is to be taken as limiting in any way as the scope of the disclosed invention(s). Headings of sections provided in this patent application are for convenience only, and are not to be taken as limiting the disclosure in any way.

All definitions, as defined and used herein, should be understood to control over dictionary definitions, definitions in documents incorporated by reference, and/or ordinary meanings of the defined terms. The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents.

The term "product" means any machine, manufacture and/or composition of matter as contemplated by 35 U.S.C. § 101, unless expressly specified otherwise.

The terms "an embodiment", "embodiment", "embodiments", "the embodiment", "the embodiments", "one or more embodiments", "some embodiments", "one embodiment" and the like mean "one or more (but not all) disclosed embodiments", unless expressly specified otherwise. Reference throughout this specification to "one embodiment" or "an embodiment" means that a particular feature, structure, or characteristic described in connection with the embodiment is included in at least one embodiment. Thus, appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

A reference to "another embodiment" in describing an embodiment does not imply that the referenced embodiment is mutually exclusive with another embodiment (e.g., an embodiment described before the referenced embodiment), unless expressly specified otherwise.

The indefinite articles "a" and "an," as used herein in the specification and in the claims, unless clearly indicated to the contrary, should be understood to mean "at least one" or "one or more".

The phrase "and/or," as used herein in the specification and in the claims, should be understood to mean "either or both" of the elements so conjoined, i.e., elements that are conjunctively present in some cases and disjunctively present in other cases. Other elements may optionally be present other than the elements specifically identified by the "and/or" clause, whether related or unrelated to those elements specifically identified, unless clearly indicated to the contrary.

The term "plurality" means "two or more", unless expressly specified otherwise.

The term "herein" means "in the present application, including anything which may be incorporated by reference", unless expressly specified otherwise.

The phrase "at least one of", when such phrase modifies a plurality of things (such as an enumerated list of things) means any combination of one or more of those things, unless expressly specified otherwise. For example, the phrase at least one of a widget, a car and a wheel means either (i) a widget, (ii) a car, (iii) a wheel, (iv) a widget and a car, (v) a widget and a wheel, (vi) a car and a wheel, or (vii) a widget, a car and a wheel.

The phrase "based on" does not mean "based only on", unless expressly specified otherwise. In other words, the phrase "based on" describes both "based only on" and "based at least on".

The disclosure of numerical ranges should be understood as referring to each discrete point within the range, inclusive of endpoints, unless otherwise noted. Unless otherwise indicated, all numbers expressing quantities of components, molecular weights, percentages, temperatures, times, and so forth, as used in the specification or claims are to be understood as being modified by the term "about." Accordingly, unless otherwise implicitly or explicitly indicated, or unless the context is properly understood by a person of ordinary skill in the art to have a more definitive construction, the numerical parameters set forth are approximations that may depend on the desired properties sought and/or limits of detection under standard test conditions/methods, as known to those of ordinary skill in the art. When directly and explicitly distinguishing embodiments from discussed prior art, the embodiment numbers are not approximates unless the word "about" is recited. Whenever "substantially," "approximately," "about," or similar language is explicitly used in combination with a specific value, variations up to and including ten percent (10%) of that value are intended, unless explicitly stated otherwise.

Directions and other relative references may be used to facilitate discussion of the drawings and principles herein, but are not intended to be limiting. For example, certain terms may be used such as "inner," "outer", "upper," "lower," "top," "bottom," "interior," "exterior," "left," right," "front," "back," "rear," and the like. Such terms are used, where applicable, to provide some clarity of description when dealing with relative relationships, particularly with respect to the illustrated embodiments. Such terms are not, however, intended to imply absolute relationships, positions, and/or orientations. For example, with respect to an object, an "upper" part can become a "lower" part simply by turning the object over. Nevertheless, it is still the same part, and the object remains the same. Similarly, while the terms "horizontal" and "vertical" may be utilized herein, such terms may refer to any normal geometric planes regardless of their orientation with respect to true horizontal or vertical directions (e.g., with respect to the vector of gravitational acceleration).

A description of an embodiment with several components or features does not imply that all or even any of such components and/or features are required. On the contrary, a variety of optional components are described to illustrate the wide variety of possible embodiments of the present invention(s). Unless otherwise specified explicitly, no component and/or feature is essential or required.

Where a limitation of a first claim would cover one of a feature as well as more than one of a feature (e.g., a limitation such as "at least one widget" covers one widget as well as more than one widget), and where in a second claim that depends on the first claim, the second claim uses a definite article "the" to refer to the limitation (e.g., "the widget"), this does not imply that the first claim covers only one of the feature, and this does not imply that the second claim covers only one of the feature (e.g., "the widget" can cover both one widget and more than one widget).

Each process (whether called a method, algorithm or otherwise) inherently includes one or more steps, and therefore all references to a "step" or "steps" of a process have an inherent antecedent basis in the mere recitation of the term 'process' or a like term. Accordingly, any reference in a claim to a 'step' or 'steps' of a process has sufficient antecedent basis.

Further, although process steps, algorithms or the like may be described in a sequential order, such processes may be configured to work in different orders. In other words, any sequence or order of steps that may be explicitly described does not necessarily indicate a requirement that the steps be performed in that order. The steps of processes described herein may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to the invention, and does not imply that the illustrated process is preferred.

Although a process may be described as including a plurality of steps, that does not indicate that all or even any of the steps are essential or required. Various other embodiments within the scope of the described invention(s) include other processes that omit some or all of the described steps. Unless otherwise specified explicitly, no step is essential or required.

When an ordinal number (such as "first", "second", "third" and so on) is used as an adjective before a term, that ordinal number is used (unless expressly specified otherwise) merely to indicate a particular feature, such as to distinguish that particular feature from another feature that is described by the same term or by a similar term. For example, a "first widget" may be so named merely to distinguish it from, e.g., a "second widget". Thus, the mere usage of the ordinal numbers "first" and "second" before the term "widget" does not indicate any other relationship between the two widgets, and likewise does not indicate any other characteristics of either or both widgets. For example, the mere usage of the ordinal numbers "first" and "second" before the term "widget" (1) does not indicate that either widget comes before or after any other in order or location; (2) does not indicate that either widget occurs or acts before or after any other in time; and (3) does not indicate that either widget ranks above or below any other, as in importance or quality. In addition, the mere usage of ordinal numbers does not define a numerical limit to the features identified with the ordinal numbers. For example, the mere usage of the ordinal numbers "first" and "second" before the term "widget" does not indicate that there must be no more than two widgets.

An enumerated list of items (which may or may not be numbered) does not imply that any or all of the items are mutually exclusive, unless expressly specified otherwise. Likewise, an enumerated list of items (which may or may not be numbered) does not imply that any or all of the items are comprehensive of any category, unless expressly specified otherwise. For example, the enumerated list "a computer, a laptop, a PDA" does not imply that any or all of the three items of that list are mutually exclusive and does not imply that any or all of the three items of that list are comprehensive of any category.

When a single device or article is described herein, more than one device or article (whether or not they cooperate) may alternatively be used in place of the single device or article that is described. Accordingly, the functionality that is described as being possessed by a device may alternatively be possessed by more than one device or article (whether or not they cooperate).

Similarly, where more than one device or article is described herein (whether or not they cooperate), a single device or article may alternatively be used in place of the more than one device or article that is described. For example, a plurality of computer-based devices may be substituted with a single computer-based device. Accordingly, the various functionality that is described as being possessed by more than one device or article may alternatively be possessed by a single device or article.

The functionality and/or the features of a single device that is described may be alternatively embodied by one or more other devices which are described but are not explicitly described as having such functionality and/or features. Thus, other embodiments need not include the described device itself, but rather can include the one or more other devices which would, in those other embodiments, have such functionality/features.

Devices that are in communication with each other need not be in continuous communication with each other, unless expressly specified otherwise. On the contrary, such devices need only transmit to each other as necessary or desirable, and may actually refrain from exchanging data most of the time. For example, a machine in communication with another machine via the Internet may not transmit data to the other machine for weeks at a time. In addition, devices that are in communication with each other may communicate directly or indirectly through one or more intermediaries.

"Determining" something can be performed in a variety of manners and therefore the term "determining" (and like terms) includes calculating, computing, deriving, looking up (e.g., in a table, database or data structure), ascertaining and the like. The term "computing" as utilized herein may generally refer to any number, sequence, and/or type of electronic processing activities performed by an electronic device, such as, but not limited to looking up (e.g., accessing a lookup table or array), calculating (e.g., utilizing multiple numeric values in accordance with a mathematic formula), deriving, and/or defining.

The terms "including", "comprising" and variations thereof mean "including but not limited to", unless expressly specified otherwise. As used herein, "comprising" means "including," and the singular forms "a" or "an" or "the" include plural references unless the context clearly dictates otherwise. The term "or" refers to a single element of stated alternative elements or a combination of two or more elements, unless the context clearly indicates otherwise.

It will be readily apparent that the various methods and algorithms described herein may be implemented by, e.g., appropriately and/or specially-programmed computers and/or computing devices. Typically a processor (e.g., one or more microprocessors) will receive instructions from a memory or like device, and execute those instructions, thereby performing one or more processes defined by those instructions. Further, programs that implement such methods and algorithms may be stored and transmitted using a variety of media (e.g., computer readable media) in a number of manners. In some embodiments, hard-wired circuitry or custom hardware may be used in place of, or in combination with, software instructions for implementation of the processes of various embodiments. Thus, embodiments are not limited to any specific combination of hardware and software.

A "processor" generally means any one or more microprocessors, CPU devices, computing devices, microcontrollers, digital signal processors, or like devices, as further described herein.

The term "computer-readable medium" refers to any medium that participates in providing data (e.g., instructions or other information) that may be read by a computer, a processor or a like device. Such a medium may take many forms, including but not limited to, non-volatile media, volatile media, and transmission media. Non-volatile media include, for example, optical or magnetic disks and other persistent memory. Volatile media include DRAM, which typically constitutes the main memory. Transmission media include coaxial cables, copper wire and fiber optics, including the wires that comprise a system bus coupled to the processor. Transmission media may include or convey acoustic waves, light waves and electromagnetic emissions, such as those generated during RF and IR data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave, or any other medium from which a computer can read.

The term "computer-readable memory" may generally refer to a subset and/or class of computer-readable medium that does not include transmission media, such as waveforms, carrier waves, electromagnetic emissions, etc. Computer-readable memory may typically include physical media upon which data (e.g., instructions or other information) are stored, such as optical or magnetic disks and other persistent memory, DRAM, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, computer hard drives, backup tapes, Universal Serial Bus (USB) memory devices, and the like.

Various forms of computer readable media may be involved in carrying data, including sequences of instructions, to a processor. For example, sequences of instruction (i) may be delivered from RAM to a processor, (ii) may be carried over a wireless transmission medium, and/or (iii) may be formatted according to numerous formats, standards or protocols, such as ultra-wideband (UWB) radio, Bluetooth™, Wi-Fi, TDMA, CDMA, 3G, 4G, 4G LTE, 5G, etc.

Where databases are described, it will be understood by one of ordinary skill in the art that (i) alternative database structures to those described may be readily employed, and (ii) other memory structures besides databases may be readily employed. Any illustrations or descriptions of any sample databases presented herein are illustrative arrangements for stored representations of information. Any number of other arrangements may be employed besides those suggested by, e.g., tables illustrated in drawings or elsewhere. Similarly, any illustrated entries of the databases represent exemplary information only; one of ordinary skill in the art will understand that the number and content of the entries can be different from those described herein. Further, despite any depiction of the databases as tables, other formats (including relational databases, object-based models and/or distributed databases) could be used to store and manipulate the data types described herein. Likewise, object methods or behaviors of a database can be used to implement various processes, such as the described herein. In addition, the databases may, in a known manner, be stored locally or remotely from a device that accesses data in such a database.

Embodiments of the disclosed subject matter can be configured to work in a network environment including a computer that is in communication, via a communications network, with one or more devices. The computer may communicate with the devices directly or indirectly, via a wired or wireless medium, such as the Internet, LAN, WAN or Ethernet, Token Ring, or via any appropriate communications means or combination of communications means. Each of the devices may comprise computers, such as those based on the Intel® Pentium® or Centrino™ processor, that are adapted to communicate with the computer. Any number and type of machines may be in communication with the computer.

XIV. Conclusion

Although particular vehicles, trailers, sensors, components, and configuration have been illustrated in the figures and discussed in detail herein, embodiments of the disclosed subject matter are not limited thereto. Indeed, one of ordinary skill in the art will readily appreciate that different vehicles (e.g., any vehicle where gladhand connections are used), trailers (e.g., tanker trailers, flat-bed trailer, reefer trailer, box trailer, etc.), sensors, components, or configurations can be selected and/or components added to provide the same effect. In practical implementations, embodiments may include additional components or other variations beyond those illustrated. Accordingly, embodiments of the disclosed subject matter are not limited to the particular vehicles, trailers, sensors, components, and configurations specifically illustrated and described herein.

Any of the features illustrated or described with respect to one of FIGS. 1A-14 and Clauses 1-69 can be combined with features illustrated or described with respect to any other of FIGS. 1A-14 and Clauses 1-69 to provide systems, methods, devices, and embodiments not otherwise illustrated or specifically described herein. All features described herein are independent of one another and, except where structurally impossible, can be used in combination with any other feature described herein.

The present disclosure provides, to one of ordinary skill in the art, an enabling description of several embodiments and/or inventions. Some of these embodiments and/or inventions may not be claimed in the present application, but may nevertheless be claimed in one or more continuing applications that claim the benefit of priority of the present application. Applicant intends to file additional applications to pursue patents for subject matter that has been disclosed and enabled but not claimed in the present application.

It will be understood that various modifications can be made to the embodiments of the present disclosure herein without departing from the scope thereof. Therefore, the above description should not be construed as limiting the disclosure, but merely as embodiments thereof. Those skilled in the art will envision other modifications within the scope of the present disclosure.

The invention claimed is:
1. A system comprising:
(a) a vehicle comprising a pneumatic source of pressurized air;
(b) a first arm assembly comprising:
(i) at least one axially-extendable arm having a first end coupled to the vehicle and a second end opposite the first end along an axial direction of the arm;
(ii) at least one linear actuator coupled to the at least one axially-extendable arm; and
(iii) a first end effector releasably coupled proximal to the second end of the at least one axially-extendable arm, the first end effector comprising a gladhand coupling portion configured to be coupled to a gladhand receptacle of a trailer;
(c) first and second cable portions extending between the vehicle and a distal portion of the first arm assembly;
(d) at least one cable actuator configured to independently change respective lengths of the first and second cable portions between the vehicle and the distal portion of the first arm assembly; and
(e) an air supply line coupled to the vehicle and the first end effector, the air supply line being configured to deliver pressurized air from the pneumatic source to a braking system of the trailer when the gladhand coupling portion is coupled to the gladhand receptacle.

2. The system of claim 1, further comprising:
one or more sensors mounted on the vehicle and configured to detect features in an environment surrounding the vehicle; and
a control system operatively coupled to the one or more sensors, the first arm assembly, and the at least one cable actuator, the control system comprising one or more processors and one or more non-transitory computer-readable media storing computer-readable instructions that, when executed by the one or more processors, cause the one or more processors to:
identify, based at least in part on one or more signals from the one or more sensors, the gladhand receptacle of the trailer;
plan a path so as to position the gladhand coupling portion of the first end effector with respect to the identified gladhand receptacle of the trailer;
move, via the at least one linear actuator and/or the at least one cable actuator, the first end effector along the planned path;
connect the gladhand coupling portion to the identified gladhand receptacle;
disconnect the first end effector from a remainder of the first arm assembly; and
move, via the at least one linear actuator and/or the at least one cable actuator, the remainder of the first arm assembly to a stowed position remote from the trailer.

3. The system of claim 2, wherein:
the vehicle comprises a drive-by-wire kit and one or more motors; and
the one or more non-transitory computer-readable media store further instructions that, when executed by the one or more processors, cause the one or more processors to autonomously operate the vehicle via the drive-by-wire kit and the one or motors.

4. The system of claim 1, wherein the gladhand coupling portion of the first end effector comprises first and second parts that clamp together from opposite sides of the gladhand receptacle in order to couple the gladhand coupling portion to the gladhand receptacle.

5. The system of claim 4, wherein one of the first and second parts comprises an alignment member extending therefrom and configured to be inserted into a pneumatic port of the gladhand receptacle when the gladhand coupling portion is coupled to the gladhand receptacle.

6. The system of claim 4, wherein the first end effector further comprises at least one of an electric motor, a hydraulic actuator, a hydraulic supply line, a pneumatic actuator, a pneumatic supply line, a spring, or any combination of the foregoing configured to supply a clamping force between the first and second parts of the gladhand coupling portion.

7. The system of claim 1, wherein the first end effector has a first mating member, the first arm assembly comprises a second mating member at the second end of the at least one axially-extendable arm, and the first end effector is coupled via contact between the first and second mating members.

8. The system of claim 7, wherein at least one of the first and second mating members comprises a permanent magnet, an electromagnet, servo lock, or any combination of the foregoing configured to retain the first end effector to the first arm assembly.

9. The system of claim 7, wherein the first end effector is retained to the first arm assembly by magnetic attraction between the first and second mating members or vacuum applied between the first and second mating members.

10. The system of claim 1, wherein:
an adapter provides a fluidic connection to the gladhand receptacle of the trailer, the adapter having a first connector coupled to the gladhand receptacle and a second connector extending away from the gladhand receptacle; and
the gladhand coupling portion of the adapter comprises a third connector different than the first connector.

11. The system of claim 10, wherein the second connector is one of a male quick connect pneumatic coupler and a female quick connect pneumatic coupler, and the third connector is the other of the male quick connect pneumatic coupler and the female quick connect pneumatic coupler.

12. The system of claim 1, wherein the at least one axially-extendable arm is a single axially-extendable arm coupled to the vehicle via a universal joint.

13. The system of claim 12, wherein the vehicle comprises a linear traveler coupled to the universal joint, the linear traveler being configured to position the universal joint along a horizontal direction perpendicular to a longitudinal direction of the vehicle.

14. The system of claim 1, wherein the first end effector comprises at least one sensor configured to detect the gladhand receptacle.

15. The system of claim 14, wherein the at least one sensor comprises an optical camera, an infrared imager, a light detection and ranging (LIDAR) system, a radio detection and ranging (RADAR) system, an acoustic sensor, an ultrasonic sensor, or any combination of the foregoing.

16. The system of claim 1, wherein:
the gladhand receptacle is rotatable between a first position and a second position,
in the first position, the gladhand receptacle has a parallel orientation to a front surface of the trailer such that a pneumatic port of the gladhand receptacle faces toward the trailer,
in the second position, the gladhand receptacle has a non-parallel orientation to the front surface such that the pneumatic port is exposed, and
the system further comprises a position holding device coupled to the gladhand receptacle and configured to retain the gladhand receptacle in the second position prior to and after the gladhand coupling portion is coupled to the gladhand receptacle.

17. The system of claim 16, further comprising:
one or more sensors mounted on the vehicle and configured to detect features in an environment surrounding the vehicle; and
a control system operatively coupled to the one or more sensors, the first arm assembly, and the at least one cable actuator, the control system comprising one or more processors and one or more non-transitory computer-readable media storing computer-readable instructions that, when executed by the one or more processors, cause the one or more processors to:
identify, based at least in part on one or more signals from the one or more sensors, the gladhand receptacle in the first position and a pivot or hinge of the gladhand receptacle;
plan a first path so as to position a part of the first arm assembly to grasp a portion of the gladhand receptacle remote from the identified pivot or hinge;
move, via the at least one linear actuator and/or the at least one cable actuator, the part of the first arm assembly along the first planned path;

grasp, via the part of the first arm assembly, the portion of the gladhand receptacle remote from the identified pivot or hinge;

plan a second path for the part of the first arm assembly so as to rotate the gladhand receptacle from the first position to the second position;

move, via the at least one linear actuator and/or the at least one cable actuator, the part of the first arm assembly along the second planned path; and deploy the position holding device to retain the gladhand receptacle in the second position.

18. The system of claim 17, wherein the part of the first arm assembly comprises a gripping member, a magnetic member, a lasso member, a lever arm, an actuator, or any combination of the foregoing.

19. The system of claim 1, wherein:
the gladhand receptacle is rotatable between a first position and a second position,
in the first position, the gladhand receptacle has a parallel orientation to a front surface of the trailer such that a pneumatic port of the gladhand receptacle faces toward the trailer,
in the second position, the gladhand receptacle has a non-parallel orientation to the front surface such that the pneumatic port is exposed, and
the first arm assembly comprises an end-of-arm (EOA) tool configured to reposition the gladhand receptacle from the first position to the second position.

20. The system of claim 1, wherein:
the gladhand receptacle is rotatable between a first position and a second position,
in the first position, the gladhand receptacle has a parallel orientation to a front surface of the trailer such that a pneumatic port of the gladhand receptacle faces toward the trailer,
in the second position, the gladhand receptacle has a non-parallel orientation to the front surface such that the pneumatic port is exposed, and the system further comprises:
one or more sensors mounted on the vehicle and configured to detect features in an environment surrounding the vehicle; and
a control system operatively coupled to the one or more sensors, the first arm assembly, and the at least one cable actuator, the control system comprising one or more processors and one or more non-transitory computer-readable media storing computer-readable instructions that, when executed by the one or more processors, cause the one or more processors to:
identify, based at least in part on one or more signals from the one or more sensors, the gladhand receptacle in the first position and a pivot or hinge of the gladhand receptacle;
plan a first path so as to position a part of the first arm assembly to grasp a portion of the gladhand receptacle remote from the identified pivot or hinge;
move, via the at least one linear actuator and/or the at least one cable actuator, the part of the first arm assembly along the first planned path;
grasp, via the part of the first arm assembly, the portion of the gladhand receptacle remote from the identified pivot or hinge;
plan a second path for the part of the first arm assembly so as to rotate the gladhand receptacle from the first position to the second position;
move, via the at least one linear actuator and/or the at least one cable actuator, the part of the first arm assembly along the second planned path such that the gladhand receptacle is in the second position;
connect the gladhand coupling portion to the gladhand receptacle in the second position;
disconnect the first end effector from a remainder of the first arm assembly; and
move, via the at least one linear actuator and/or the at least one cable actuator, the remainder of the first arm assembly to a stowed position remote from the trailer.

* * * * *